US010079827B2

(12) United States Patent
Watanabe

(10) Patent No.: US 10,079,827 B2
(45) Date of Patent: Sep. 18, 2018

(54) INFORMATION PROCESSING APPARATUS, INFORMATION PROCESSING METHOD, AND INFORMATION PROCESSING SYSTEM

(71) Applicant: Genki Watanabe, Kanagawa (JP)

(72) Inventor: Genki Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 150 days.

(21) Appl. No.: 15/065,458

(22) Filed: Mar. 9, 2016

(65) Prior Publication Data
US 2016/0277397 A1 Sep. 22, 2016

(30) Foreign Application Priority Data

Mar. 16, 2015 (JP) ................................ 2015-052488
Mar. 2, 2016 (JP) ................................ 2016-040271

(51) Int. Cl.
H04L 29/06 (2006.01)
G06F 17/30 (2006.01)
(Continued)

(52) U.S. Cl.
CPC .... *H04L 63/0861* (2013.01); *G06F 17/30256* (2013.01); *G06K 9/00228* (2013.01);
(Continued)

(58) Field of Classification Search
CPC ............... H04L 63/0861; H04L 63/083; G06F 17/30256; G06K 9/00228; G06K 9/00335; G06K 9/00906; H04W 12/06
(Continued)

(56) References Cited

U.S. PATENT DOCUMENTS

2004/0230488 A1* 11/2004 Beenau .................... G06K 9/00
705/18
2006/0090079 A1* 4/2006 Oh ..................... G07C 9/00087
713/186
(Continued)

FOREIGN PATENT DOCUMENTS

JP 2008-004050 1/2008
JP 4548218 9/2010
JP 2015-035178 2/2015

Primary Examiner — Michael S McNally
(74) Attorney, Agent, or Firm — Harness, Dickey & Pierce, P.L.C.

(57) ABSTRACT

An information processing apparatus for authenticating a user includes a wireless communication unit configured to obtain predetermined information from a wireless tag; a wireless authentication unit configured to authenticate the wireless tag based on the predetermined information; a capturing unit configured to capture an image; an image authentication unit configured to authenticate the user captured in the image; an image determination unit configured to determine whether an object of determination is a living body that satisfies a predetermined condition; and an apparatus authentication unit configured to permit the user to use the information processing apparatus in a case in which the image determination unit determines that the object of determination is the living body that satisfies the predetermined condition, and the user of the wireless tag which is authenticated by the wireless authentication unit and the user who is authenticated by the image authentication unit are the same.

18 Claims, 36 Drawing Sheets

(51) Int. Cl.
    *G06K 9/00*          (2006.01)
    *H04W 12/06*       (2009.01)

(52) U.S. Cl.
    CPC ..... *G06K 9/00335* (2013.01); *G06K 9/00906* (2013.01); *H04W 12/06* (2013.01); *H04L 63/083* (2013.01); *H04L 2463/081* (2013.01); *H04N 2201/0094* (2013.01)

(58) Field of Classification Search
    USPC .......................................................... 726/6
    See application file for complete search history.

(56) References Cited

U.S. PATENT DOCUMENTS

| | | | | |
|---|---|---|---|---|
| 2008/0021840 | A1* | 1/2008 | Beenau | G06Q 20/382 705/64 |
| 2010/0030693 | A1* | 2/2010 | Beenau | G06K 9/00382 705/64 |
| 2011/0004925 | A1* | 1/2011 | Giordani | G06F 21/34 726/4 |
| 2011/0191840 | A1* | 8/2011 | Ortiz | H04L 63/0861 726/7 |
| 2011/0225625 | A1* | 9/2011 | Wolfson | H04L 63/08 726/1 |
| 2014/0067682 | A1* | 3/2014 | Song | H04L 63/0853 705/44 |
| 2014/0093140 | A1* | 4/2014 | Juveneton | G06K 9/00906 382/117 |
| 2015/0043790 | A1* | 2/2015 | Ono | G06K 9/00288 382/118 |

\* cited by examiner

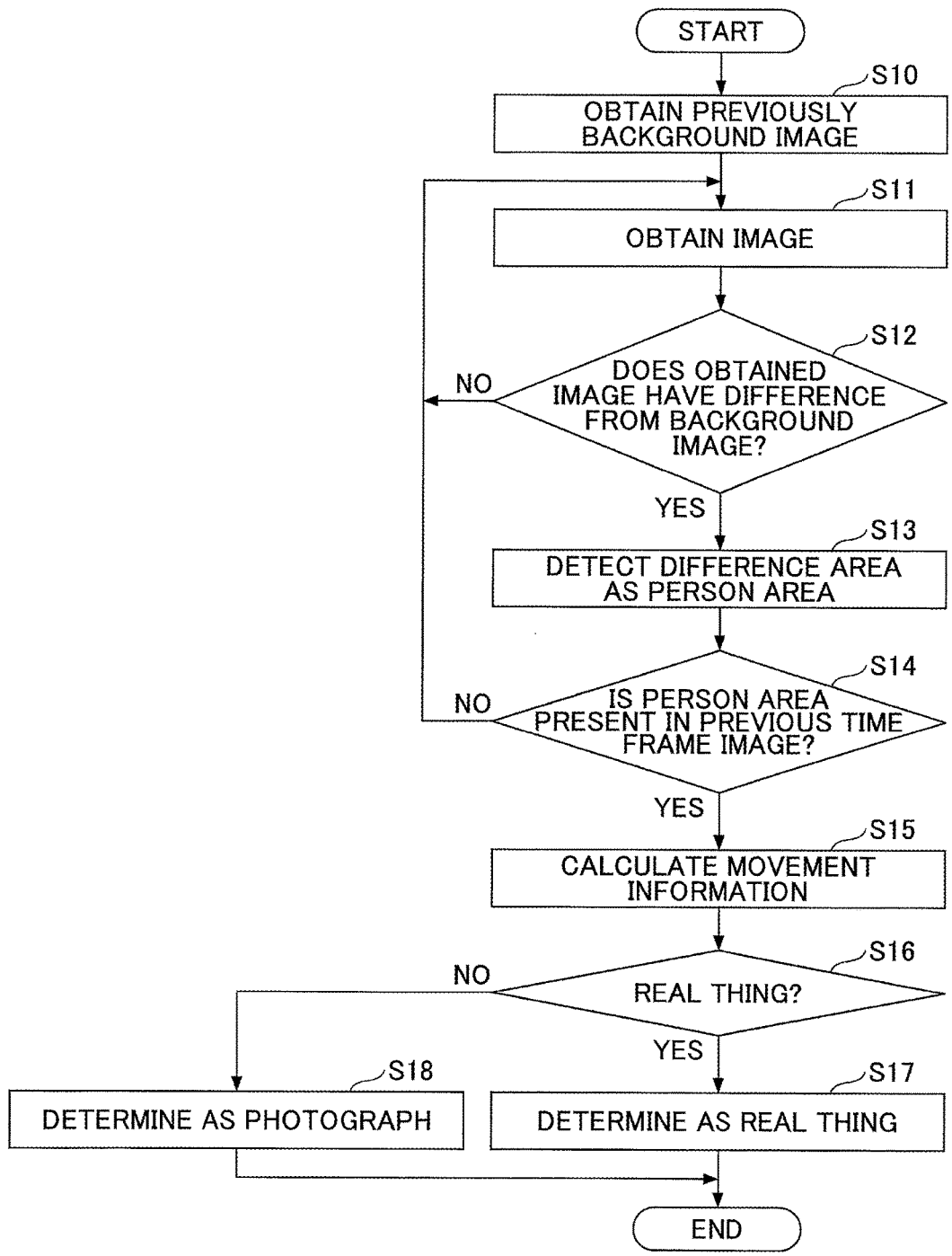

FIG.5A
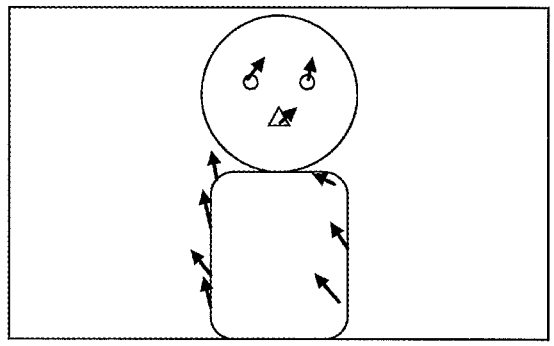
FIG.5B
| 10 | 50 | 20 | . | . | . |
|---|---|---|---|---|---|
| 120 | 30 | 12 | . | . | . |
| 120 | 30 | 12 | . | . | . |
| . | . | . | | | |
| . | . | . | | | |
| . | . | . | | | ● |
FIG.5C
| 100 | 20 | 30 |
|---|---|---|
| 120 | 90 | 40 |
| 120 | 10 | 10 |
FIG.5D
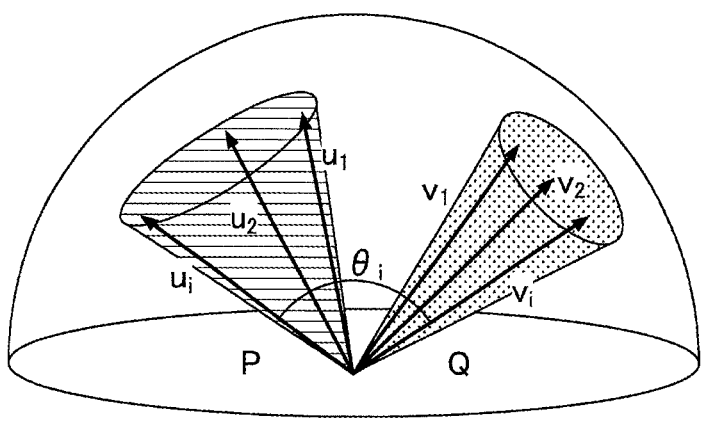

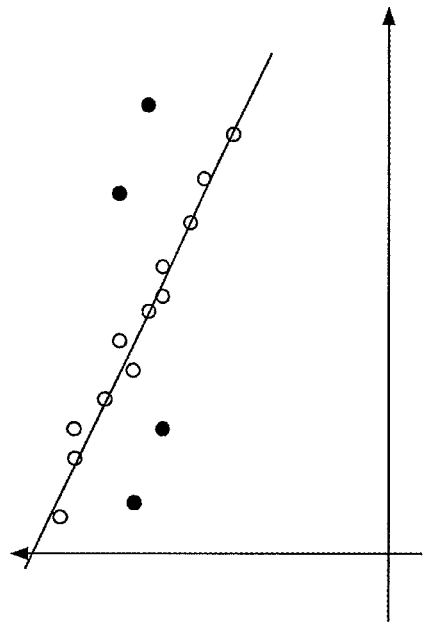
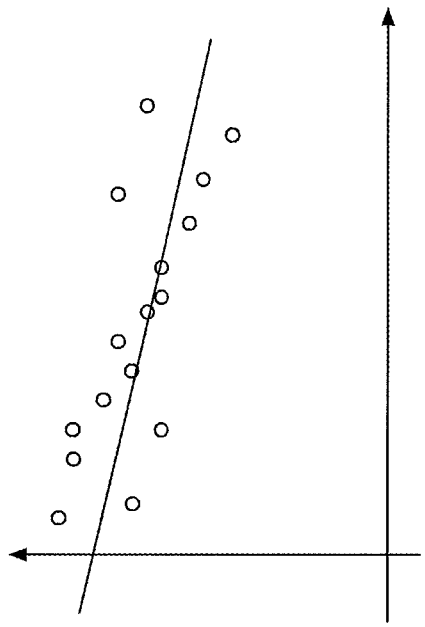

FIG.20

| DATA CLASSIFICATION | DATA 1 | DATA 2 | ... | DATA 300 |
|---|---|---|---|---|
| USER NUMBER | 0001 | 0002 | ... | 0300 |
| NAME | UEDA TARO | NAKATA JIRO | ... | SIMODA SABURO |
| MAIL ADDRESS | aaa@bbb.ccc | bbb@bbb.ccc | ... | xxx@bbb.ccc |
| LOGIN ID | ueda_taro | nakata_jiro | ... | Simoda_saburo |
| LOGIN PASSWORD | 12345 | abcdef | ... | xxxxx |
| WIRELESS TAG ID | 00522213 | 00535213 | ... | 05245219 |
| FEATURE INFORMATION OF FACE | {222, 241, 52, ..., 40, -167, -58} | {56, 111, -3, ..., -120, 47, 208} | ... | {186, 241, -36, ..., 20, -67, 158} |
| ... | ... | ... | ... | ... |

431

INFORMATION PROCESSING APPARATUS, INFORMATION PROCESSING METHOD, AND INFORMATION PROCESSING SYSTEM

BACKGROUND OF THE INVENTION

1. Field of the Invention

The disclosures herein generally relate to an information processing apparatus, an information processing method, and an information processing system.

2. Description of the Related Art

An image authentication technique such as face authentication is known in the related art as an authentication method for authenticating a user. According to the face authentication, operation of inputting a password is not necessary and impersonation caused by losing or stealing an IC card can be prevented.

SUMMARY OF THE INVENTION

It is a general object of at least one embodiment of the present invention to provide an information processing apparatus, an information processing method, and an information processing system that substantially obviate one or more problems caused by the limitations and disadvantages of the related art.

An embodiment provides an information processing apparatus for authenticating a user including a wireless communication unit configured to obtain predetermined information from a wireless tag; a wireless authentication unit configured to authenticate the wireless tag based on the predetermined information obtained by the wireless communication unit; a capturing unit configured to capture an image; an image authentication unit configured to authenticate the user captured in the image; an image determination unit configured to determine whether an object of determination is a living body that satisfies a predetermined condition, the object of determination being captured in the image; and an apparatus authentication unit configured to permit the user to use the information processing apparatus in a case in which the image determination unit determines that the object of determination is the living body that satisfies the predetermined condition, and the user of the wireless tag which is authenticated by the wireless authentication unit and the user who is authenticated by the image authentication unit are the same.

An embodiment also provides an information processing method for authenticating a user including: a step of obtaining predetermined information from a wireless tag; a step of authenticating the wireless tag based on the predetermined information obtained by the wireless communication unit; a step of capturing an image; a step of authenticating the user captured in the image; a step of determining whether an object of determination is a living body that satisfies a predetermined condition, the object of determination being captured in the image; and a step of permitting the user to use the information processing apparatus in a case in which the object of determination is determined as the living body that satisfies the predetermined condition, and the user of the wireless tag which is authenticated in the step of authenticating the wireless tag and the user who is authenticated in the step of authenticating the user are the same.

An embodiment also provides an information processing system including a near field wireless device configured to receive predetermined information from a wireless tag; a capturing device configured to capture an image; and an information processing apparatus connected to the near field wireless device and the capturing device. The near field wireless device includes a wireless communication unit configured to obtain the predetermined information received by the near field wireless device; a wireless authentication unit configured to authenticate the wireless tag based on the predetermined information obtained by the wireless communication unit; a capturing unit configured to use the capturing device to capture the image; an image authentication unit configured to authenticate a user captured by the capturing unit; an image determination unit configured to determine whether an object of determination is a living body that satisfies a predetermined condition, the object of determination being captured in the image; and an apparatus authentication unit configured to permit the user to use the information processing apparatus in a case in which the image determination unit determines that the object of determination is the living body that satisfies the predetermined condition, and the user of the wireless tag which is authenticated by the wireless authentication unit and the user who is authenticated by the image authentication unit are the same.

BRIEF DESCRIPTION OF THE DRAWINGS

FIG. 3 is a flowchart illustrating an example of a process for determining a real thing based on movement information of a person area according to the first embodiment;

FIGS. 5A, 5B, 5C and 5D are diagrams that depict determination of the real thing using the movement information of the person area according to the first embodiment;

FIGS. 11A and 11B are graphs that depict elimination of outliers according to the first embodiment;

FIG. 20 is an example of a database of user information according to the first embodiment;

DESCRIPTION OF THE PREFERRED EMBODIMENTS

In the following, embodiments of the present invention will be described with reference to the accompanying drawings.

<Functional Configuration of an Image Processing Apparatus>

Figure 1:
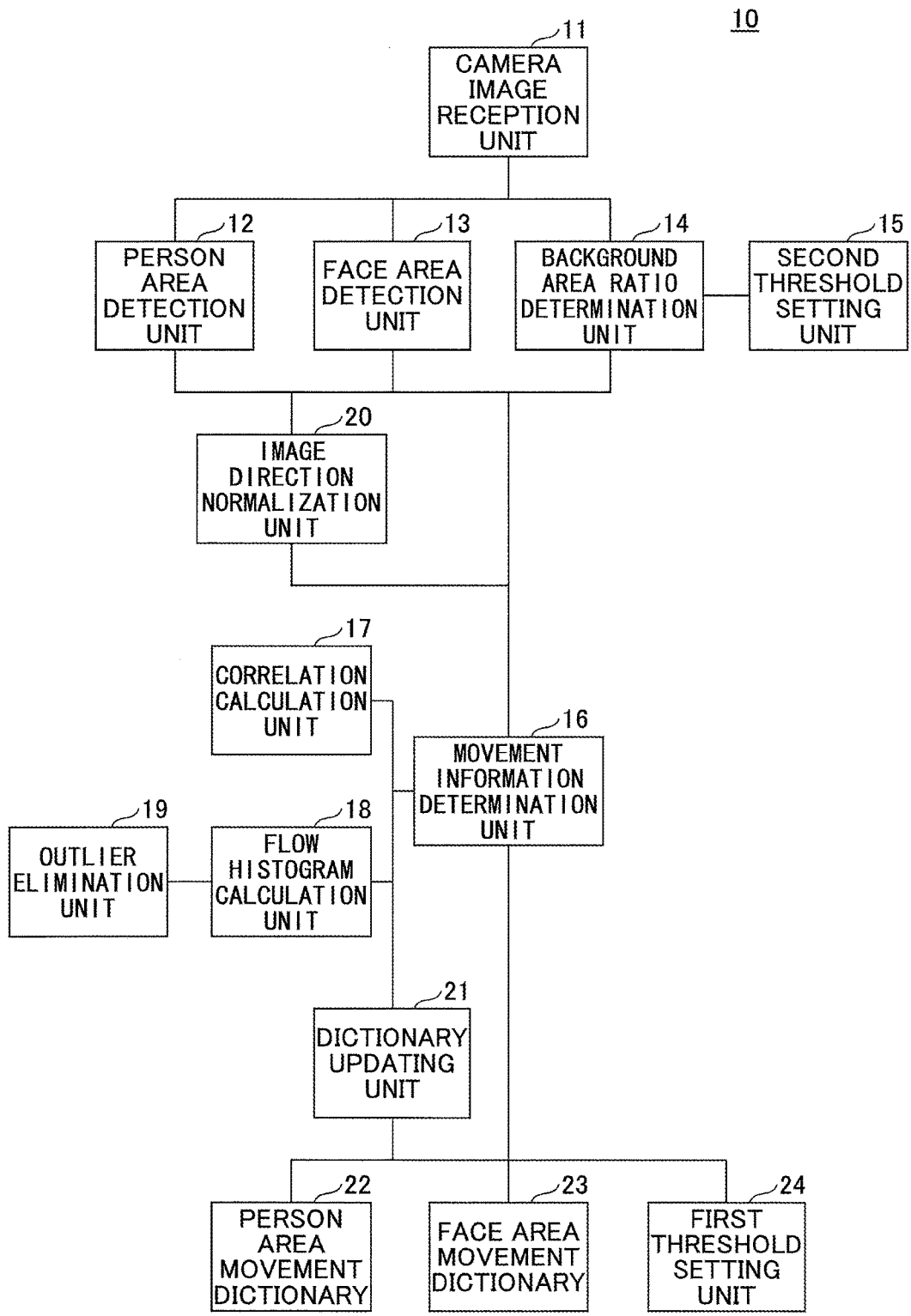
FIG. 1 is a block diagram illustrating an example of a functional configuration of an image processing apparatus according to a first embodiment.

FIG. 1 is a block diagram illustrating an example of a functional configuration of an image processing apparatus 10 according to a first embodiment. As shown in FIG. 1, the image processing apparatus 10 includes a camera image reception unit 11, a person area detection unit 12, a face area detection unit 13, a background area ratio determination unit 14, a second threshold setting unit 15, a movement information determination unit 16, a correlation calculation unit 17, a flow histogram calculation unit 18, an outlier elimination unit 19, an image direction normalization unit 20, and a dictionary updating unit 21. Further, the image processing apparatus 10 includes a person area movement dictionary 22, a face area movement dictionary 23, and a first threshold setting unit 24.

The camera image reception unit 11 obtains a plurality of images captured by a capturing device such as a camera. The camera image reception unit 11 obtains, for example, a background image which has been obtained previously and an image including a person area. Further, the camera image reception unit 11 obtains time series images at predetermined time intervals.

The person area detection unit (an example of a detection unit) 12 detects a person area (area corresponding to the person) from the images obtained from the camera image reception unit 11. The person area detection unit 12 detects the person area, for example, using a person area detection method based on a background subtraction, or an image processing. For example, when using the background subtraction, the person area detection unit 12 determines a part which matches the background image previously obtained in the time series images as a background area. Further, the person area detection unit 12 determines a part which does not match the background image as a non-background area, and determines the non-background area as a person area. It should be noted that a method for detecting the person area is not limited to this.

The face area detection unit (an example of a detection unit) 13 detects a face area from the image obtained by the camera image reception unit 11. The face area detection unit 13 can use a face detection method based on the background subtraction, or image processing. For example, the face area detection unit 13 may use the face detection method based on Haar-like features for the face detection method, however the present invention is not limited to this.

In the face detection, Haar-like features amount is used. The Haar-like features amount is a value calculated by subtracting the sum of pixel values of a white area from the sum of pixel values of a black area in a rectangle. The rectangle is an object for calculating in a search area. It should be noted that in the detection based on the Haar-like features, a discriminator created by Boosting is commonly used to discriminate area difference of the sums of the pixel values in a small rectangular area.

Because an arrangement position of the above described rectangle may be arranged at any position in the search area, there is a possibility of several tens of thousands arrangement positions in the search area. Weak discriminators in the search area are learned previously and weighed by the Boosting, and a strong discriminator is created by selecting several tens weak discriminators whose degree of importance are high. Using the strong discriminator (according to black and white rectangle several patterns which indicate face-likeness), whether the area is the face area of the person can be determined.

The background area ratio determination unit 14 calculates a ratio of a background area and a non-background area from the image obtained by the camera image reception unit 11 to determine whether the background area is equal to or greater than a threshold, for example.

The second threshold setting unit (background area ratio determination threshold setting unit) 15 sets a threshold (second threshold) used for the determining the ratio of the background area by the background area ratio determination unit 14. For example, the second threshold setting unit 15 sets a ratio of the background area not to be processed. Further, the second threshold setting unit 15 may set the threshold in consideration of balance of a degree of priority of detection accuracy of the person and a processing speed.

For example, in a case in which the second threshold setting unit 15 prioritizes the processing speed, movement information (information about movement) can be calculated from the whole image by setting the threshold of the ratio of the person area (non-background area) lower. In this case, because the movement information is not calculated in accordance with a shape of the detection area, processing load and processing time can be reduced.

In a case in which the second threshold setting unit 15 prioritizes the detection accuracy of the person, the second threshold setting unit 15 sets the threshold of the ratio of the person area (non-background area) higher. In this case, although the processing load and the processing time are required for calculating the movement information, the detection accuracy of movement determination can be increased.

The movement information determination unit 16 outputs the image obtained from the person area detection unit 12 or the face area detection unit 13 to the correlation calculation unit 17 or the flow histogram calculation unit 18 to obtain the movement information form the correlation calculation unit 17 or the flow histogram calculation unit 18.

The movement information determination unit 16 calculates the degree of similarity between the movement information obtained from the correlation calculation unit 17 or the flow histogram calculation unit 18, and movement information (dictionary data) which has been previously set in the person area movement dictionary 22 and the face area movement dictionary 23. In a case in which the movement information determination unit 16 determines that the calculated degree of similarity is equal to or greater than a predetermined threshold, the movement information determination unit 16 determines the image of the person obtained from the person area detection unit 12 or the face area detection unit 13 as a real thing (person who is present in the place actually). In other words, the movement information determination unit 16 determines whether an object of determination obtained from the person area detection unit 12 or the face area detection unit 13 is a living body that satisfies a predetermined condition.

As a discriminator used for comparing, for example, a linear discriminant analysis or a mutual subspace method (refer to "Subspace Method Starting with Example—Invitation to Pattern Recognition—", S. Horita, The Robotics Society of Japan, sixty-ninth Robotics Engineering Seminar, May 22, 2012) may be used. Further the threshold used for determining can be changed by the first threshold setting unit 24.

The correlation calculation unit (an example of calculation unit) 17 may calculate, with regard to the image obtained from the movement information determination unit 16, movement information (information about movement) obtained by a correlation value between images. For example, the correlation calculation unit 17 calculates difference between a current frame image and the previous time frame image to calculate 25-dimensional local auto-correlation feature amount (high-order local auto-correlation feature (HLAC feature)) in the binarized image. The 25-dimensions are, for example, the sum total of correlation in a local area in a case in which a dimension is treated as the second degree and a displacement direction is limited to 3×3 pixels. A combination of displacement vectors of the HLAC feature of the binarized image is expressed as 25-dimensional vectors (1 for the 0th degree, 4 for the first degree, 20 for the second degree) except for vectors moving parallel and equivalent to each other.

Further, the correlation calculation unit 17 acquires correlation in time series to calculate 251-dimensional vectors as the movement information. 251-dimensions are, for example, the sum total of correlation in the local area in a case in which a dimension is treated as the second degree and a displacement direction is limited to 3×3×3 pixels. A combination of displacement vectors of cubic high-order autocorrelation feature (CHLAC feature) of the binarized image is expressed as 251-dimensional vectors (1 for the 0th degree, 13 for the first degree, 237 for the second degree) except for vectors moving parallel and equivalent to each other.

It should be noted that information of the 25-dimensions (the former) is correlation in the difference image, and information of the latter is correlation between a previous difference image and a subsequent difference image. The correlation calculation unit 17 uses the two pieces information to calculate amount of information of the 251-dimensions (refer to "Suspicious Behavior Detection based on CHALC Method", H. Imanishi, T. Hayashi, S. Enokida, and T. Ejima, Technical Report of Information Processing Society of Japan, 2012).

The flow histogram calculation unit (an example of a calculation unit) 18 calculates, about the image obtained from the movement information determination unit 16, information about movement by block matching. The flow histogram calculation unit 18 calculates whether a small area of the previous time frame image moves in the current frame image. The movement of each area is indicated by a vector, for example.

For example, using the block matching, the flow histogram calculation unit 18 calculates an optical flow as the movement information. The optical flow is vector information which indicates movement of each small area included in the images obtained from the movement information determination unit 16.

It should be noted that the block matching is an example, and a motion vector calculation method such as a gradient method may be used (refer to "Image Analysis Theory (7)", H. Nagahashi, Tokyo Institute of Technology, http://www.is-l.titech.ac.jp/~nagahashilab/member/longb/imageanalysis/LectureNotes/ImageAnalysis07.pdf pp 17-20). The flow histogram calculation unit 18 makes obtained vector into a histogram for each gradient direction to obtain the movement information.

The outlier elimination unit 19 calculates dispersion of a size of the optical flow from the optical flow of each pixel of an extracted area, and eliminates the optical flow having dispersion equal to or greater than a fixed magnification. Here, the optical flow(s) having dispersion equal to or greater than the fixed magnification is referred to as an outlier(s) (refer to "Image Media Engineering Advanced Course (5)", Hiroshima City University, http://www.ime.info.hiroshima-cu.ac.jp/~hiura/lec/ime/2010/5.pdf, pp 19-21).

It should be noted that the optical flow is, for example, a velocity vector of each pixel obtained from a change of a luminance value of a pixel generated by an object of temporally continuous image data moving. Using the velocity vector, a moving body can be detected.

The image direction normalization unit 20 detects a plurality of feature points designated previously as targets from within an image area. The image direction normalization unit 20 normalizes a direction of the image (direction of captured object) by mapping the feature points in a 3D model arranged previously and turning the feature points to the front. Not only normalizing the image input from the camera image reception unit 11, in a case in which data of an image not directed to the front is in the person area movement dictionary 22 or the face area movement dictionary 23, the image direction normalization unit 20 may normalize the image.

After the movement information determination unit 16 determines the real thing, in a case in which it is determined that an image of a person is not a photograph definitely based on, for example, composite authentication such as password input, the dictionary updating unit (updating unit) 21 updates dictionary data using the movement information used when determining the real thing. Further, the dictionary updating unit 21 updates the dictionary data of the person area movement dictionary 22 in a case in which the movement information of the person area is used. The dictionary updating unit 21 updates the dictionary data of the face area movement dictionary 23 in a case in which the movement information of the face area is used.

Further, in accordance with a discriminator used by the movement information determination unit 16, the dictionary updating unit 21 may previously convert data for discrimination in order to update the dictionary data. By updating the dictionary data as described above, a dictionary which corresponds to captured environment can be obtained and accuracy in the determination of the real thing by the movement information determination unit 16 can be improved.

The person area movement dictionary 22 stores information about movement (movement information) of the person area (dictionary data) which has been learned (set) previously. It should be noted that the person area movement dictionary 22 may be created by the movement information obtained under a situation in which the person image is captured. In accordance with a discriminator used by the movement information determination unit 16, the person area movement dictionary 22 may previously convert data for the discriminator. For example, in a case in which the discriminator is a control subspace method, vectors are projected in a generalized difference subspace for the previous conversion (refer to "Subspace Method and Discriminator", K. Fukui, thirteenth Symposium on Sensing via Image Information, Jun. 7, 2007).

The face area movement dictionary 23 stores information about movement (movement information) of the face area (dictionary data) which has been learned previously. The face area movement dictionary 23 may be created by the movement information obtained under a situation in which the face image is captured. In accordance with a discriminator used by the movement information determination unit 16, the face area movement dictionary 23 may previously convert data for the discriminator.

The first threshold setting unit (movement information determination threshold setting unit) 24 sets a threshold (first threshold) used when the movement information determination unit 16 determines whether the person in the person area or the face area included in the image obtained by the camera image reception unit 11 is the real thing. The first threshold setting unit 24 can set and change the threshold, for example, according to a user operation. Because the first threshold setting unit 24 can set an adequate threshold in accordance with the captured environment of the user such as a distance to the captured object and presence/absence of illumination, the accuracy in the determination of the real thing by the movement information determination unit 16 can be improved.

<Hardware Configuration of the Image Processing Apparatus 10>

Figure 2:
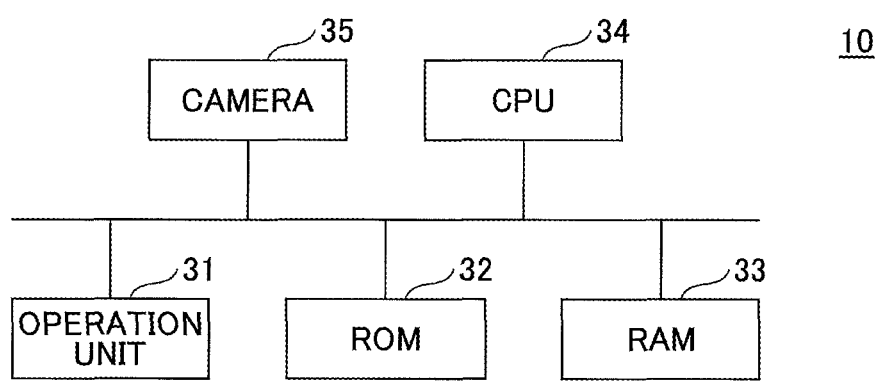
FIG. 2 is a block diagram illustrating a hardware configuration of the image processing apparatus according to the first embodiment.

FIG. 2 is a block diagram illustrating a hardware configuration of the image processing apparatus 10 according to the first embodiment. The image processing apparatus 10 shown in FIG. 2 includes, for example, an operation unit 31, a read only memory (ROM) 32, a random access memory (RAM) 33, a central processing unit (CPU) 34, and a camera 35.

The operation unit 31 is realized by, for example, a keyboard, a mouse, and a touch panel. The operation unit 31 receives, for example, various operations from the user.

The ROM 32 is a non-volatile semiconductor memory (storage device) which can store programs and data even when the power is turned off. The ROM 32 stores the programs and the data such as a basic input/output system (BIOS) executed when the image processing apparatus 10 is started, setting of operating system (OS), and setting of a network. The RAM 33 is a volatile memory (storage device) which temporarily stores programs and data.

The CPU 34 is an arithmetic and logic device which reads the programs and the data from the ROM 32 and/or the RAM 33, and executes processes according to the programs and the data to implement various functions and the entire control of the image processing apparatus 10.

The camera 35 is an example of a capturing device for capturing the person whose face is to be recognized. The camera 35 is, for example, a digital camera, and can obtain images and moving images. However, the camera 35 is not limited to this.

The image processing apparatus 10 can implement various processes, which will be described later, by using the above described hardware elements.

<Process for Determining the Real Thing Based on the Movement Information of the Person Area>

FIG. 3 is a flowchart illustrating an example of a process for determining the real thing based on the movement information of the person area according to the first embodiment. In the example shown in FIG. 3, whether the object of determination captured by the camera 35 is the real thing or not (for example, a photograph) is determined using the movement information of the person area. In other words, whether the object of determination captured by the camera 35 is the living body that satisfies the predetermined condition is determined based on the movement information of the person area.

As shown in FIG. 3, when the camera image reception unit 11 previously obtains the image in an unmanned situation in step S10, the image processing apparatus 10 sets the obtained image as the background image. Further, when the camera image reception unit 11 obtains the image in step S11, the image processing apparatus 10 causes the person area detection unit 12 to determine in step 12 whether the image obtained in the process in step S11 has any differences from the background image previously obtained.

When the person area detection unit 12 determines that the image obtained in step S11 has differences from the background image (YES in step S12), the person area detection unit 12 detects the difference area as the person area in step S13. It should be noted that when the person area detection unit 12 determines that the image obtained in step S11 does not have differences from the background image (NO in step S12), the process returns to step S11.

Next, the image processing apparatus 10 determines whether the person area is present in the previous time frame image in step S14. When the image processing apparatus 10 determines that the person area is present in the previous time frame image (YES in step S14), the image processing apparatus 10 causes the correlation calculation unit 17 or the flow histogram calculation unit 18 to calculate the movement information in step S15. It should be noted that when the image processing apparatus 10 determines that the person area is not present in the previous time frame image (NO in step S14), the process returns to step S11.

In the process in step S15, the correlation calculation unit 17 or the flow histogram calculation unit 18 calculates the movement information, for example, by using the current frame image whose image area is detected in step S13 and the previous time frame image.

Alternatively, the flow histogram calculation unit 18 may calculate, as the movement information, the optical flow which indicates movement of each small area included in the images from which the person areas are detected.

As described above, the correlation calculation unit 17 or the flow histogram calculation unit 18 calculates the movement information in the case in which the images of the person areas are obtained in time series. In other words, the correlation calculation unit 17 or the flow histogram calculation unit 18 calculates the information about movement of the person based on one image in which the area corresponding to the person is detected by the person area detection unit 12 and one or more other images in which the area corresponding to the person is detected by the person area detection unit 12.

Next, using the movement information calculated in the process in step S15, the image processing apparatus 10 causes the movement information determination unit 16 to determine whether the person in the person area detected from the current frame image is the real thing (person who is present in the place actually) in step S16. In the process in step S16, the movement information determination unit 16 calculates the degree of similarity between the movement information calculated in the process in step S15 and the movement information (dictionary data) stored in the person area movement dictionary 22 to determine whether the person is the real thing.

In a case in which the degree of similarity between the movement information calculated in the process in step S15 and the dictionary data of the person area movement dictionary 22 is equal to or greater than the predetermined threshold (YES in step S16), the movement information determination unit 16 determines the person of the person area in the current frame image as the real thing in step S17. In other words, the movement information determination unit 16 determines the captured object of determination as the living body that satisfies the predetermined condition. In a case in which the degree of similarity is less than the predetermined threshold (NO in step S16), the movement information determination unit 16 determines the person as the photograph in step S18, then the process ends. In other words, the movement information determination unit 16 determines the captured object of determination as not a living body that satisfies the predetermined condition.

<Conceptual Drawings Until the Person Area is Detected>

Figure 4A:
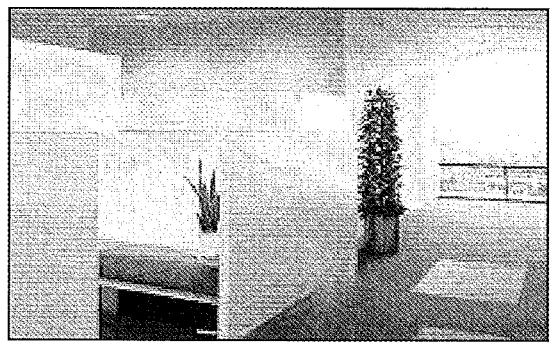
FIGS. 4A, 4B and 4C are conceptual drawings until the person area is detected according to the first embodiment.
Figure 4B:
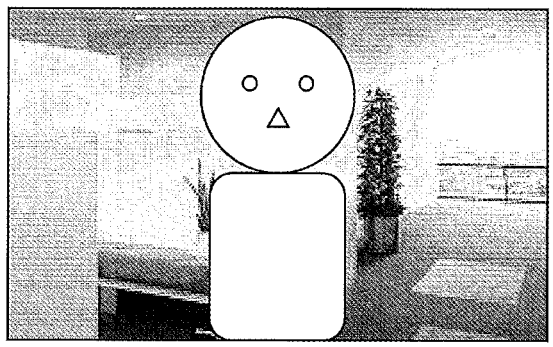
Figure 4C:
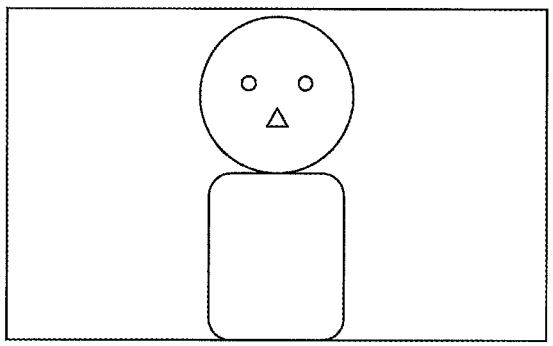

FIGS. 4A, 4B and 4C are conceptual drawings until the person area is detected according to the first embodiment. FIG. 4A is a drawing illustrating an example of the background image obtained previously. FIG. 4B is a drawing illustrating an example of the image captured by the camera 35. FIG. 4C a drawing illustrating is an example of the difference area detected as the person area.

Using the background image shown in FIG. 4A and the image shown in FIG. 4B, an example of detecting the person area based on the background subtraction will be described. The person area detection unit 12 calculates the absolute value, for example, by subtracting luminance values of pixels in the background image shown in FIG. 4A from luminance values of the image shown in FIG. 4B, respectively.

The background image shown in FIG. 4A and the image shown in FIG. 4B are, for example, 2×2 pixels gray images (value is a luminance value of 256 gradation). In the background image shown in FIG. 4A, "pixels in a first line are 50 and 150, and pixels in a second line are 200 and 3", and in the image shown in FIG. 4B, "pixels in a first line are 120 and 35, and pixels in a second line are 10 and 150".

In this case, in the difference image shown in FIG. 4C, for example, "pixels in a first line are 70 and 115, and pixels in a second line are 190 and 147". The difference image may be used as it is. Further, in the difference image, an area including values (having difference from the background) equal to or greater than a predetermined value may be used.

<Determination of the Real Thing Based on the Movement Information>

FIGS. 5A, 5B, 5C and 5D are drawings that depict the determination of the real thing using the movement information of the person area according to the first embodiment. FIG. 5A is a conceptual drawing of the movement information calculated from the images of the person areas. FIG. 5B is an example of luminance values of the current frame image. FIG. 5C is an example of luminance values of an attention block in the previous time frame image. Further, FIG. 5D is a drawing that depicts a comparison between the calculated movement information and the dictionary data of the person area movement dictionary 22.

In the example shown in FIG. 5A, as the movement information calculated from the images of the person areas, the optical flow obtained by using the block matching based on an inner product is indicated by arrows. A specific example until the optical flow shown in FIG. 5A is calculated will be described using the current frame image shown in FIG. 5B and the previous time frame image shown in FIG. 5C. It should be noted that in the example shown in FIGS. 5B and 5C, an example using a block size of 3×3 pixels is shown.

As shown in FIG. 5B, luminance values to be calculated are shown in the block among the current frame image. Further, in the current frame image, "●" shown in FIG. 5B corresponds to the luminance value "90" of the attention block among the previous time frame image shown in FIG. 5C.

For example, for calculating a position to which the attention block of the previous time frame image shown in FIG. 5C moves in the current frame image, the flow histogram calculation unit 18 uses a formula 1 to calculate the inner product of the block to be calculated.

$$\cos\theta = \frac{\langle a, b \rangle}{\|a\|\|b\|} \qquad \text{FORMULA 1}$$

For example, "a" in the formula 1 indicates a matrix shown in FIG. 5B, and "b" in the formula 1 indicates a matrix shown in FIG. 5C.

The flow histogram calculation unit 18 uses inner products of the above two matrixes to calculate an angle (cos θ), and treats the calculated value as degree of similarity between two blocks. In the example shown in FIGS. 5B and 5C, the cos θ is 0.8503.

In a case in which the "cos θ" is used as described above, the higher the degree of similarity between the two blocks is, the more the "cos θ" approaches "1.0", and the lower the degree of similarity between the two blocks is, the more the "cos θ" approaches "0.0". Thus, the position of the attention block in the previous time frame image shown in FIG. 5C is present in a vicinity in the current frame image shown in FIG. 5B, and a position whose degree of similarity is highest becomes a position to which the attention block shown in FIG. 5C moves.

For example, in the example shown in FIGS. 5B and 5C, because a moving distance in a x direction is "−3" and a moving distance in a y direction is "+4", the optical flow is "(−3, 4)".

Next, the movement information determination unit 16 performs principal component analysis of the vector of the movement information, and compares the calculated movement information with the dictionary data, based on the dictionary data of the person area movement dictionary 22 and a subspace method shown in FIG. 5D, to obtain the degree of similarity. In the example shown in FIG. 5D, one indicates an input subspace and the other indicates a subspace of the dictionary data.

Here, the less an angle between the subspaces is small, the more the degree of similarity is high. Then, in a case in which a threshold has been set as "10°" for example, the movement information determination unit 16 determines the calculated movement information as movement of the person when the angle between the subspaces is less than 10°, and the movement information determination unit 16 determines the calculated movement information as not the real thing (for example, determine as photograph) when the angle between the subspaces is equal to or greater than 10°.

The above described degree of similarity uses a canonical angle which is the angle between the subspaces. For example, n (m is equal to or greater than n) canonical angles can be defined between a m-dimensional subspace P and n-dimensional subspace Q. Further, the canonical angle (n canonical angles θi) is calculated by using formulas 2 and 3.

$$u_i \in P, v_i \in Q, \|u_i\| \neq 0, \|v_i\| \neq 0 \qquad \text{FORMULA 2}$$

$$\cos^2\theta_i = \max_{\substack{u_i \perp u_j(j=1,2,\ldots,i-1) \\ v_i \perp v_j(j=1,2,\ldots,i-1)}} \frac{(u_i \cdot v_i)^2}{\|u_i\|^2 \|v_i\|^2} \qquad \text{FORMULA 3}$$

Further, the degree of similarity is calculated by the above described canonical angle and a formula 4.

$$S[n] = \frac{1}{n}\sum_{i=1}^{n} \cos^2\theta_i \qquad \text{FORMULA 4}$$

$$(0.0 \leq S[n] \leq 1.0)$$

For example, a case will be described in which a base vector 1 in the input subspace is expressed by a formula 5, a base vector 2 is expressed by a formula 6, a base vector 1 in the subspace of the dictionary data is expressed by a formula 7, and a base vector 2 is expressed by a formula 8.

$$\begin{pmatrix} 10 \\ 30 \\ 0 \end{pmatrix} \qquad \text{FORMULA 5}$$

$$\begin{pmatrix} 0 \\ 0 \\ 1 \end{pmatrix} \qquad \text{FORMULA 6}$$

$$\begin{pmatrix} 0 \\ -30 \\ 120 \end{pmatrix} \qquad \text{FORMULA 7}$$

$$\begin{pmatrix} 50 \\ 0 \\ -15 \end{pmatrix} \qquad \text{FORMULA 8}$$

In the above described case, using the base vector 2 in the input subspace and the base vector 1 in the subspace of the dictionary data for calculating, "$\cos^2 \Theta_1$ is 0.9412". Further, using the base vector 1 in the input subspace and the base vector 2 in the subspace of the dictionary data for calculating, "$\cos^2 \Theta_1$ is 0.0917". Thus, the degree of similarity is calculated as "0.5165".

In a case in which the movement information determination unit 16 determines that the degree of similarity, calculated as described above, is equal to or greater than the predetermined threshold, the movement information determination unit 16 determines the person in the person area of the current frame image as the real thing.

It should be noted that although the movement of the person is determined based on the degree of similarity from the dictionary data in the above described example, the present invention is not limited to this. By classifying examples which are not movements of the person into several classes to learn, whether it is the movement of the person or not may be determined based on the classified classes.

<Process for Determining the Real Thing Based on the Movement Information of the Face Area>

Figure 6:
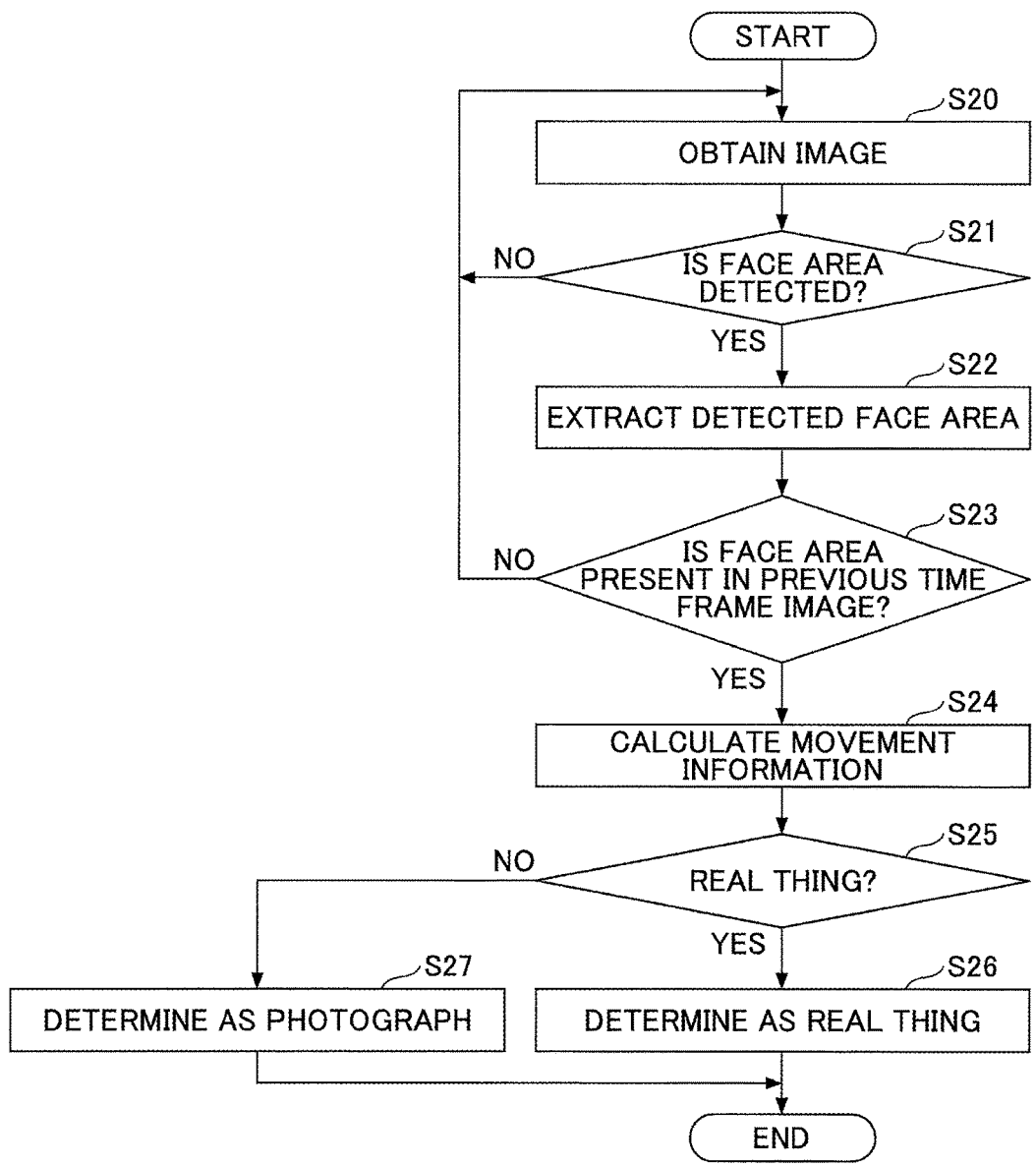
FIG. 6 is a flowchart illustrating an example of the process for determining the real thing based on the movement information of a face area according to the first embodiment.

FIG. 6 is a flowchart illustrating an example of the process for determining the real thing based on the movement information of the face area according to the first embodiment. In the example shown in FIG. 6, the face area is extracted by detecting the face of the person, and whether the object of determination captured by the camera 35 is the real thing or not (for example, the photograph) is determined using the movement information of the face area. In other words, whether the object of determination captured by the camera 35 is the living body that satisfies the predetermined condition is determined based on the movement information of the face area. The process in FIG. 6 differs from the process in FIG. 3 in that the background image is not obtained previously.

As shown in FIG. 6, when the camera image reception unit 11 obtains the image in step S20, the image processing apparatus 10 determines in step S21 whether the face area is detected by the face area detection unit 13. When the image processing apparatus 10 determines that the face area is detected by the face area detection unit 13 (YES in step S21), the image processing apparatus 10 extracts the detected face area in step S22. It should be noted that when the image processing apparatus 10 determines that the face area is not detected (NO in step S21), the process returns to step S20.

Next, the image processing apparatus 10 determines in step S23 whether the face area is present in the previous time frame image. When the image processing apparatus 10 determines that the face area is present in the previous time frame image (YES in step S23), the image processing apparatus 10 causes the correlation calculation unit 17 or the flow histogram calculation unit 18 to calculate the movement information in step S24. Further, the image processing apparatus 10 determines that the face area is not present in the previous time frame image (NO in step S23), the process return to step S20.

Next, using the movement information calculated in the process in step S24, the image processing apparatus 10 causes the movement information determination unit 16 to determine in step S25 whether the person in the face area detected from the current frame image is the real thing. In the process in step S25, the movement information determination unit 16 determines whether the person is the real thing by calculating the degree of similarity between the movement information obtained in the process in step S24 and the dictionary data stored in the face area movement dictionary 23.

In a case in which the degree of similarity between the movement information calculated in the process in step S24 and the dictionary data of the face area movement dictionary 23 is equal to or greater than the predetermined threshold (YES in step S25), the movement information determination unit 16 determines the person of the face area in the current frame image as the real thing in step S26. In other words, the movement information determination unit 16 determines the captured object of determination as the living body that satisfies the predetermined condition. In a case in which the degree of similarity is less than the predetermined threshold (NO in step S25), the movement information determination unit 16 determines the person as the photograph in step S27, then the process ends.

According to the above described detection of the face area, the process can be executed without being affected by flickering of the whole image due to an illumination or the like and influence of texture of the background and the non-background.

<Conceptual Drawings Until the Movement Information is Calculated from the Face Area>

Figure 7A:
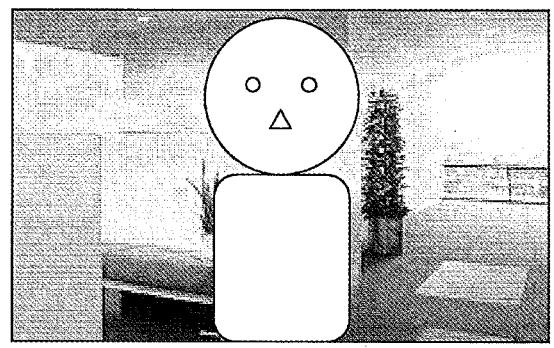
FIGS. 7A, 7B, and 7C are conceptual drawings until the movement information is calculated from the face area according to the first embodiment.
Figure 7B:
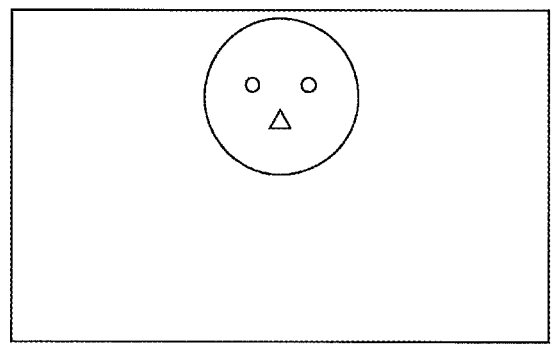
Figure 7C:
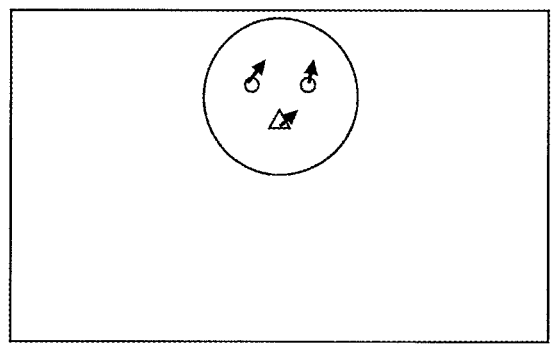

FIGS. 7A, 7B and 7C are conceptual drawings until the movement information is calculated from the face area according to the first embodiment. FIG. 7A is an example of the image captured by the camera 35. FIG. 7B is an example of the detected face area. FIG. 7C is a conceptual drawing of the movement information calculated from the plurality of images of the face areas.

The face area detection unit 13 detects the face area shown in FIG. 7B from the image shown in FIG. 7A, for example, using a template matching. Similar to the calculation of the movement information shown in FIG. 5, the face area detection unit 13 uses each luminance value (256 gradations) of a template of the face image (for example, 11×11 pixels of a gray scale image) which has been stored previously and the image (for example, 22×37 pixels) shown in FIG. 7A to calculate an inner product.

The face area detection unit 13 uses the above described formula 1 to calculate, degree of similarity, an angle (cos Θ) based on the inner product of two matrixes obtained from the above described template of the face image and the image shown in FIG. 7A. For example, in the above described formula 1, "a" indicates each search area in the image shown in FIG. 7A, and "b" indicates the template of the face image.

As described above, when the "cos θ" is used, because the higher the degree of similarity is, the more the "cos θ" approaches "1.0", and the lower the degree of similarity is, the more "cos θ" approaches "0.0", the face area detection unit 13 detects an area whose value is equal to or greater than a predetermined threshold as the face image.

It should be noted that a local peak may be calculated in consideration of a case in which a plurality of face images are included in the image shown in FIG. 7A. Further, another method for detecting the face such as the face detection based on the above described Haar-like features may be used.

Based on the movement information calculated from the image of the face area (image cut out from the face area detected by the face area detection unit 13) shown in FIG. 7B and the image of the face area in the previous time frame image, the optical flow show in FIG. 7C can be obtained.

<Case in which the Background Area is Less than the Predetermined Threshold>

Figure 8:
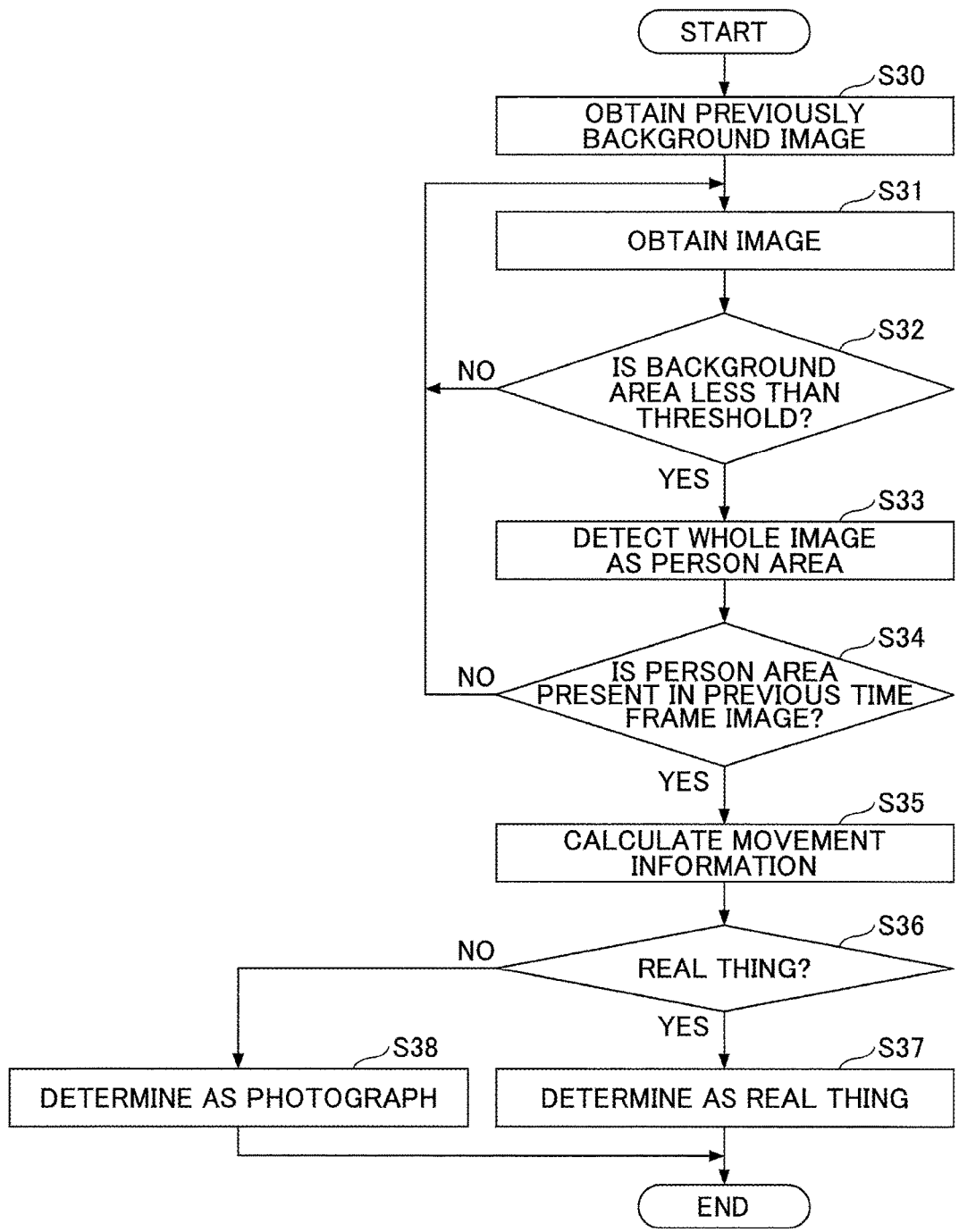
FIG. 8 is a flowchart illustrating an example of the process for determining the real thing according to the first embodiment in a case in which the background area is less than a predetermined threshold.

FIG. 8 is a flowchart illustrating an example of the process for determining the real thing according to the first embodiment in a case in which the background area is less than the predetermined threshold. Although the person area is detected in the process shown in FIG. 3, in the process shown in FIG. 8, the movement information is calculated not from the person area but from the whole area in the case in which the background area is less than the predetermined threshold.

As shown in FIG. 8, when the camera image reception unit 11 obtains previously the image in an unmanned situation, the image processing apparatus 10 sets the obtained image as the background image in step S30. Further, when the camera image reception unit 11 obtains the image in step S31, the image processing apparatus 10 causes the person area detection unit 12 to determine whether the image obtained in the process in step S31 has differences from the background image previously obtained.

In a case in which the image obtained in step S31 has the difference as described above, the image processing apparatus 10 causes the background area ratio determination unit 14 to determine in step S32 whether the background area is less than the predetermined threshold set by the second threshold setting unit 15. When the background area ratio determination unit 14 determines that the background area is less than the predetermined threshold (YES in step S32), the image processing apparatus 10 determines the whole image as the person area in step S33. When the background area ratio determination unit 14 determines that the background area is not less than the predetermined threshold (NO in step S32), the process returns to step S31.

Next, the image processing apparatus 10 determines in step S34 whether the person area is present in the previous time frame image. Because the process in steps S34 to S38 is similar to the process in steps S14 to S18, its description is omitted.

<Conceptual Drawings Until the Movement Information is Calculated in a Case in which a Ratio of the Background Area is Less than the Predetermined Threshold>

Figure 9A:
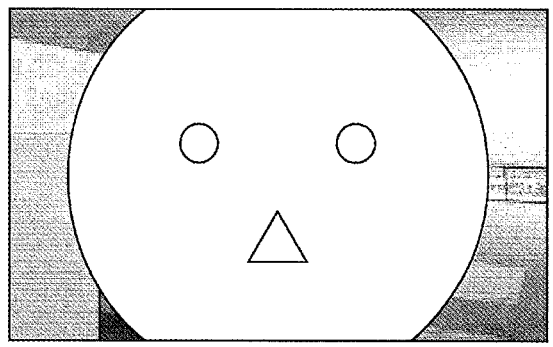
FIGS. 9A, 9B, 9C, and 9D are conceptual drawings according to the first embodiment in a case in which a ratio of the background area is less than the predetermined threshold.
Figure 9B:
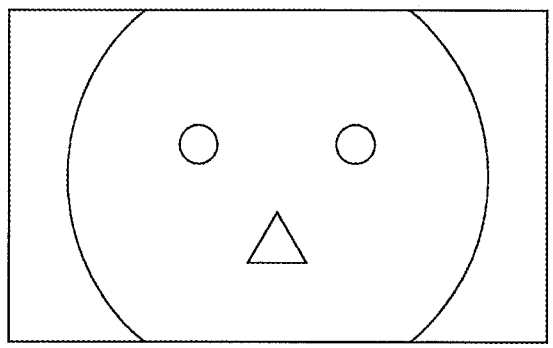
Figure 9C:
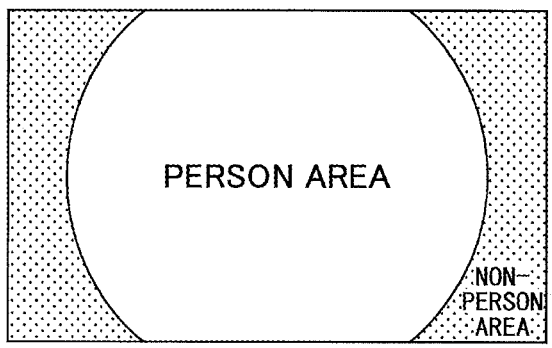
Figure 9D:
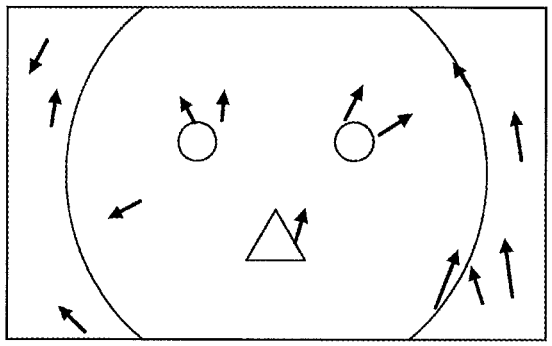

FIGS. 9A, 9B, 9C, and 9D are conceptual drawings according to the first embodiment in a case in which a ratio of the background area is less than the predetermined threshold. FIG. 9A is an example of the image captured by the camera 35. FIG. 9B is an example of the detected face (person) area. FIG. 9C is a conceptual drawing that depicts a ratio of a person area and a non-person area (background area). FIG. 9D is a conceptual diagram of the movement information calculated from the plurality of whole images.

The person area detection unit 12 or the face area detection unit 13 detects, from the image shown in FIG. 9A, the person (face) area shown in FIG. 9B based on the background subtraction, a time series difference or the face detection. The background ratio area determination unit 14 calculates total pixels of the person area and total pixels of the non-person area (background area). In the example shown in FIG. 9C, the total pixels of the person area is "500" and the total pixels of the non-person area is "70". Thus, the background are ratio determination unit 14 calculates the ratio of the person area as "87.7%" (500/570=0.877).

In a case in which the threshold set by the second threshold setting unit 15 is "75%", the background are ratio determination unit 14 determines that the ratio of the person area exceeds the threshold because "87.7%" calculated in the example of FIG. 9C is greater than "75%". In this way, for example, in a case in which the ratio of the person area exceeds the threshold, it is determined that influence of the non-person area is small, and the movement information is calculated from the whole image in the example shown in FIG. 9C. That is, the movement information can be calculated without reference to whether the person area or the background area.

The optical flow shown in FIG. 9D can be obtained by using the movement information calculated from the image shown in FIG. 9A and the previous time frame image.

<Case in which Outliers are Included>

Figure 10:
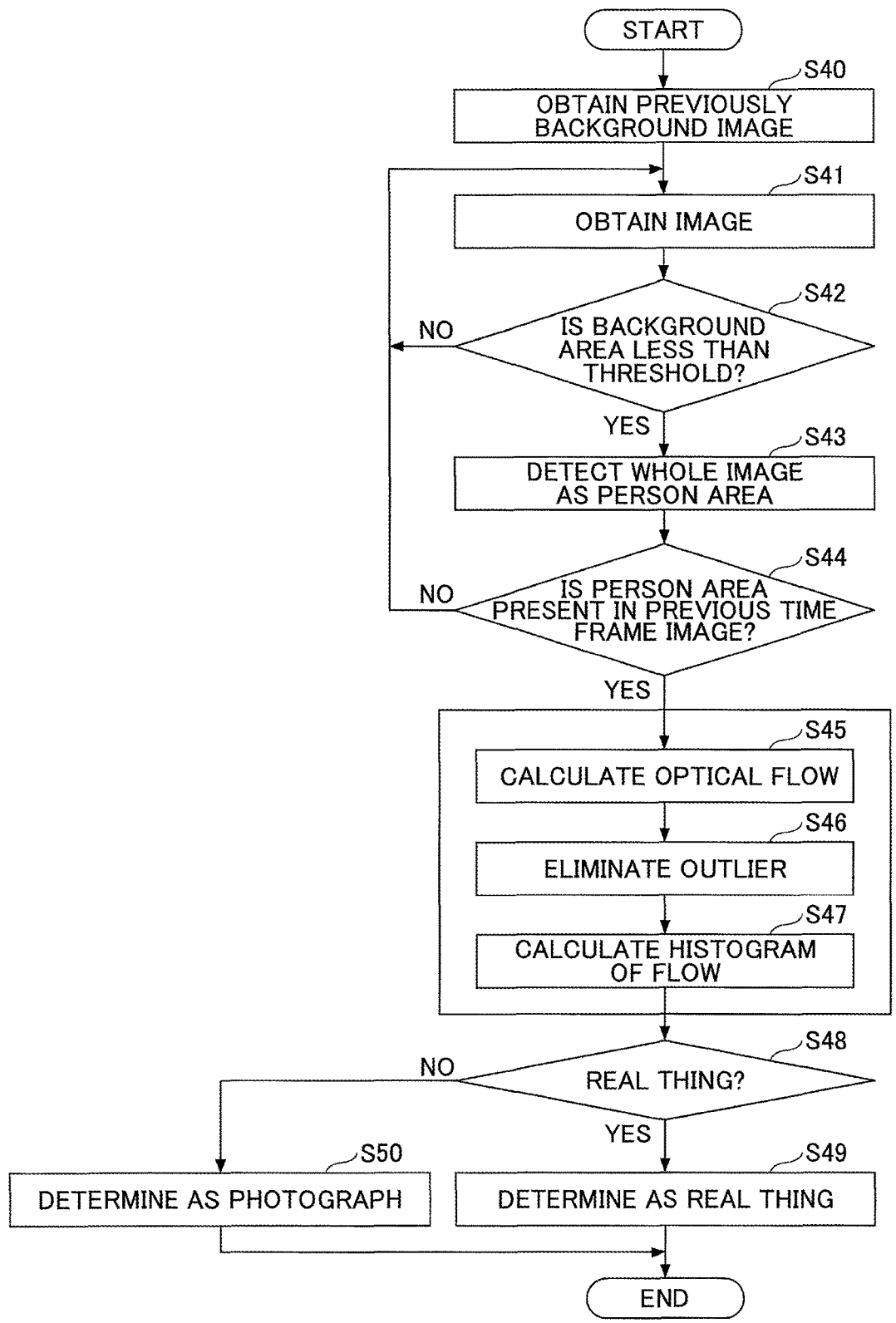
FIG. 10 is a flowchart illustrating an example of the process for determining the real thing according to the first embodiment in a case in which outliers are included.

FIG. 10 is a flowchart illustrating an example of a process for determining the real thing according to the first embodiment in a case in which outliers are included. In the example shown in FIG. 10, when the movement information of the optical flow is calculated according to the above described process, the outliers are eliminated. In the example shown in FIG. 10, because the outliers are eliminated, the movement information can be calculated more accurately. Because the process in steps S40 to S44, and S48 to S50 is similar to the process in steps S30 to S34, S36 to S38 shown in FIG. 8, its description is omitted as appropriate.

After the process in step S44 shown in FIG. 10, when the flow histogram calculation unit 18 calculates the optical flow in step S45 based on the current frame image and the previous time frame image for example, the image processing apparatus 10 causes the outlier elimination unit 19 to eliminate the outlier(s) in step S46. When the outliers are eliminated in the process in step S46, the flow histogram is calculated in step S47 and the process goes to step S48.

<Elimination of the Outlier(s)>

FIGS. 11A and 11B are graphs that depict elimination of the outliers according to the first embodiment. FIG. 11A shows an example of a normal least-square method, and FIG. 11B shows an example taking into account the outliers. When the flow histogram calculation unit 18 calculates the movement information using the optical flow according to the above described block matching, usage of a sum of squared differences (least square) of pixel values may lead to decrease of accuracy because of the outliers. Thus, the image processing apparatus 10 causes the outlier elimination unit 19 to eliminate the outlier when calculating the optical flow as the movement information.

In FIGS. 11A and 11B, an abscissa indicates x-coordinates and an ordinate indicates y-coordinates. Further, points plotted in FIG. 11A and FIG. 11B indicate pixel values in the matching object area (current frame image). Straight lines shown in FIGS. 11A and 11B indicate the matching object area (previous time frame image).

The less the sum of squared differences of each pixel value between the matching object area (current frame image) and the matching object area (previous time frame image) is, the more degree of similarity is, that is, a possibility of moving to the area is higher. In the example shown in FIGS. 11A and 11B, when the sum of squared differences of each pixel value is small, the plotted points become arranged on the straight line. On the other hand, in a case in which a part of the pixels become abnormal values (outliers) due to influence of illumination change or the like, a correct result may not be obtained because the value of the sum of least squares becomes larger due to the influence.

Thus, as shown in FIG. 11B, the outlier elimination unit 19 eliminates the abnormal values (outliers) from the objects for calculating the sum of least squares. In the example shown in FIG. 11B, the black plotted points are the outliers. By eliminating the corresponding outliers as shown in FIG. 11B, the plotted points become arranged on the straight line, and the degree of similarity of the matching objects increases.

By eliminating the outliers as described above, the accuracy of calculating the optical flow in the calculation of the movement information can be improved, and the detection accuracy in the above described determination of the real thing can be improved.

<Process for Determining the Real Thing while Normalizing a Direction of the Person>

Figure 12:
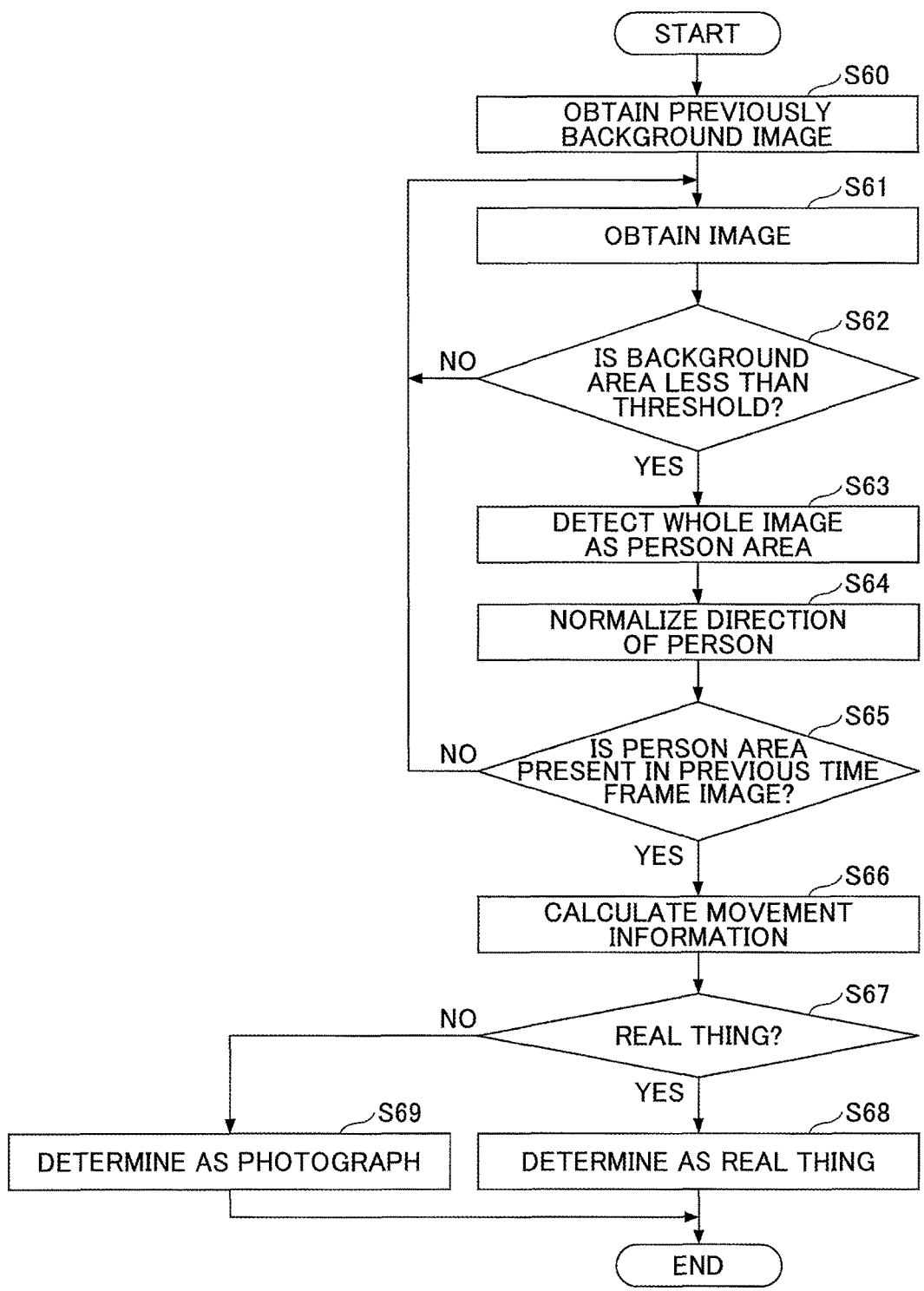
FIG. 12 is a flowchart illustrating an example of the process for determining the real thing while normalizing a direction of the person according to the first embodiment.

FIG. 12 is a flowchart illustrating an example of the process for determining the real thing while normalizing a direction of the person according to the first embodiment. In the example shown in FIG. 12, after the person (face) area is detected, a direction of the person (face) is normalized to calculate the movement information. In the example shown in FIG. 12, the movement information can be calculated more accurately by normalizing the direction of the person. Because the process in steps S60 to S63, and S65 to S69 is similar to the process in steps S30 to S33, S34 to S38 shown in FIG. 8, its description is omitted as appropriate.

After the process in step S63, the image processing apparatus 10 causes the image direction normalization unit 20 to normalize the direction of the person in step S64. As described above, the image direction normalization unit 20 detects a plurality of feature points designated previously as targets from inside of a small image area, maps the feature points in the 3D model arranged previously, and turns the feature points to the front to normalize the direction of the person. After the direction of the person is normalized in step S64, the process goes to step S65.

<Conceptual Drawings that Depict Normalization of the Direction of the Person>

Figure 13A:
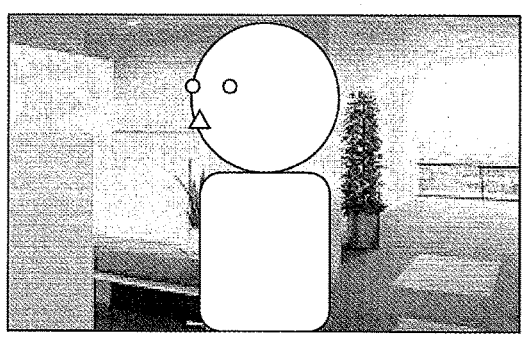
FIGS. 13A and 13B are conceptual drawings that depict normalization of the direction of the person according to the first embodiment.
Figure 13B:
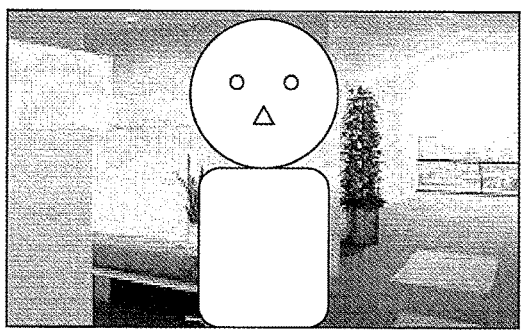

FIGS. 13A and 13B are conceptual drawings that depict normalization of the direction of the person according to the first embodiment. FIG. 13A is an example of the image captured by the camera 35. FIG. 13B is an example of the image in which the direction of the person (face) is (corrected) normalized. When the image shown in FIG. 13A is obtained, the image direction normalization unit 20 detects the designated feature points from inside of the image area to detect the direction of the person (face). In the example shown in FIG. 13A, the image direction normalization unit 20 detects that the person (face) and the body are turning to the right.

Further, the image direction normalization unit 20 maps, in the 3D model, the feature points detected from the image area shown in FIG. 13A, and turn the feature points to the front as shown in FIG. 13B to normalize the direction.

By normalizing the direction of the image as described above, the accuracy of calculating the movement information can be improved and the detection accuracy in the above described determination of the real thing can be improved.

<Case of Updating the Dictionary Data>

Figure 14:
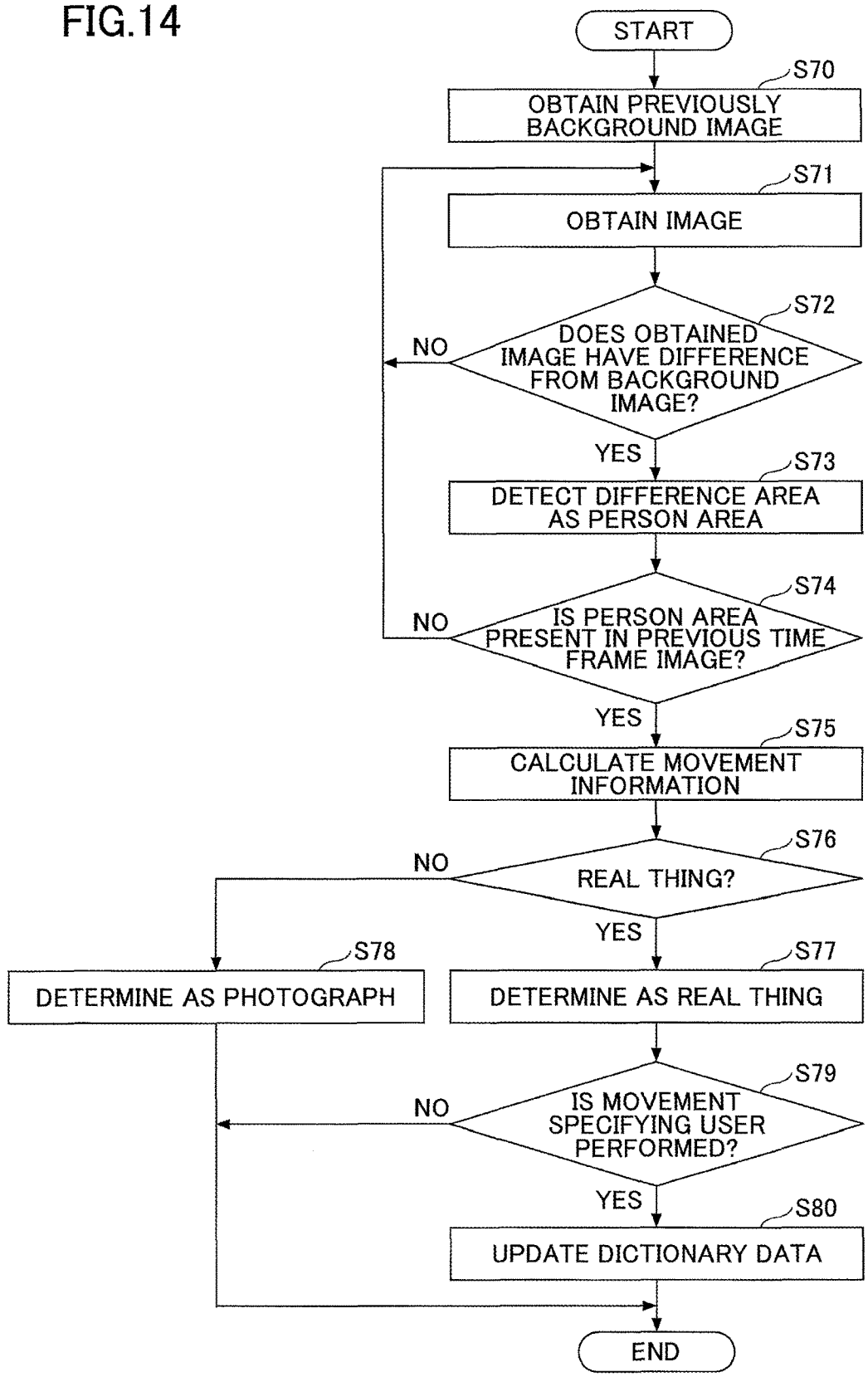
FIG. 14 is a flowchart illustrating an example of the process for determining the real thing which includes update of dictionary data according to the first embodiment.

FIG. 14 is a flowchart illustrating an example of the process for determining the real thing which includes updating the dictionary data according to the first embodiment. In the example shown in FIG. 14, the dictionary updating unit 21 updates the dictionary data using the movement information used for the process for determining the real thing in a case in which an operation which specifies the user such as the input of the password from the user is performed after the process for determining the real thing is executed. Because the process in steps S70 to S78 is similar to the process in steps S10 to S18 shown in FIG. 3, its description is omitted as appropriate.

After the process in step S78 shown in FIG. 14, the image processing apparatus 10 causes the dictionary updating unit 21 to determine in step S79 whether the operation for specifying the user has been performed. In the process in step S79, the dictionary updating unit 21 determines, for example, whether the operation which specifies the user such as the input of the password from the user has been performed.

In a case in which the dictionary updating unit 21 determines that the operation which specifies the user has been performed (YES in step S79), the image processing apparatus 10 cause the dictionary updating unit 21 to update the dictionary data in step S80. In the process in step S80, for example, the dictionary updating unit 21 adds the movement information, calculated in the process in step S75, to the dictionary data of the person area movement dictionary 22 to update the dictionary data. Further, in a case in which the dictionary updating unit 21 determines that the operation which specifies the user has not been performed (NO in step S79), the image processing apparatus 10 finishes the process.

<Movement Information Used for Updating the Dictionary Data>

Figure 15:
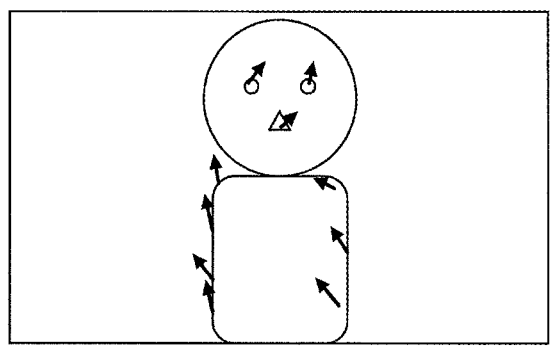
FIG. 15 is a drawing that depicts the movement information used for updating the dictionary data according to the first embodiment.

FIG. 15 is a drawing that depicts the movement information used for updating the dictionary data according to the first embodiment. It should be noted that arrows shown in FIG. 15 indicate the movement information in a case in which the optical flow is calculated.

In a case in which the operation which specifies the user is performed after the person in the image is determined as the person of the real thing, as shown in FIG. 15, the dictionary updating unit 21 adds the movement information, used when determining the person in the image as the person of the real thing, to the person area movement dictionary 22 to update the dictionary data. It should be noted that in a case in which the movement information, used when determining the person in the image as the person of the real thing, is, for example, the movement information calculated from the face area, the dictionary updating unit 21 adds the movement information to the face area movement dictionary 23 to update the dictionary data.

By updating the dictionary data sequentially as described above, the dictionary data which corresponds to usage environment of the user can be created, and the detection accuracy in the above described determination of the real thing can be improved.

According to the above described embodiment, by calculating the movement information from the area corresponding to the person to determine whether the person in the image is the real thing based on the calculated movement information, determination accuracy can be further improved over a conventional method for detecting only a local area of the face such as eyes or a mouth. Thus, the accuracy for detecting the person can be improved.

Although the above described embodiment is intended to authenticate the face, the present invention is not limited this. For example, the present invention may be used for determining whether a photograph is included in an image captured by a camera.

In this way, for example, when it is determined that the photograph is captured by the camera, the photograph can be taken in by applying image conversion to the area. For example, when the user wants to take in the photograms one by one, by holding the photograph over the camera repeatedly, distortion can be corrected by affine transformation or the like and the photograph can be taken in a normalized state without being scanned one by one. It should be noted that timing when a conversion processing is performed to take in photograph data is timing when it is determined that the photograph is captured by the camera (actual person is not captured) according to the above described embodiment.

Next, an example of an authentication method by an image forming apparatus to which the above described method for determining the real thing is applied will be described.

<System Configuration of an Information Processing System 100>

Figure 16:
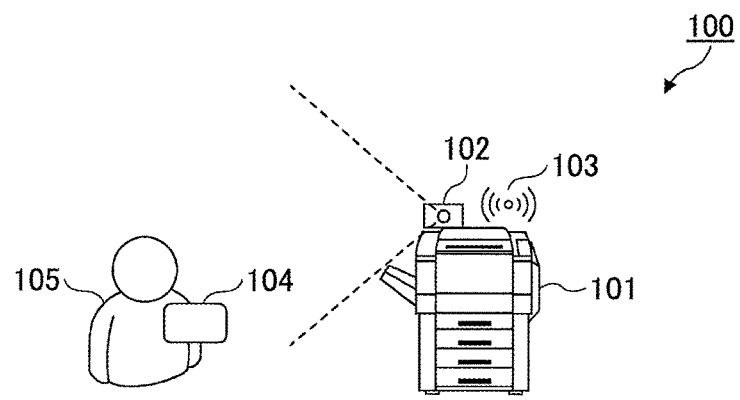
FIG. 16 is a schematic diagram illustrating a configuration example of an information processing system according to the first embodiment.

FIG. 16 is a schematic diagram illustrating a configuration example of an information processing system 100 according to the first embodiment.

In FIG. 16, the information processing system 100 includes an image forming apparatus 101. The image forming apparatus 101 is able to communicate with a radio frequency identifier (RFID) tag 104 which a user 105 carries (holds).

For example, the image forming apparatus 101 is an image forming apparatus including a printing function, a scanning function, a copying function, and a facsimile transmission/reception function such as a multifunction peripheral (MFP) and a printer. The image forming apparatus 101 is an example of an information processing apparatus which authenticates the user.

The image forming apparatus 101 includes a radio frequency (RF) tag reader 103 which receives predetermined information such as tag ID from the RFID tag 104 present within a predetermined range, and a camera 102 which captures an image.

The RFID is a technique for performing near field wireless communication between the RFID tag 104, which stores the predetermined information such as the tag ID, and the RF tag reader 103 by using an electromagnetic field, a radio waves and the like. That is, the RFID is an example of the near field wireless communication.

For example, in a case in which a passive tag is used as the RFID tag 104, the RF tag reader 103 radiates predetermined radio waves within a detection range of the RF tag reader 103 (the predetermined range), which will be described later. Further, in response to receiving the radio waves radiated from the RF tag reader 103, the RFID tag 104 functions using the received radio waves as electrical power, and transmits, to the RF tag reader 103, the predetermined information such as the previously stored tag ID.

When the passive tag is used, because the RFID tag 104 functions using the radio waves radiated from the RF tag reader 103 as the energy source, the RFID tag 104 is not required to incorporate a battery. An antenna of the passive tag reflects a part of the radio waves radiated from the RF tag reader 103. The predetermined information such as the tag ID is returned with the reflected waves. Because reflection intensity of the reflected waves is extremely low, a communication distance of the passive tag is shorter than that of an active tag which transmits radio waves using its own electrical power. However, the passive tag is inexpensive and functions almost permanently.

Types for transmitting signals of the RFID tag 104 are classified into an electromagnetic induction type and a radio wave type. The electromagnetic induction type is a method for transmitting energy/signals by magnetically coupling a coil of the RFID tag 104 and an antenna coil of the RF tag reader 103. Because the electromagnetic induction type can transmit the energy more effectively than the radio wave type, development of the electromagnetic induction type has been advanced. For example, Felica (registered trademark) uses the electromagnetic induction type. In the electromagnetic induction type, a frequency of 130 to 135 kHz or 13.56 MHz is used, for example. It should be noted that the communication distance of the electromagnetic induction type is within 1 meter, for example.

On the other hand, the radio wave type is a method for transmitting energy/signals by communicating the radio waves between the antenna of RFID tag 104 and the antenna of the RF tag reader 103. Because the radio wave type radiates and transmits the radio waves in space, the radio wave type can communicate with a more distant RFID tag 104 in comparison with the electromagnetic induction type. In the radio wave type, a frequency of 433 MHz, 900 MHZ band, or 2.45 GHz is used, for example. It should be noted that the communication distance of the radio wave type is within 3-5 meters when the passive tag is used, for example. The active tag can communicate, for example, over several kilometers if electric power permits.

For example, the camera 102 is a capturing device installed such that the image captured by the camera 102 includes the user using the image forming apparatus 101.

Figure 17:
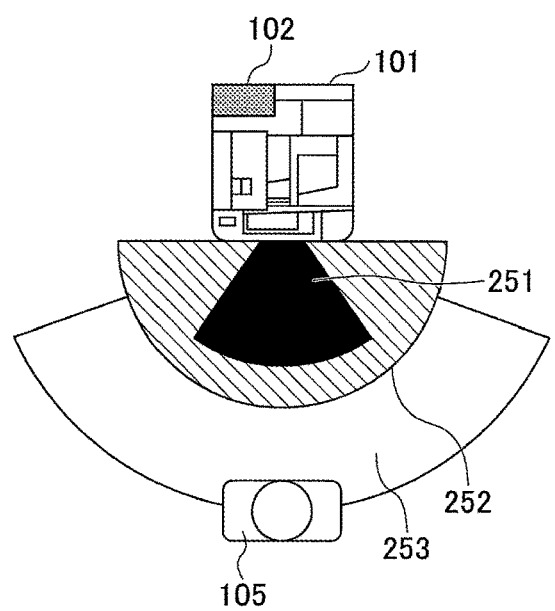
FIG. 17 is a drawing illustrating an example of an imaging range of a camera and a detection range of each sensor according to the first embodiment.

FIG. 17 is a drawing illustrating an example of an imaging range of the camera 102 and a detection range of each sensor according to the first embodiment. FIG. 17 shows an imaging range 251 of the camera 102, a detection range 252 of the RF tag reader 103, and a detection range 253 of a moving body sensor unit, which will be described later.

In FIG. 17, the detection range 252 of the RF tag reader 103 is shown when viewed from above the image forming apparatus 101. In the example in FIG. 17, the image forming apparatus 101 includes a patch antenna and the like inside of the image forming apparatus 101. The detection range 252 is formed in front of the image forming apparatus 101 (downward direction in FIG. 17), and fan-shaped (for example, 150 degrees).

In response to an event in which the moving body sensor unit detects the user 105 within the detection range 253 of the moving body sensor unit, the RF tag reader 103 radiates the predetermined radio waves within the detection range 252. In this way, for example, when the user carrying the RFID tag 104 approaches the image forming apparatus 101 (for example, within 3 meters from a front face of the image forming apparatus), the predetermined information such as the tag ID stored in the RFID tag 104 is transmitted to the image forming apparatus 101 automatically.

In the first embodiment, the image forming apparatus 101 stores information of users registered previously, and performs authentication of the RFID tag 104 (in the following, referred to as wireless authentication) based on the tag ID received from the RFID tag 104 and the information of the users registered previously.

Further, the camera 102 starts capturing in response to an event in which the moving body sensor unit detects the user within the detection range 253 of the moving body sensor unit.

The image forming apparatus 101 performs face authentication of the user captured in the image (in the following, referred to as image authentication), for example, based on a face image of the user in the image captured by the camera 102 and feature information (information about feature) of faces of the users registered previously.

Further, the image forming apparatus 101 determines whether a person detected from the image captured by the camera 102 is the real thing (living body) or a photograph (non-living body) based on the above described process for determining the real thing. In other words, the image forming apparatus 101 determines whether the object of determination captured by the camera 102 is the living body that satisfies the predetermined condition.

It should be noted the process for determining whether the person is the real thing (living body) or the photograph (non-living body) may be a process in which it can be determined that the person detected from the image is not an impersonation with the non-living body such as the photograph. The impersonation may be performed by a person (impersonator) using a photograph of another person or the like.

In the first embodiment, a case in which the person is determined as "the real thing" based on the above described process for determining the real thing, that is, a case in which the person detected from the image is determined as not the impersonation with the non-living body such as the photograph is referred to as a case in which the person detected from the image is "the living body".

Further, in the first embodiment, a case in which the person is determined as "the photograph" based on the above described process for determining the real thing, that is, a case in which the person detected from the image is determined as the impersonation with the non-living body such as the photograph is referred to as a case in which the person detected from the image is "the non-living body".

In a case in which the user of the RFID tag 104 whose wireless authentication is permitted by the wireless authentication and a user whose image authentication is permitted by the image authentication are the same, and the person captured in the image is determined as the living body (that is, the captured object of the determination is determined as the living body that satisfies the predetermined condition), the image forming apparatus 101 permits the user to use the image forming apparatus 101.

The image forming apparatus 101 according to the first embodiment can improve the accuracy of the image authentication such as the face authentication by the user of the image forming apparatus 101 only carrying the RFID tag 104. Further, the image forming apparatus 101 according to the first embodiment can reduce the impersonation using the face photograph of the user and the like.

It should be noted that the system configuration shown in FIG. 16 is an example. For example, the image forming apparatus 101 may be an information processing apparatus which authenticates the users such as a PC, a tablet terminal, a smartphone, a game machine, a TV conference apparatus, an electrical black board, and a projector. Further, the camera 102, the RF tag reader 103, and the like may be external devices.

Further, the RFID tag 104 may be a semi-active tag or an active tag of the RFID. It should be noted that the RFID tag 104 is an example of a wireless tag. The wireless tag may be a wireless terminal which communicates using a near field wireless communication type different from the RFID such as Bluetooth (registered trademark) Low Energy (in the following, referred to as BLE) or Near Field Communication (NFC). Further, a mobile phone in which the wireless tag or the like is mounted may be used instead of the RFID tag 104.

Moreover, the image authentication may use various authentication methods which perform authentication of the user by using the captured image of the user and feature information about the living body of the user such as fingerprint authentication, iris authentication, and vein authentication.

<Hardware Configuration of the Image Forming Apparatus 101>

Figure 18:
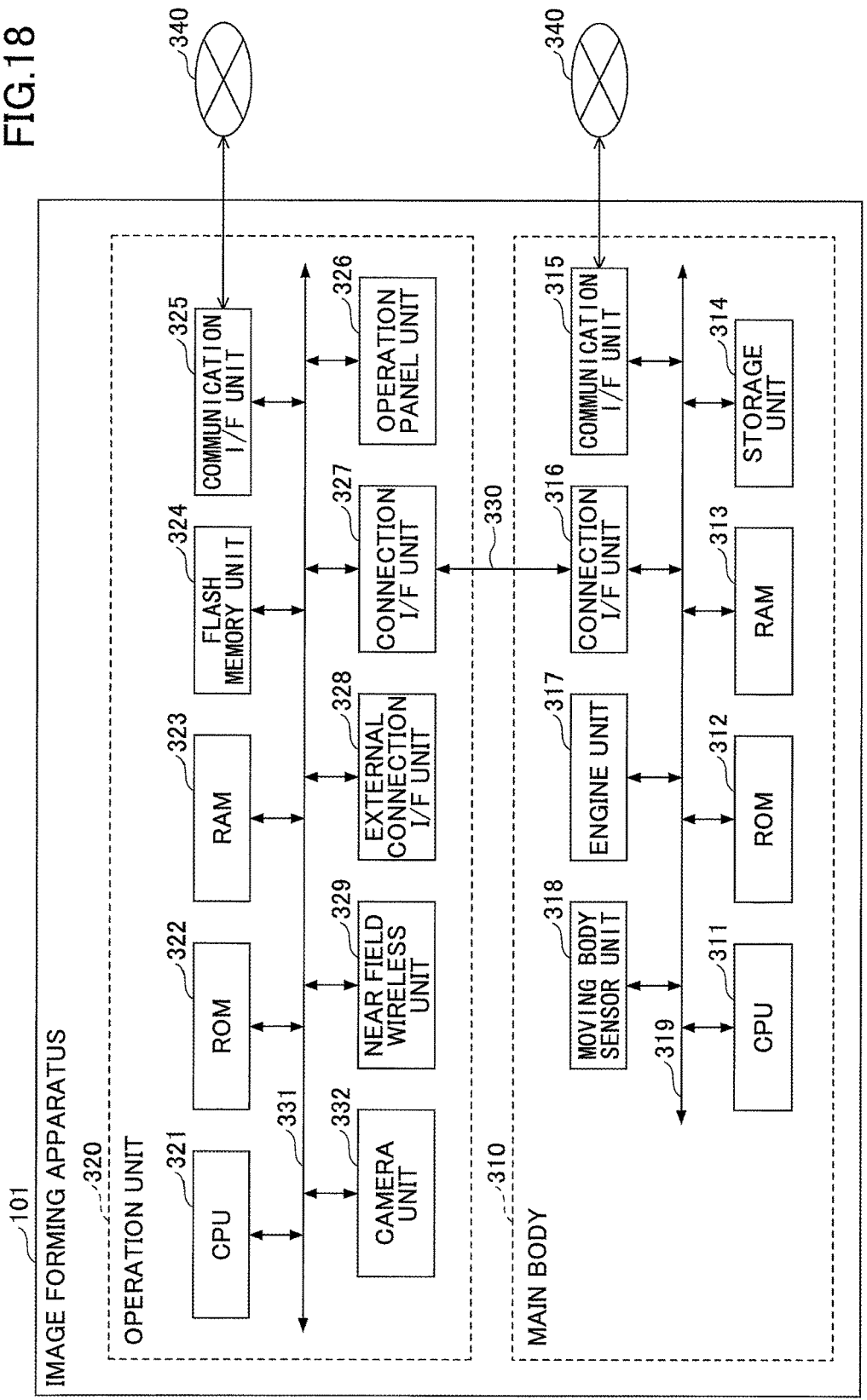
FIG. 18 is a block diagram illustrating an example of a hardware configuration of an image forming apparatus according to the first embodiment.

FIG. 18 is a block diagram illustrating an example of a hardware configuration of the image forming apparatus 101 according to the first embodiment. The image forming apparatus 101 includes a main body 310 and an operation unit 320. The main body 310 implements various image forming functions such as the copying function, the scanning function, the facsimile transmission/reception function, and the printing function. The operation unit 320 receives a user operation. It should be noted that the operation unit 320 can receive information input in accordance with the user operation such as signals which indicate coordinate values of a screen. The main body 310 and the operation unit 320 are connected to be able to communicate with each other via a dedicated communication channel 330. For example, universal serial bus (USB) standards may be used for the communication channel 330. Further, wired or wireless standards may be used.

It should be noted that the main body 310 can perform functions in accordance with the operation received by the operation unit 320. Further, the main body 310 can communicate with an external device such as a client personal computer (PC) and perform functions in response to instructions received from the external device.

Next, a hardware configuration of the main body 310 will be described. As shown in FIG. 18, the main body 310 includes a central processing unit (CPU) 311, a read only memory (ROM) 312, a random access memory (313), a storage unit 314, a communication interface (I/F) unit 315, a connection interface (I/F) unit 316, an engine unit 317, a moving body sensor unit 318, and a system bus 319.

The CPU 311 controls the overall operation of the main body 310. The CPU 311 uses the RAM 313 as a work area and executes programs stored in the ROM 312, the storage unit 314 or the like to control the overall operation of the main body 310. For example, the CPU 311 implements various functions such as the copying function, the scanning function, the facsimile transmission/reception function, and the printing function by using the engine unit 317.

The ROM 312 is a non-volatile memory which stores, for example, a basic input/output system (BIOS) executed when the main body 310 is started and various settings. The RAM 313 is a volatile memory used as the work area of the CPU 311. The storage unit 314 is a non-volatile storage device which stores, for example, an operating system (OS), application programs, and various kinds of data. For example, a hard disk drive (HDD) or a solid state drive (SSD) may be used as the storage unit 314.

The communication (I/F) unit 315 is a network interface which connects the main body 310 to a network 340 for communicating with an external device connected to the network 340. The connection (I/F) unit 316 is an interface for communicating with the operation unit 320 via the communication channel 330.

The engine unit 317 is a hardware element for implementing the functions such as the copying function, the scanning function, the facsimile transmission/reception function, and the printing function. The engine unit 317 executes versatile information processes and processes other than the communication. The engine unit 317 includes, for example, a scanner (image reading unit) which scans and reads an image on a document, a plotter (image forming unit) which prints an image on a sheet such as a paper, a facsimile unit which performs facsimile communication. Further, the engine unit 317 may include a specific option unit such as a finisher unit which sorts printed sheets and an auto document feeder (ADF) which feeds the document.

The moving body sensor unit 318 is a sensor which detects a moving body present within a detection range from the image forming apparatus 101. For example, a pyroelectric sensor may be used as the moving body sensor unit 318.

The system bus 319 is connected to each of the above described elements, and transfer address signals, data signals, various control signals, and the like.

Next, a hardware configuration of the operation unit 320 will be described. As shown in FIG. 18, the operation unit 320 includes a CPU 321, a ROM 322, a RAM 323, a flash memory unit 324, a communication I/F unit 325, an operation panel unit 326, a connection I/F unit 327, an external connection I/F unit 328, a near field wireless unit 329, a camera unit 332, and a system bus 331.

The CPU 321 controls the overall operation of the operation unit 320. The CPU 321 uses the RAM 323 as a work area and executes programs stored in the ROM 322, the flash memory unit 324, or the like to control the overall operation of the operation unit 320. For example, the CPU 321 implements various functions such as displaying information (image) in response to receiving input from the user.

The ROM 322 is a non-volatile memory which stores, for example, a basic input/output system (BIOS) executed when the operation unit 320 is started and various settings. The RAM 323 is a volatile memory used as the work area of the CPU 321. The flash memory unit 324 is a non-volatile storage device which stores, for example, an operating system (OS), application programs, and various kinds of data.

The communication I/F unit 325 is a network interface which connects the operation unit 320 to the network 340 for communicating with an external device connected to the network 340.

The operation panel unit 326 receives various inputs in accordance with the user operation, and displays various kinds of information (for example, information corresponding to the received operation, information which indicates operation status of the image forming apparatus 101, setting status). Although a liquid crystal display (LCD) apparatus having a touch panel function may be used as the operation panel unit 326, the operation panel unit 326 is not limited to this. For example, an organic electro luminescence (EL) display apparatus having the touch panel function may be used as the operation panel unit 326. Moreover, an operation unit such as a hardware key and/or a display unit such as a lamp may be provided on the operation panel unit 326, additionally or alternatively.

The connection I/F unit 327 is an interface for communicating with the main body 310 via the communication channel 330. The external connection I/F unit 328 is an interface such as a USB for connecting an external device to the operation unit 320.

The near field wireless unit 329 is a near field wireless device for communicating with the wireless tag within a predetermined communication range by the near field wireless communication. For example, the near field wireless unit 329 includes the RF tag reader 103 shown in FIG. 16, and receives the predetermined information from the passive tag of the RFID, which returns a response to the radio waves transmitted from the near field wireless unit 329, or the active tag of the RFID which transmits the radio waves from own device. Further, the near field wireless unit 329 may be a near field wireless device which performs the near field wireless communication such as the BLE and the NFC.

The camera unit 332 is a capturing device to capture the image in an imaging range.

The system bus 331 is connected to each of the above described elements, and transfers address signals, data signals, various control signals, and the like.

<Functional Configuration of the Image Forming Apparatus 101>

Figure 19:
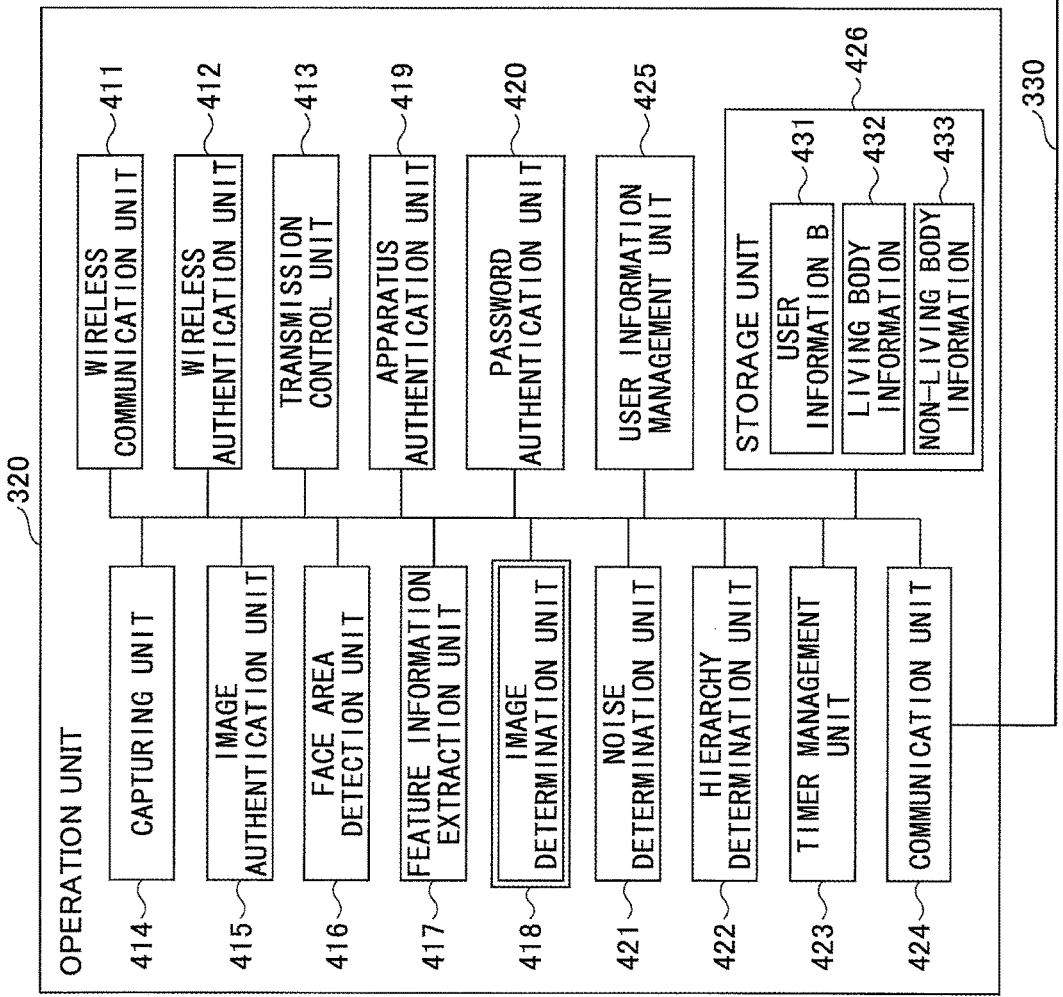
FIG. 19 is a block diagram illustrating an example of a functional configuration of the image forming apparatus according to the first embodiment.

FIG. 19 is a block diagram illustrating an example of a functional configuration of the image forming apparatus 101 according to the first embodiment. The image forming apparatus 101 executes predetermined programs by using at least one of the CPU 311 or the CPU 321 shown in FIG. 18 to implement functional elements shown in FIG. 19. It should be noted that the functional elements shown in FIG. 19 are examples. For example, at least one elements included in the operation unit 320 may be included in the main body 310, and at least one elements included in the main body 310 may be included in the operation unit 320.

<Functional Configuration of the Main Body 310>

The main body 310 of the image forming apparatus 101 includes a moving body detection unit 401, a status control unit 402, an image forming unit 403, a storage unit 404, a communication unit 405, and the like. The moving body detection unit 401 is a unit which detects a moving body (for example, a person) present around the image forming apparatus 101 by using the moving body sensor unit 318. For example the moving body detection unit 401 is realized by a program executed by the CPU 311 (or the CPU 321) shown in FIG. 18.

For example, in response to an event in which the moving body present in the detection range 253 is detected by the moving body sensor unit 318, the moving body detection unit 401 notifies the status control unit 402 of detection of the moving body.

The status control unit 402 is a unit which controls electrical power states of the operation unit 320 and the main body 310. For example the status control unit 402 is realized by a program executed by the CPU 311 (or the CPU 321) shown in FIG. 18. For example, in response to an event in which the image forming apparatus 101 has not been used for longer than a predetermined time, the status control unit 402 changes a state of the image forming apparatus 101 from a normal state, in which an image forming process can be executed, to a power saving state in which electricity consumption is lower than the normal state. In the power saving state, for example, the image forming apparatus 101 can reduce the electricity consumption by stopping functions of the operation unit 320, the engine unit 317, and the storage unit 314.

Further, for example, in response to receiving the notification of the detection of the moving body from the moving body detection unit 401 while the image forming apparatus 101 is in the power saving state, the status control unit 402 according to the first embodiment returns (changes) the state of the operation unit 320 from the power saving state to the normal state in which the normal operation can be executed. For example, the status control unit 402 can change the state of the operation unit 320 from the power saving state to the normal state by notifying the operation unit 320 of a returning instruction via the communication unit 405.

The image forming unit 403 is a unit for executing various image forming functions of the image forming apparatus 101 such as the printing function, the copying function, the scanning function, and the facsimile transmission/reception function. For example, the image forming unit 403 can be realized by the engine unit 317 shown in FIG. 18 and a program executed by the CPU 311 shown in FIG. 18.

The storage unit 404 stores various kinds of information including user information A 406 which is information of the users of the image forming apparatus 101. The user information A 406 has been registered previously. The storage unit 404 is realized, for example, by the RAM 313, the storage unit 314, and a program executed by the CPU 311 shown in FIG. 18.

The communication unit 405 is a unit for communicating with the operation unit 320. For example, the communication unit 405 is realized by the connection I/F unit 316 and a program executed by the CPU 311 shown in FIG. 18.

(Functional Configuration of the Operation Unit 320)

The operation unit 320 of the image forming apparatus 101 includes, for example, a wireless communication unit 411, a wireless authentication unit 412, a transmission control unit 413, a capturing unit 414, an image authentication unit 415, a face area detection unit 416, a feature information extraction unit 417, an image determination unit 418, an apparatus authentication unit 419, a password authentication unit 420, a noise determination unit 421, a hierarchy determination unit 422, a timer management unit 423, a communication unit 424, a user information management unit 425, a storage unit 426, and the like.

The wireless communication unit 411 is a unit which receives the predetermined information from the wireless tag by the near field wireless communication using the near field wireless unit 329 shown in FIG. 18. For example, the wireless communication unit 411 is realized by a program executed by the CPU 321 (or the CPU 311) shown in FIG. 18. For example, the wireless communication unit 411 receives, from the RFID tag 104 present within the detection area 252 of the RF tag reader 103 shown in FIG. 16, the predetermined information such as the tag ID stored in the RFID tag 104.

The wireless authentication unit 412 is a unit which authenticates the wireless tag, which has transmitted the predetermined information, based on the predetermined information received by the wireless communication unit 411 and the user information registered previously. For example, the wireless authentication unit 412 is realized by a program executed by the CPU 321 (or the CPU 311) shown in FIG. 18. The wireless authentication unit 412 authenticates the RFID tag 104 based on the tag ID of the RFID tag 104 received by the wireless communication unit 411 and the previously registered user information (for example, user information B 431 or the user information A 406).

For example, in a case in which the tag ID of the RFID tag 104 received by the wireless communication unit 411 has been registered in the user information previously, the wireless authentication unit 412 permits authentication of the RFID tag 104. Further, the wireless authentication unit 412 outputs, to the apparatus authentication unit 419, the storage unit 426 and the like, information (for example, the user number which will be described later) for identifying the user of the RFID tag 104 whose authentication is permitted.

The transmission control unit 413 is a unit which controls transmission of the radio waves by the wireless communication unit 411. For example, the transmission control unit 413 is realized by a program executed by the CPU 321 (or the CPU 311) shown in FIG. 18. The transmission control unit 413 controls (determines) whether the RF tag reader 103 shown in FIG. 16 transmits the predetermined radio waves within the detection range 252 of the RF tag reader 103.

For example, in response to an event in which the moving body detection unit 401 of the main body 310 detects a moving body within the detection range 253 of the moving body sensor unit 318, the transmission control unit 413 causes the wireless communication unit 411 to transmit the radio waves. Further, in a case in which the moving body detection unit 401 of the main body 310 does not detect a moving body around the image forming apparatus 101, the transmission control unit 413 causes the wireless communication unit 411 to stop transmitting the radio waves.

The capturing unit 414 is a unit which captures an image around the image forming apparatus 101 using, for example, the camera unit 332 shown in FIG. 18. For example, the capturing unit 414 is realized by a program executed by the CPU 321 (or the CPU 311) shown in FIG. 18. For example, the capturing unit 414 captures an image of the user present in front of the image forming apparatus 101 by capturing the image ahead of the image forming apparatus 101.

The image authentication unit 415 authenticates the user included in the image captured by the capturing unit 414 based on the image captured by the capturing unit 414 and the user information previously registered. For example, the image authentication unit 415 is realized by a program executed by the CPU 321 (or the CPU 311) shown in FIG. 18. The image authentication unit 415 executes the face authentication of the user included in the image based on the feature information of the face of the user extracted by the feature information extraction unit 417 from the image captured by the capturing unit 414 and the user information (for example, the user information B 431 or the user information A 406) registered previously.

For example, in a case in which the previously registered user information includes feature information which corresponds to the feature information of the face extracted by the feature information extraction unit 417, the image authentication unit 415 permits the authentication of the user included in the image. Further, the image authentication unit 415 outputs, to the apparatus authentication unit 419, the storage unit 426 and the like, information (for example, user information which will be described later) for identifying the user whose authentication is permitted.

It should be noted that, in the first embodiment, the image authentication unit 415 may perform the face authentication of the user using a known technique of the face authentication (the technique disclosed in Japanese Unexamined Patent Application Publication No. 2015-35178). Further, the image authentication unit 415 may use known various authentication methods to authenticate the user based on feature information about the living body of the user included in the image captured by the capturing unit 414. For example, the fingerprint authentication, the iris authentication, and the vein authentication may be used.

The face area detection unit 416 is a unit which detects the face area from the image captured by the capturing unit 414. For example, the face area detection unit 416 is realized by a program executed by the CPU 321 (or the CPU 311) shown in FIG. 18.

The feature information extraction unit 417 is a unit which extracts feature information of the face from the face image in a case in which the face image is included in the image captured by the capturing unit 414. For example, the feature information extraction unit 417 is realized by a program executed by the CPU 321 (or the CPU 311) shown in FIG. 18. The feature information of the face includes, for example, information of shapes and relative positions of parts such as an outline of the face, eyes, a nose, a chin, and cheekbones. It should be noted that the feature information of the face is an example of the feature information of the living body.

The image determination unit 418 determines whether the person included in the image captured by the capturing unit 414 is the living body (real thing) or the non-living body (photograph) based on the process for determining the real thing. In other words, the image determination unit 418 determines whether the object of the determination included in the image captured by the capturing unit 414 is the living body that satisfies the predetermined condition. For example, the image determination unit 418 includes functional elements shown in FIG. 1, and is realized by a program executed by the CPU 321 (or the CPU 311) shown in FIG. 18. For example, in a case in which the person is determined as "the real thing" based on the process for determining the real thing described in FIG. 3, 6, 8, 10, 12, or 14, the image determination unit 418 determines the person captured in the image as the living body.

The apparatus authentication unit 419 authenticates the user based on the information of the user whose authentication is permitted by the wireless authentication unit 412, the information of the user whose authentication is permitted by the image authentication unit 415, and the determination of the photograph or the real thing by the image determination unit 418. For example, the apparatus authentication unit 419 is realized by a program executed by the CPU 321 (or the CPU 311) shown in FIG. 18.

For example, in a case in which a user of the wireless tag authenticated by the wireless authentication unit 412 and a user authenticated by the image authentication unit 415 are the same user and the person captured by the image is determined as the living body that satisfies the predetermined condition, the apparatus authentication unit 419 permits the user to login. The user, who is permitted to login, can use the various image forming functions of the image forming apparatus 101.

In a preferable example, in a case in which identification information (user information) of the user of the wireless tag output from the wireless authentication unit 412 matches identification information (user information) of the user output from the image authentication unit 415, the apparatus authentication unit 419 determines the users as the same user.

It should be noted that the "case in which the identification information output from the wireless authentication unit 412 matches identification information output from the image authentication unit 415" includes not only a case in which the two pieces of identification information completely match but also a case in which the two pieces of identification information can be determined substantially as identification information of the same user. For example, in a case in which identification information of the user obtained from the image authentication unit 415 is employee ID whose number of digits is eight and identification information of the user obtained from the wireless authentication unit 412 is a login ID whose number of digits is ten in which two characters are added to the employee ID, it is determined that the two pieces of identification information match.

As described above, in a case in which the identification information of the user obtained from the wireless authentication unit 412 and the identification information of the user obtained from the image authentication unit 415 are identification information about the same user, the apparatus authentication unit 419 may determine the users as the same user.

The password authentication unit 420 is a unit which receives, for example, a password input in the operation panel unit 326 shown in FIG. 18 from the user. For example, the password authentication unit 420 is realized by a program executed by the CPU 321 (or the CPU 311) shown in FIG. 18.

The noise determination unit 421 determines whether a noise influencing the determination of the real thing is included in a group of time series camera images which the image determination unit 418 uses for the process for determining the real thing. For example, the noise may be flickering of a fluorescent lamp. The noise determination unit 421 discards (omits) images including the noise influencing the determination of the real thing by the image determination unit 418 and waits for the next image to improve accuracy of determination of the real thing. For example, the noise determination unit 421 is realized by a program executed by the CPU 321 (or the CPU 311) shown in FIG. 18.

For example, the noise determination unit 421 determines the noise based on a quantity of difference between images. For example, in two images arranged in time series, the noise determination unit 421 calculates difference of a luminance value (the absolute value) for each pixel, and calculates the sum. In a case in which the calculated sum exceeds a predetermined threshold, the noise determination unit 421 determines that the image includes the noise because the quantity of the difference of the whole image is too much.

The hierarchy determination unit 422 stratifies the process for determining the real thing executed by the image determination unit 418. To stratify denotes to determine eventually whether the obtained feature information of the living body is the image or the real thing (living body) using a plurality of discriminators. It should be noted that details of the hierarchy determination unit 422 will be described later.

The timer management unit 423 uses a timer to manage a validity period of the authentication result by the wireless authentication unit 412, a validity period of the authentication result by the image authentication unit 415, and a validity period of the determination result by the image determination unit 418. For example, the timer management unit 423 is realized by a program executed by the CPU 321 (or the CPU 311) shown in FIG. 18.

For example, in a case in which the user, who holds the wireless tag (RFID tag 104), passes in front of the image forming apparatus 101 and the wireless authentication of the user is permitted, indefinitely remaining of the authentication result may be a cause of false authentication and unfair authentication. The timer management unit 423 deletes or initializes the authentication result by the wireless authentication unit 412, the authentication result by the image authentication unit 415, and the determination result by the image determination unit 418 after a predetermined time period passes in order to reduce the false authentication and the unfair authentication.

The communication unit 424 is a unit for communicating with the main body 310. For example, the communication unit 424 is realized by the connection I/F unit 327, and a program executed by the CPU 321 (or the CPU 311) shown in FIG. 18. It should be noted that because electrical power is supplied to the operation unit 320 during the power saving state, the connection I/F unit 327 can receive the returning instruction transmitted from the main body 310.

The user information management unit 425 is a unit which manages the user information B 431 stored in the storage unit 426. For example, the user information management unit 425 is realized by a program executed by the CPU 321 (or the CPU 311) shown in FIG. 18.

The storage unit 426 is a unit which stores, for example, the user information B 431, living body information 432 and non-living body information 433. The living body information 432 and the non-living body information 433 are used by the hierarchy determination unit 422. For example, the storage unit 426 is realized by the flash memory unit 324, the RAM 323 and a program executed by the CPU 321 shown in FIG. 18.

It should be noted that 426 may store the person area movement dictionary 22 and the face area movement dictionary 23 shown in FIG. 1, which the image determination unit 418 includes.

(User Information)

In the following, an example of the user information B 431 will be described. FIG. 20 is an example of a database of the user information according to the first embodiment. The user information B 431 is an example of the user information which has been registered previously. In the example shown in FIG. 20, the user information B 431 includes information such as "USER NUMBER", "NAME", "MAIL ADDRESS", "LOGIN ID", "LOGIN PASSWORD", "WIRELESS TAG ID", "FEATURE INFORMATION OF FACE", and the like.

The "USER NUMBER" is, for example, a unique identification number (identification information) numbered for data of each of the users such as a serial number numbered when the information of each of the users was registered in the user information B 431. The "USER NUMBER" is an example of identification information for identifying the user. The "USER NUMBER" may be, for example, ID of the user such as the employee ID.

The "NAME" is information of a name of the user. The "MAIL ADDRESS" is information of a mail address of the user. The "LOGIN ID" and the "LOGIN PASSWORD" are examples of authentication information used by the user for logging into the image forming apparatus 101.

The "WIRELESS TAG ID" is information of the tag ID (identification information) transmitted from the RFID tag 104 held by the each of the users. For example, the "WIRELESS TAG ID" is indicated by a 4 digit number. It should be noted that the "WIRELESS TAG ID" is an example of the predetermined information transmitted from the wireless tag. The predetermined information may include information such as identification information of the user other than information of numerals.

The "FEATURE INFORMATION OF FACE" is feature information about the face of each of the users of the image forming apparatus 101 previously obtained and stored. The "FEATURE INFORMATION OF FACE" may be information of shapes and relative positions of parts such as an outline of the face, eyes, a nose, a chin, and cheekbones. It should be noted that a data format of the feature information of the user shown in FIG. 20 is an example. An arbitrary data format may be used. Further, the "FEATURE INFORMATION OF FACE" is an example of feature information of the living body.

The storage unit 426 of the operation unit 320 can store the user information B 431 as shown in FIG. 20, for example, 300 to 1800 cases. For example, the user information management unit 425 of the operation unit 320 stores at least part of the user information A 406, which is stored in the storage unit 404 of the main body 310, in the storage unit 426 of the operation unit 320 as the user information B 431. In this way, by using the user information B 431 stored in the storage unit 426 of the operation unit 320, the wireless authentication unit 412, the image authentication unit 415, the password authentication unit 420, and the like can perform the authentication faster than using the user information A 406 stored in the storage unit 404 of the main body 310. For example, the storage unit 426 of the operation unit 320 can read out data before the storage unit 314 (such as the HDD) which constructs the storage unit 404 of the main body 310 starts.

<Flow of a Process>

Subsequently, a flow of a process of an information processing method by the image forming apparatus (information processing apparatus) 101 will be described.

(Process of the Wireless Authentication)

Figure 21:
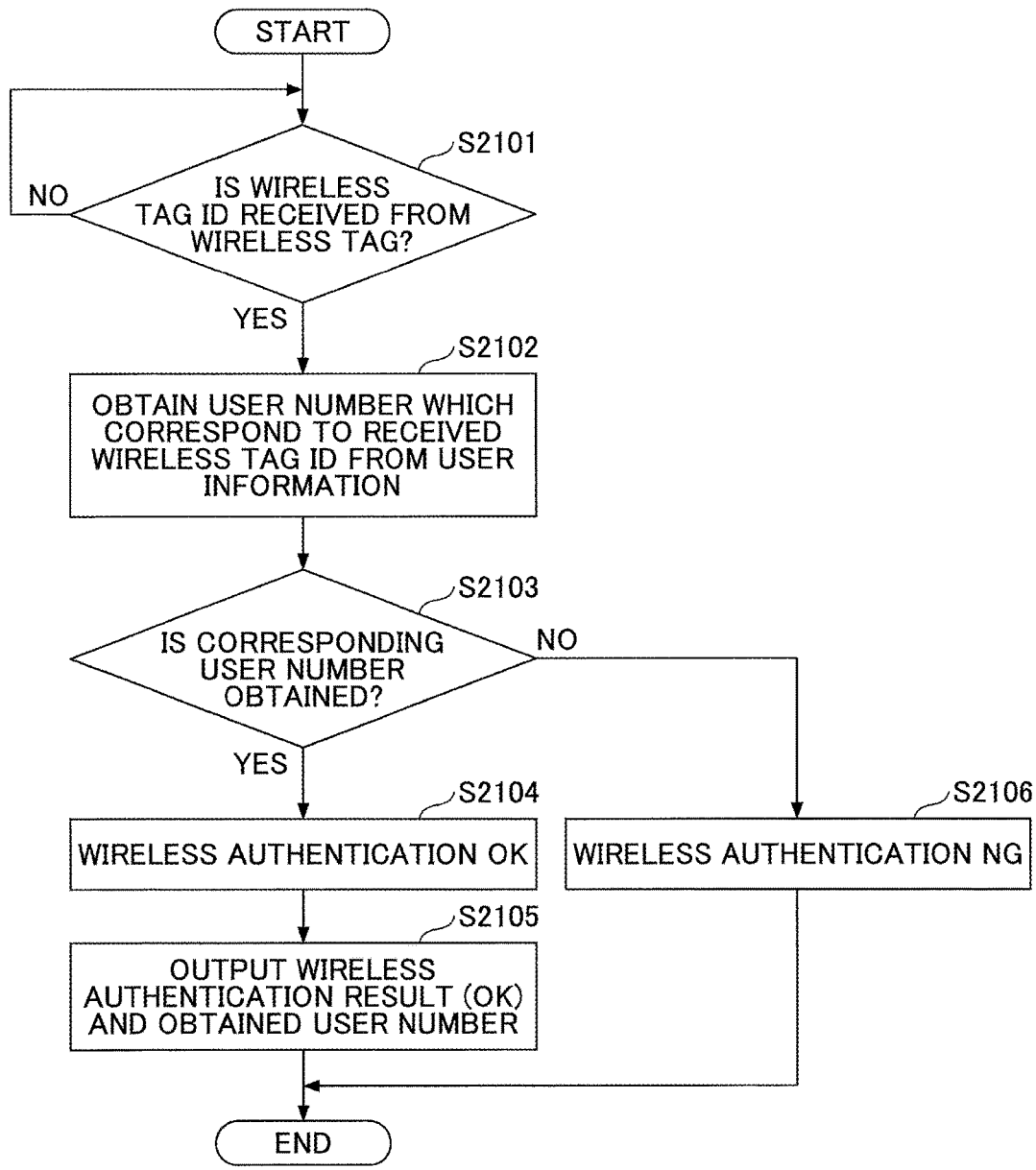
FIG. 21 is a flowchart illustrating an example of a process of wireless authentication according to the first embodiment.

FIG. 21 is a flowchart illustrating an example of a process of the wireless authentication according to the first embodiment.

When the wireless communication unit 411 receives the wireless tag ID (example of the predetermined information) from the wireless tag (the RFID tag 104) in step S2101, the wireless authentication unit 412 executes the process subsequent to step S2102.

In step S2102, the wireless authentication unit 412 refers to the user information (the user information B 431, the user information A 406) to obtain the user number which corresponds to the wireless tag ID received by the wireless communication unit 411. For example, in the user information B 431 shown in FIG. 20, in a case in which the wireless tag ID, received by the wireless communication unit 411, is "00522213", the wireless authentication unit 412 obtains the user number "0001" which corresponds to the wireless tag ID "00522213".

In step S2103, the process branches based on whether the user number, which corresponds to the wireless tag ID received by the wireless communication unit 411, can be obtained from the user information (the user information B 431, the user information A 406).

In a case in which the corresponding user number cannot be obtained (NO in step S2103), the process goes to step S2106 and the wireless authentication unit 412 determines not to permit the wireless authentication (wireless authentication NG), and ends the process. On the other hand, in a case in which the corresponding user number can be obtained (YES in step S2103), the process goes to step S2104.

In step S2104, the wireless authentication unit 412 determines to permit the wireless authentication (wireless authentication OK).

In step S2105, the wireless authentication unit 412 outputs, to the apparatus authentication unit 419, the storage unit 426, and the like, the result of the wireless authentication (OK), which indicates that the wireless authentication is permitted, and the user number which corresponds to the wireless tag ID obtained from the user information.

According to the above described process, in a case in which the user, who corresponds to the wireless tag ID received by the wireless communication unit 411, has been registered in the user information, the wireless authentication unit 412 permits the wireless authentication and outputs the user number of the user whose wireless authentication is permitted. It should be noted that the user number is an example of information for identifying the user. For example, other information such as the employee ID and the mail address may be used.

(Process of the Image Authentication)

Figure 22:
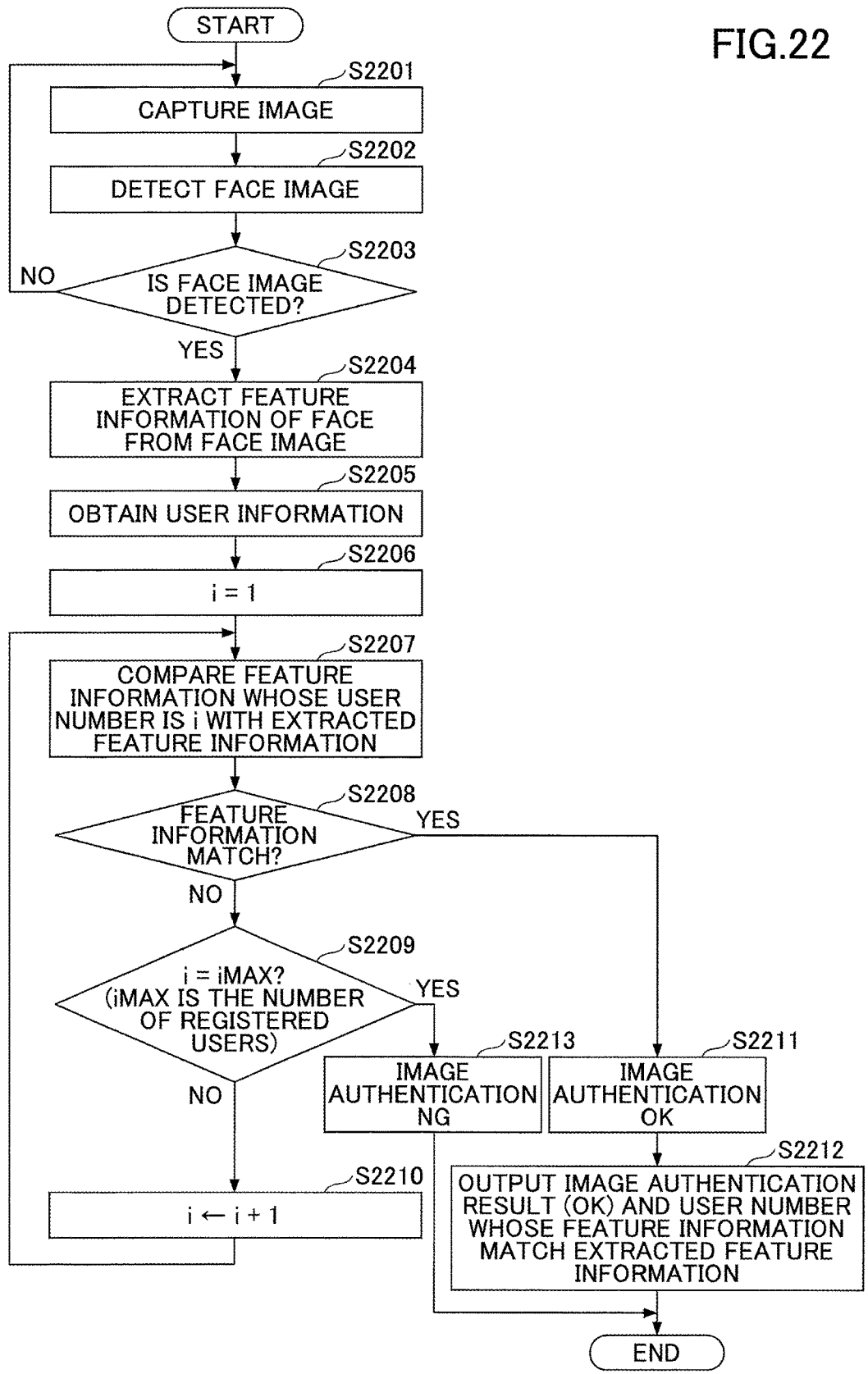
FIG. 22 is a flowchart illustrating an example of a process of image authentication according to the first embodiment.
Figure 23A:
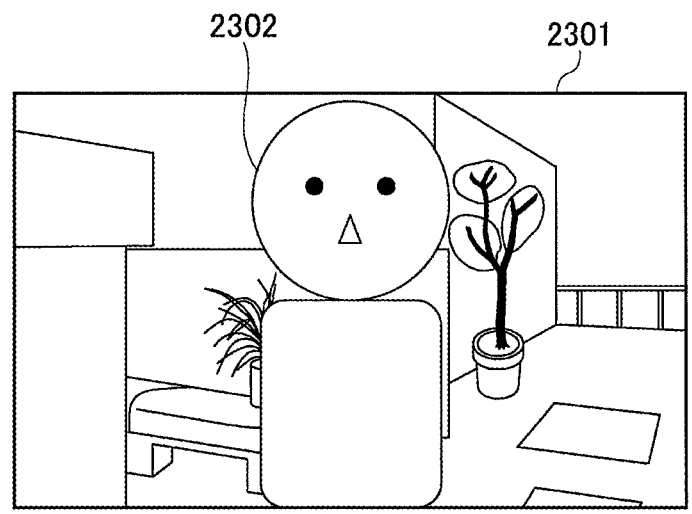
FIGS. 23A and 23B are drawings that depict extraction of the face image according to the first embodiment.
Figure 23B:
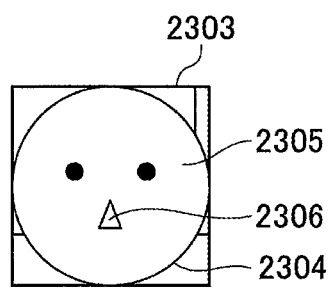

FIG. 22 is a flowchart illustrating an example of a process of the image authentication according to the first embodiment. FIGS. 23A and 23B are drawings that depict extraction of the face image according to the first embodiment.

In step S2201, the capturing unit 414 uses the camera unit 332 to capture the image. FIG. 23A shows an example of the image captured at this time.

In a captured image 2301 shown in FIG. 23A, a user 2302 present in front of the image forming apparatus 101 is captured. In this way, the camera unit 332 is arranged such that the user 2302 present in front of the image forming apparatus 101 is included in the captured image 2301.

In step S2202, the face area detection unit 416 detects an image of a face area (in the following, referred to as the "face image") from the image captured in step S2201. FIG. 23B shows an example of the face image detected at this time. For example, using a known pattern matching technology or like, the face area detection unit 416 extracts, from the captured image 2301 captured by the camera unit 332, an outline 2304 of the face of the user, eyes 2305, a nose 2306, and the like to detect a face image 2303 of the user.

In step S2203, the image authentication unit 415 determines whether the face image is detected. In a case in which the face image is not detected (NO in step S2203), the process returns to step S2201 and the image authentication unit 415 repeat the same process. On the other hand, in a case in which the face image is detected (YES in step S2203), the process goes to step S2204.

In step S2204, the feature information extraction unit 417 extracts feature information of the face from the face image 2303 detected in step S2202. For example, the feature information extraction unit 417 extracts, from the face image 2303, information of shapes and relative positions of parts such as an outline of the face, eyes, a nose, a chin, and cheekbones.

In step S2205, the image authentication unit 415 obtains the user information. For example, the image authentication unit 415 obtains the user information B 431 stored in the storage unit 426.

In steps S2206 to S2210, the image authentication unit 415 perform face authentication by collating the feature information of the face extracted in step S2204 with each of "FEATURE INFORMATION OF FACE" included in the user information obtained in step S2205.

For example, in step S2206, "i" (i is an integer of one or more) is initialized to "1".

In step S2207, the image authentication unit 415 compares the feature information of the face extracted in step S2204 with the "FEATURE INFORMATION OF FACE" which corresponds to the user number "i" of the user information. In step S2208, the image authentication unit 415 determines whether the feature information of the face extracted in step S2204 matches the "FEATURE INFORMATION OF FACE" which corresponds to the user number "i" of the user information.

it should be noted that a case in which two pieces of feature information of the face match includes not only a case in which the two pieces of feature information match completely but also a case in which degree of similarity between the two pieces of feature information is equal to or greater than a predetermined threshold.

In a case in which the feature information of the face does not matches the "FEATURE INFORMATION OF FACE" (NO in step S2208), the process goes to step S2209. On the other hand, in a case in which the feature information of the face matches the "FEATURE INFORMATION OF FACE" (YES in step S2208), the process goes to step S2211.

In step S2209, the image authentication unit 415 determines whether the "i" reaches the maximum user number (iMAX) registered in the user information. In a case in which the "i" does not reach the "iMAX" (NO in step S2209), the image authentication unit 415 increments the "i" by one in step S2210, and the process returns to step S2207. On the other hand, in a case in which the "i" reaches the "iMAX" (YES in step S2209), the image authentication unit 415 determines that the image authentication has failed (image authentication NG) in step S2213, and ends the process.

On the other hand, in step S2211, the image authentication unit 415 determines that the image authentication has succeeded (image authentication OK). Further, in step S2212, the image authentication unit 415 outputs, to the apparatus authentication unit 419, the storage unit 426 and the like, the result of the image authentication (OK), which indicates that the image authentication is permitted, and the user number of the user whose feature information of the face matches the detected face image.

According to the above described process, in a case in which the feature information of the face of the user included in the image captured by the capturing unit 414 has been registered in the user information, the image authentication unit 415 permits the image authentication and outputs the user number of the user whose image authentication is permitted.

(Process of the Image Determination)

Figure 24:
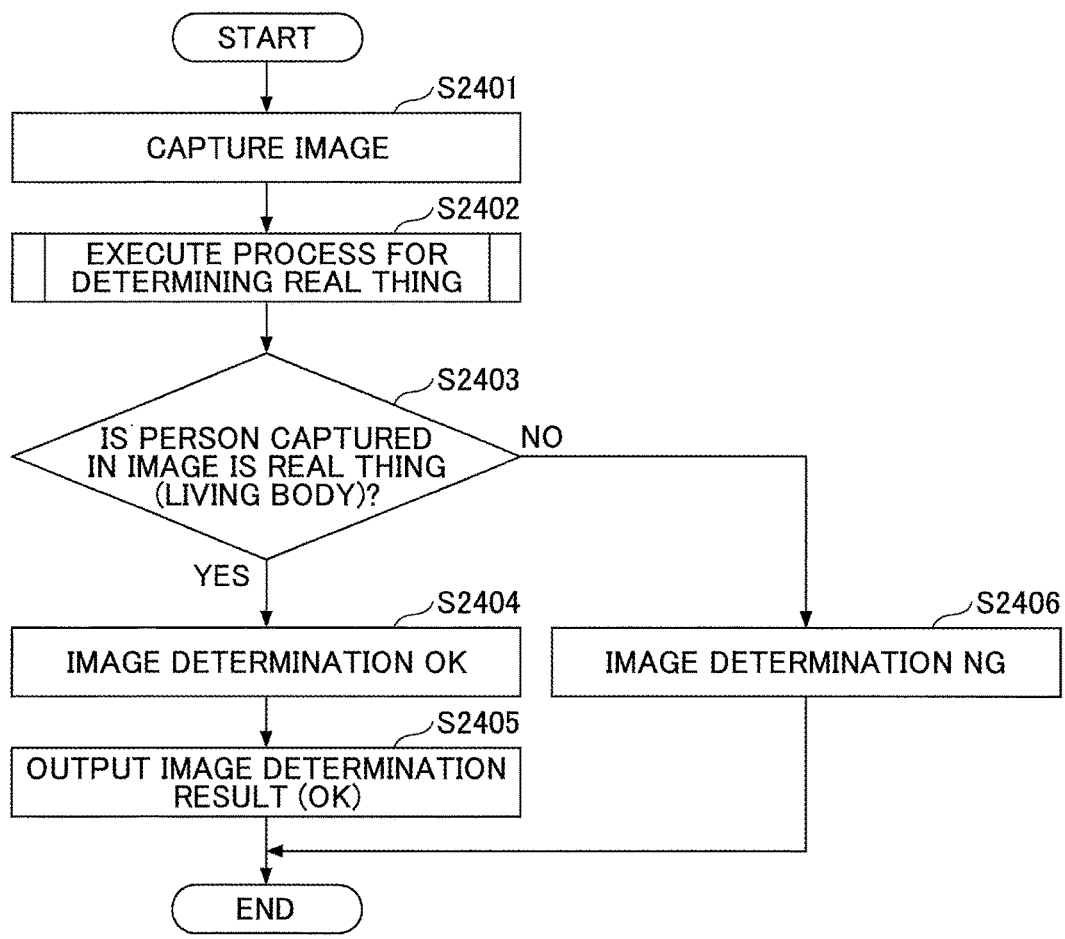
FIG. 24 is a flowchart illustrating an example of a process of image determination according to the first embodiment.

FIG. 24 is a flowchart illustrating an example of a process of the image determination according to the first embodiment.

In step S2401, the capturing unit 414 uses the camera unit 332 to capture the image.

In step S2402, the image determination unit 418 executes the process for determining the real thing which is described in FIG. 3, 6, 8, 10, 12 or 14.

In step S2403, the process branches based on a result of the process for determining, executed in step S2402, whether the person included in the image is the real thing (living body) or the photograph (non-living body).

In a case in which the person is determined as the photograph (non-living body) (NO in step S2403) based on the process for determining the real thing in step S2402, the process goes to step S2406, and the image determination unit 418 determines that the person included in the image is not a living body (image determination NG) and ends the process.

On the other hand, in a case in which the person is determined as the real thing (living body) (YES in step S2403), the process goes to step S2404.

In step S2404, the image determination unit 418 determines that the person included in the image is the living body (image determination OK). In step S2405, the image determination unit 418 outputs the result of the image determination (OK) to the apparatus authentication unit 419, the storage unit 426, and the like.

According to the above described process, in a case in which the person included in the image captured by the capturing unit 414 is determined as the "living body", the image determination unit 418 outputs the result of the image determination (OK).

(Authentication Process of the Image Forming Apparatus 101)

Figure 25:
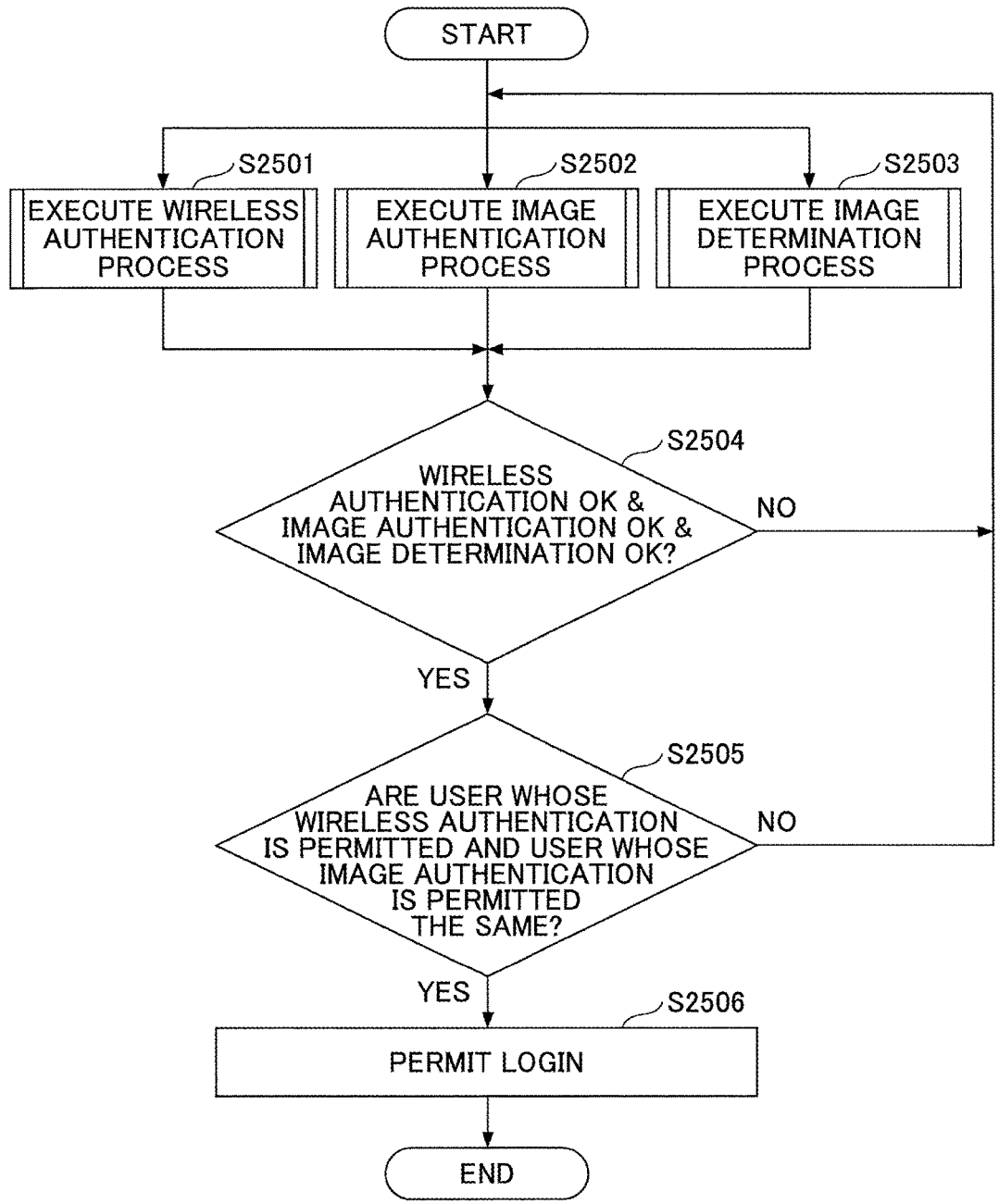
FIG. 25 is a flowchart illustrating an example of a process of apparatus authentication according to the first embodiment.

FIG. 25 is a flowchart illustrating an example of a process of apparatus authentication according to the first embodiment. The image forming apparatus 101 starts the authentication process shown in FIG. 25, for example, when the moving body detection unit 401 detects the moving body and the status control unit 402 changes the state of the apparatus to the normal state.

When the authentication process starts, the wireless authentication unit 412 executes the process of the wireless authentication shown in FIG. 21 in step S2501, the image authentication unit 415 executes the process of the image authentication shown in FIG. 22 in step S2502. Further, the image determination unit 418 executes the process of the image determination shown in FIG. 24 in step S2503.

In step 2504, the apparatus authentication unit 419 determines whether the result of the wireless authentication by the wireless authentication unit 412 is "OK", the result of the image authentication by the image authentication unit 415 is "OK", and the result of the image determination by the image determination unit 418 is "OK".

In a case in which the wireless authentication is "OK", the image authentication is "OK", and the image determination is "OK" (YES in step S2504, that is, all of the results are OK), the process goes to step S2505. On the other hand, if at least one of the wireless authentication, the image authentication, and the image determination are not "OK", the apparatus authentication unit 419 returns the process to step S2501 to S2503. Further the apparatus authentication unit 419 waits until the wireless authentication becomes "OK", the image authentication becomes "OK", and the image determination becomes "OK".

In step S2505, the apparatus authentication unit 419 determines whether the user of the wireless tag, whose wireless authentication is permitted, and the user whose image authentication is permitted are the same. For example, the apparatus authentication unit 419 determines whether the user number output from the wireless authentication unit 412 matches the user number output from the image authentication unit 415. It should be noted that in a case in which a plurality of user numbers are output from the wireless authentication unit 412 or a plurality of user numbers are output from the image authentication unit 415, the apparatus authentication unit 419 determines that the user of the wireless tag, whose wireless authentication is permitted, and the user whose image authentication is permitted are the same when at least one of the user numbers are matched.

In a case in which the apparatus authentication unit 419 determines that the user of the wireless tag, whose wireless authentication is permitted, and the user, whose image authentication is permitted, are not the same (NO in step S2505), the apparatus authentication unit 419 returns the process to step S2501 to S2503. Further the apparatus authentication unit 419 waits until the user of the wireless tag, whose wireless authentication is permitted, and the user, whose image authentication is permitted, become the same.

On the other hand, in a case in which the apparatus authentication unit 419 determines that the user of the wireless tag, whose wireless authentication is permitted, and the user, whose image authentication is permitted, are the same (YES in step S2505), the apparatus authentication unit 419 permits the user to login in step S2506. In other words, the apparatus authentication unit 419 permits the user to use the image forming apparatus 101.

According to the above described process, in a case in which the user of the wireless tag, whose wireless authentication is permitted, and the user, whose image authentication is permitted, are the same, and the person captured in the image is determined as the living body, the apparatus authentication unit 419 permits the user to use the image forming apparatus 101.

As described above, according to the image forming apparatus 101 of the first embodiment, in the information processing apparatus for authenticating the user based on the captured image such as the face authentication, the impersonation with the non-living body such as the photograph can be prevented and the accuracy in authenticating the user can be improved.

It should be noted that the above described configuration and the processes of the first embodiment are examples, and various variations and modifications may be made. Subsequently, variations of the first embodiment will be described.

<A First Variation>

Figure 26:
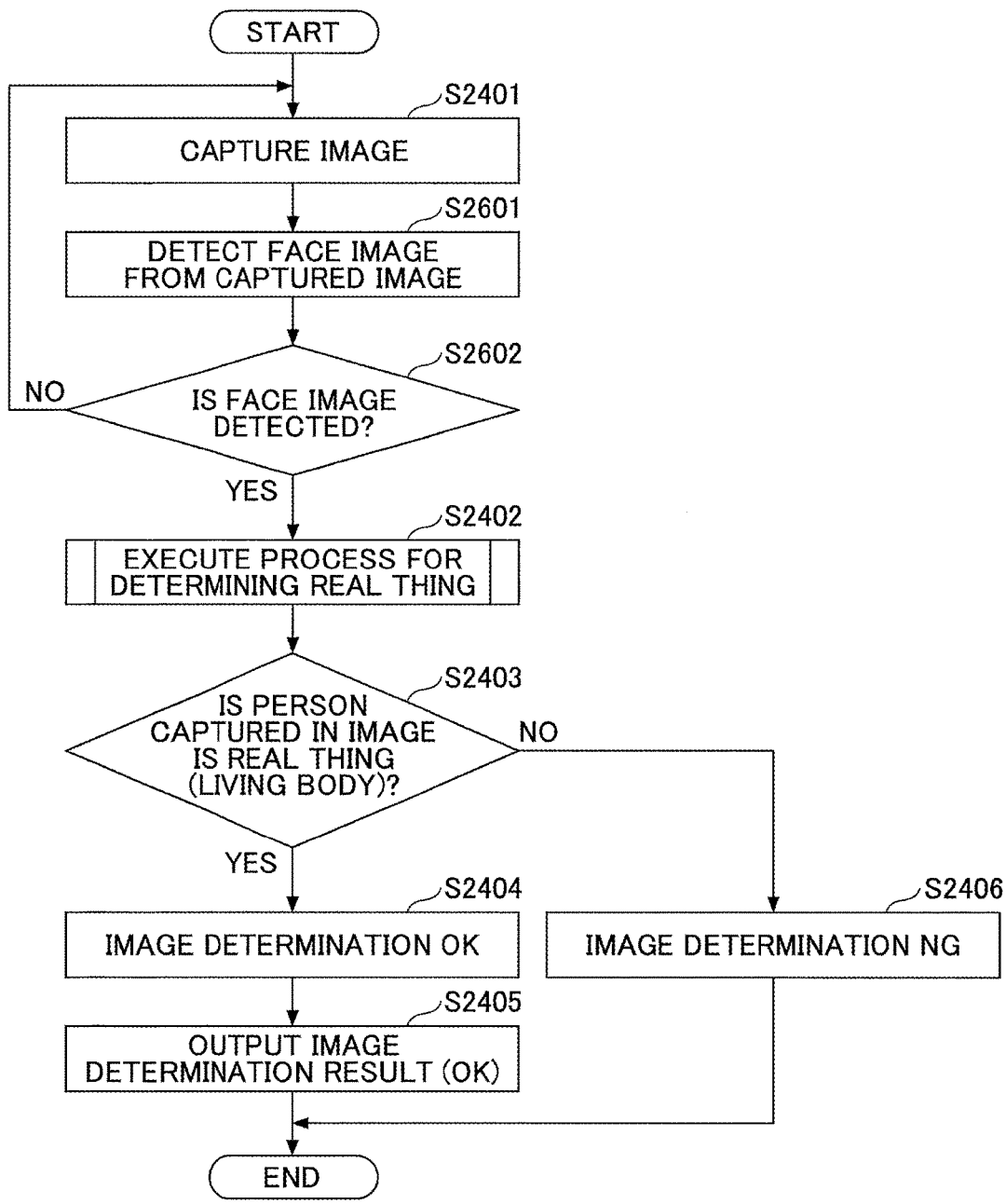
FIG. 26 is a flowchart illustrating an example of a process of the image determination according to a first variation of the first embodiment.

FIG. 26 is a flowchart illustrating an example of a process of the image determination according to a first variation of the first embodiment.

It should be noted that because the process in steps S2401, and S2402 to S2406 shown in FIG. 26 is similar to the process of the image determination shown in FIG. 24, its difference will be described mainly.

When the capturing unit 414 uses the camera unit 332 to capture the image in step S2401, the face area detection unit 416 of the image forming apparatus 101 detects the face image from the captured image in step S2601. It should be noted that the process for detecting the face image may be similar to the process in step S2202 in FIG. 22.

In step S2602, the image determination unit 418 of the image forming apparatus 101 determines whether the face image is detected from the captured image.

In a case in which the face image is not detected from the captured image (NO in step S2602), the process returns to step S2401 and the image forming apparatus 101 repeats the same process. On the other hand, in a case in which the face image is detected from the captured image (YES in step S2602), the process goes to step S2402 and the image forming apparatus 101 executes the process for determining the real thing.

According to the above described process, because the process for determining the real thing is not executed when the face is not included in the captured image, load on the image forming apparatus 101 can be reduced.

<Second Variation>

Figure 27:
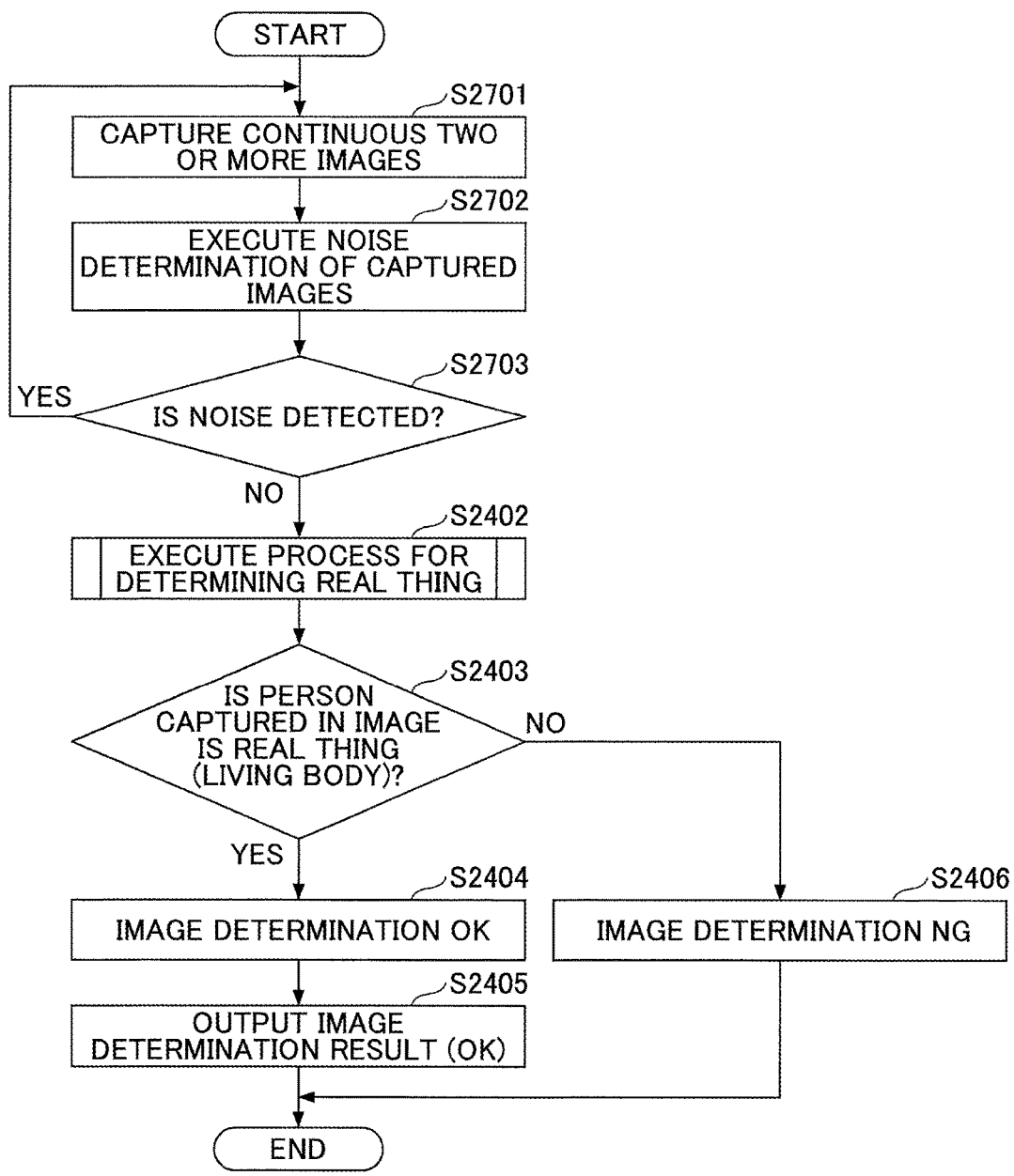
FIG. 27 is a flowchart illustrating an example of a process of the image determination according to a second variation of the first embodiment.

FIG. 27 is a flowchart illustrating an example of a process of the image determination according to a second variation of the first embodiment. It should be noted that because the process in steps S2402 to S2406 shown in FIG. 27 is similar to the process of the image determination shown in FIG. 24, its difference will be described mainly.

In step S2701, the capturing unit 414 uses the camera unit 332 to capture two or more images continuous in time series.

In step S2702, the noise determination unit 421 of the image forming apparatus 101 executes noise determination of the images captured in step S2701. It should be noted that in the noise determination, determining whether noise is present may be executed, as described above, for example, by calculating the absolute value of difference of a luminance value of each pixel between the two images continuous in time series and determining whether the sum total of the values is equal to or greater than a threshold.

In step S2703, the process branches based on the noise determination whether the noise is detected in step S2702.

In a case in which the noise is detected from the captured image (YES in step S2703), the image forming apparatus 101 repeats the same process. On the other hand, in a case in which the noise is not detected from the captured image (NO in step S2703), the process goes to step S2402 and the image forming apparatus 101 executes the process for determining the real thing.

According to the above described process, in a case in which the noise is included in the captured image, the image forming apparatus 101 executes the process for determining the real thing while omitting the image including the noise. In this way, the image forming apparatus 101 can reduce the load on the image forming apparatus 101 and the false determination.

<Third Variation>

Figure 28:
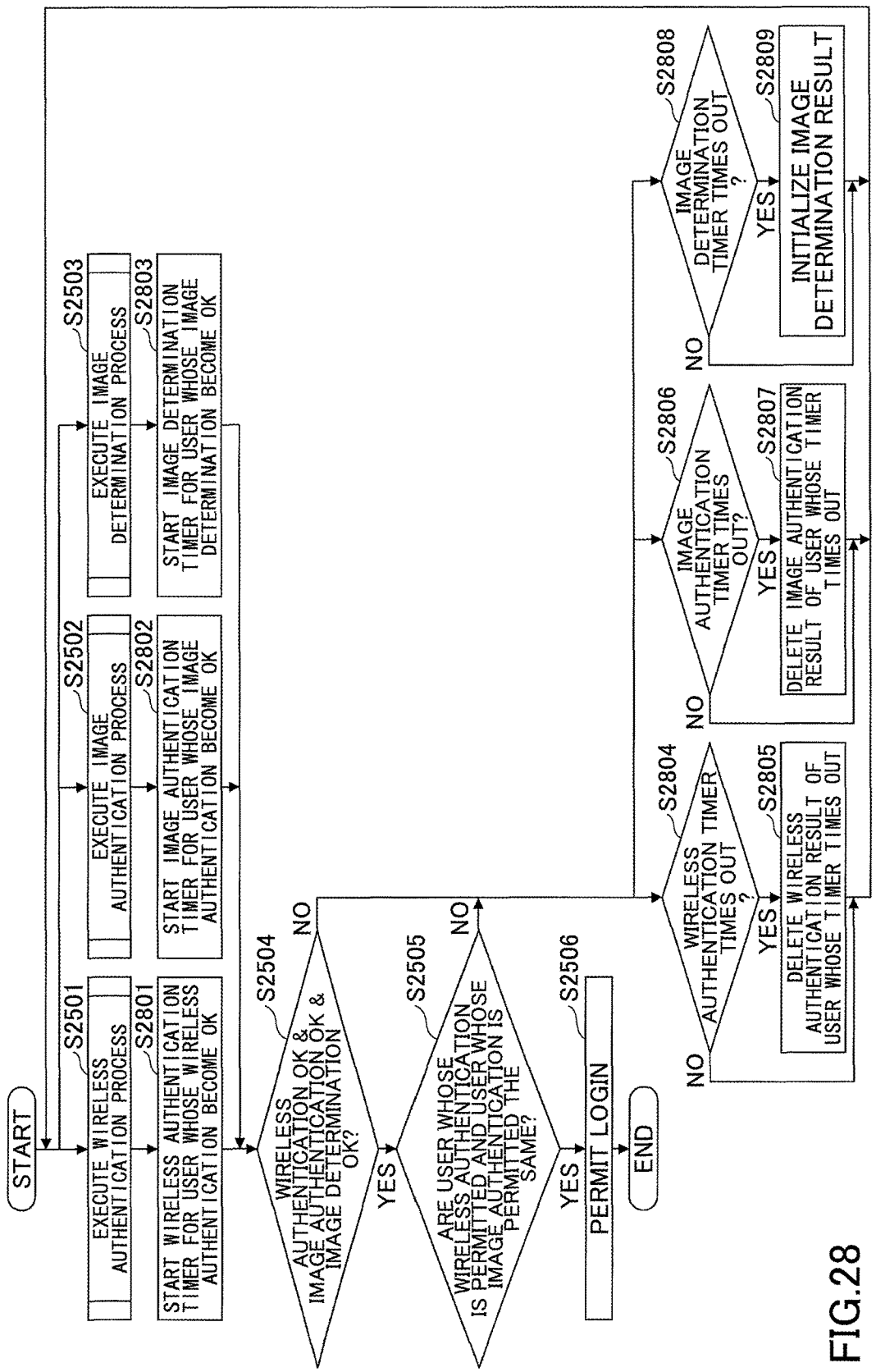
FIG. 28 is a flowchart illustrating an example of a timeout process of the process of the apparatus authentication according to a third variation of the first embodiment.

FIG. 28 is a flowchart illustrating an example of a timeout process of the process of the apparatus authentication according to a third variation of the first embodiment. For example, there is a case in which when a user, who holds the wireless tag, passes near the image forming apparatus 101 and wireless authentication is permitted, the result of the wireless authentication (OK) remains. It is preferable to delete such the information after predetermined time passes. In the third variation, an example will be described in which result information of the wireless authentication, the image authentication, and the image determination is deleted or initialized after the predetermined time passes.

It should be noted that because the process in steps S2501 to S2503, and S2504 to S2506 shown in FIG. 28 is similar to the process of the apparatus authentication shown in FIG. 25, its difference will be described mainly.

In step S2801, the timer management unit 423 of the image forming apparatus 101 starts a wireless authentication timer for the user whose wireless authentication becomes permitted (OK) in step S2501. It should be noted that the wireless authentication timer is a timer which starts when the wireless authentication becomes permitted (OK) and indicates validity period of the result of the wireless authentication (for example, 5 minutes). The wireless authentication timer is managed for each of the users whose wireless authentication is permitted.

Similarly, in step S2802, the timer management unit 423 starts an image authentication timer for the user whose image authentication becomes permitted (OK) in step S2502. It should be noted that the image authentication timer is a timer which starts when the image authentication becomes permitted (OK) and indicates validity period of the result of the image authentication (for example, 5 minutes). The image authentication timer is managed for each of the users whose image authentication is permitted.

Further, in step S2803, the timer management unit 423 starts an image determination timer for the user whose image determination becomes permitted (OK) in step S2503. It should be noted that the image determination timer is a timer which starts when the image determination becomes permitted (OK) and indicates validity period of the result of the image determination (for example, 3 minutes).

In step S2804, the timer management unit 423 determines whether the wireless authentication timer times out for each of the users whose wireless authentication is permitted. In a case in which at least one of the user's wireless authentication timers time out (YES in step S2804), the timer management unit 423 invalidates in step S2805 the result of the wireless authentication (OK) of the user whose wireless authentication timer times out. For example, the timer management unit 423 deletes the corresponding result of the wireless authentication.

In step S2806, the timer management unit 423 determines whether the image authentication timer times out for each of the users whose image authentication is permitted. In a case in which at least one of the user's image authentication timers time out (YES in step S2806), the timer management unit 423 invalidates in step S2807 the result of the image authentication (OK) of the user whose image authentication timer times out. For example, the timer management unit 423 deletes the corresponding result of the image authentication.

In step S2808, the timer management unit 423 determines whether the image determination timer times out. In a case in which the image determination timer times out (YES in step S2808), the timer management unit 423 invalidates in step S2809 the result of the image determination. For example, the timer management unit 423 deletes or initializes the corresponding result of the image determination.

According to the above described process, the process results of the wireless authentication, the image authentication, and the image determination are invalidated (deleted or initialized) when the predetermined time passes. In this way, the image forming apparatus 101 can reduce unnecessary information stored in a storage area which stores the authentication results and the determination result, and reduce the false authentication and the unfair authentication.

<Fourth Variation>

For example, when the user wears a mask or sunglasses, it is difficult to pass the image authentication such as the face authentication. Further, when the user does not carry the wireless tag, the user cannot pass the wireless authentication. In the fourth variation, an example will be described in which the image forming apparatus 101 uses an alternative authentication unit such as the password authentication unit 420.

Figure 29:
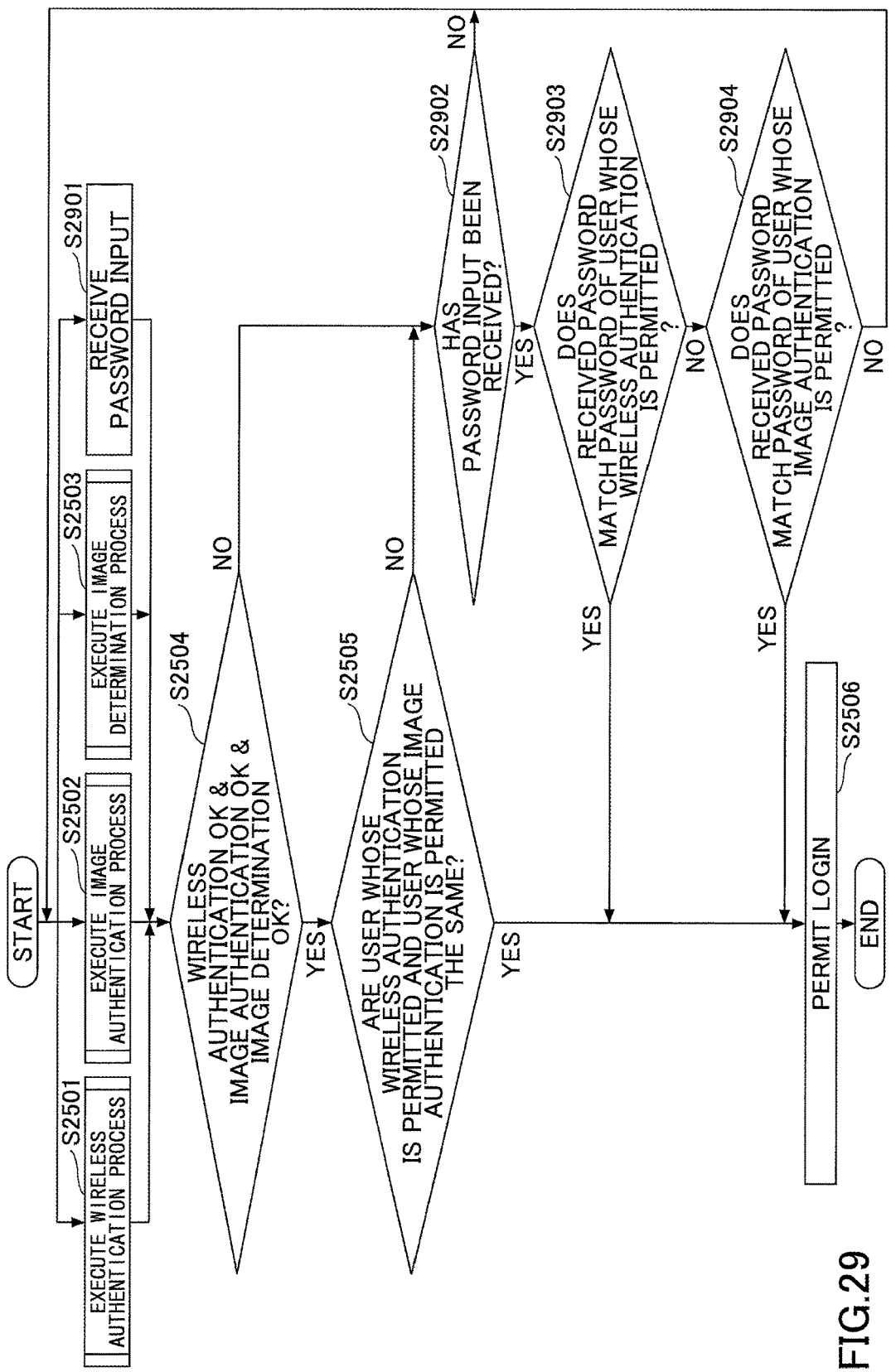
FIG. 29 is a flowchart illustrating an example of an alternative process of the apparatus authentication according to a fourth variation of the first embodiment.

FIG. 29 is a flowchart illustrating an example of an alternative process of the apparatus authentication according to a fourth variation of the first embodiment. It should be noted that because the process in steps S2501 to S2506 shown in FIG. 29 is similar to the process of the apparatus authentication shown in FIG. 25, its difference will be described mainly.

In step S2901, for example, the password authentication unit 420 of the image forming apparatus 101 displays, in the operation panel unit 326 shown in FIG. 18, a screen for inputting the password in order to receive input of the password from the user.

In step S2902, the apparatus authentication unit 419 of the image forming apparatus 101 determines whether the input of the password has been received in step S2901. In a case in which the input of the password has not been received (NO in step S2902), the process returns to steps S2501 to S2503, and S2901. On the other hand, in a case in which the input of the password has been received (YES in step S2902), the process goes to step S2903.

In step S2903, the apparatus authentication unit 419 determines whether the password, which has been received, matches the password of the user whose wireless authentication is permitted (OK).

In a case in which the received password matches the password of the user whose wireless authentication is permitted (YES in step S2903), the process goes to step S2506 and the apparatus authentication unit 419 permits the user to use the image forming apparatus 101.

On the other hand, in a case in which the received password does not match the password of the user whose wireless authentication is permitted (NO in step S2903), the process goes to step S2904.

In step S2904, the apparatus authentication unit 419 determines whether the password, which has been received, matches the password of the user whose image authentication is permitted (OK).

In a case in which the received password matches the password of the user whose image authentication is permitted (YES in step S2904), the process goes to step S2506 and the apparatus authentication unit 419 permits the user to use the image forming apparatus 101.

On the other hand, in a case in which the received password does not match the password of the user whose image authentication is permitted (NO in step S2904), the process returns to steps S2501 to S2503, and S2901.

According to the above described process, even if the user of the image forming apparatus 101 cannot use the wireless authentication or the image authentication, the user can use the image forming apparatus 101 by being authenticated by the other authentication unit such as the password authentication unit 420.

<Fifth Variation>

Figure 30:
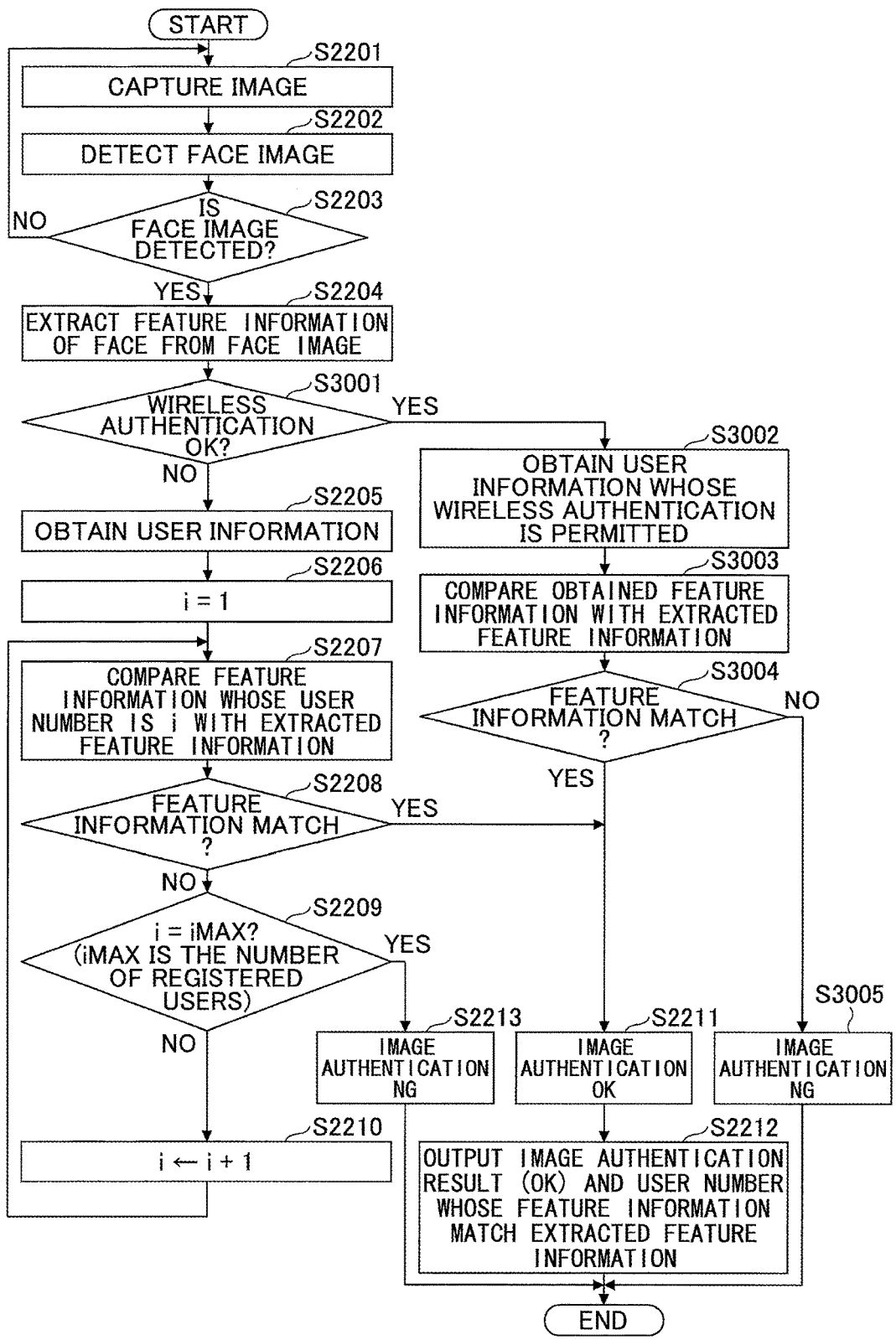
FIG. 30 is a flowchart illustrating an example of a process of the image authentication according to a fifth variation of the first embodiment.

FIG. 30 is a flowchart illustrating an example of a process of the image authentication according to the fifth variation of the first embodiment.

In the process of the image authentication shown in FIG. 22, the example has been described in which the image authentication unit 415 performs the image authentication by sequentially comparing the feature information of the face extracted from the captured image with the feature information of the faces of the users registered in the user information. In the fifth variation, in a case in which there is a user whose wireless authentication has been permitted already, image authentication is performed by comparing the feature information of the face extracted from the captured image with feature information of the face of the user whose wireless authentication is permitted. It should be noted that because the process in steps S2201 to S2204 and steps S2205 to S2213 shown in FIG. 30 is similar to the process of the image authentication shown in FIG. 22, its difference will be described mainly.

In the fifth variation, after extracting the feature information of the face from the face image in step S2204, the image authentication unit 415 determines in step S3001 whether there is a user whose wireless authentication is permitted (OK).

In a case in which the user, whose wireless authentication is permitted, is not present (NO in step S3001), the process goes to step S2205 and the image authentication unit 415 executes the process similar to the process shown in FIG. 22. On the other hand, in a case in which the user, whose wireless authentication is permitted, is present (YES in step S3001), the process goes to step S3002.

In step S3002, the image authentication unit 415 obtains the user information including feature information of the user whose wireless authentication is permitted.

In step S3003, the image authentication unit 415 compares the feature information of the face extracted in step S2204 with the feature information, obtained in step S3002, of the face of the user whose wireless authentication is permitted.

In step S3004, the image authentication unit 415 determines whether the feature information of the face extracted in step S2204 matches the feature information, obtained in step S3002, of the face of the user whose wireless authentication is permitted. It should be noted that a case in which two pieces of feature information of the face match includes not only a case in which the two pieces of feature information match completely but also a case in which degree of similarity between the two pieces of feature information is equal to or greater than the predetermined threshold.

In a case in which the feature information of the face extracted in step S2204 does not match the feature information of the face obtained in step S3002 (NO in step S3004), the process goes to step S3005. On the other hand, in a case in which the feature information of the face extracted in step S2204 matches the feature information of the face obtained in step S3002 (YES in step S3004), the process goes to step S2211 and the image authentication unit 415 executes the process of steps S2211 and S2212.

In step S3005, the image authentication unit 415 determines that the image authentication has failed (image authentication NG), and ends the process.

According to the above described process, because the number of users whose feature information are compared can be reduced if the user whose wireless authentication is permitted is present, processing load on the image forming apparatus 101 can be reduced and processing speed can be increased.

<Sixth Variation>

Figure 31:
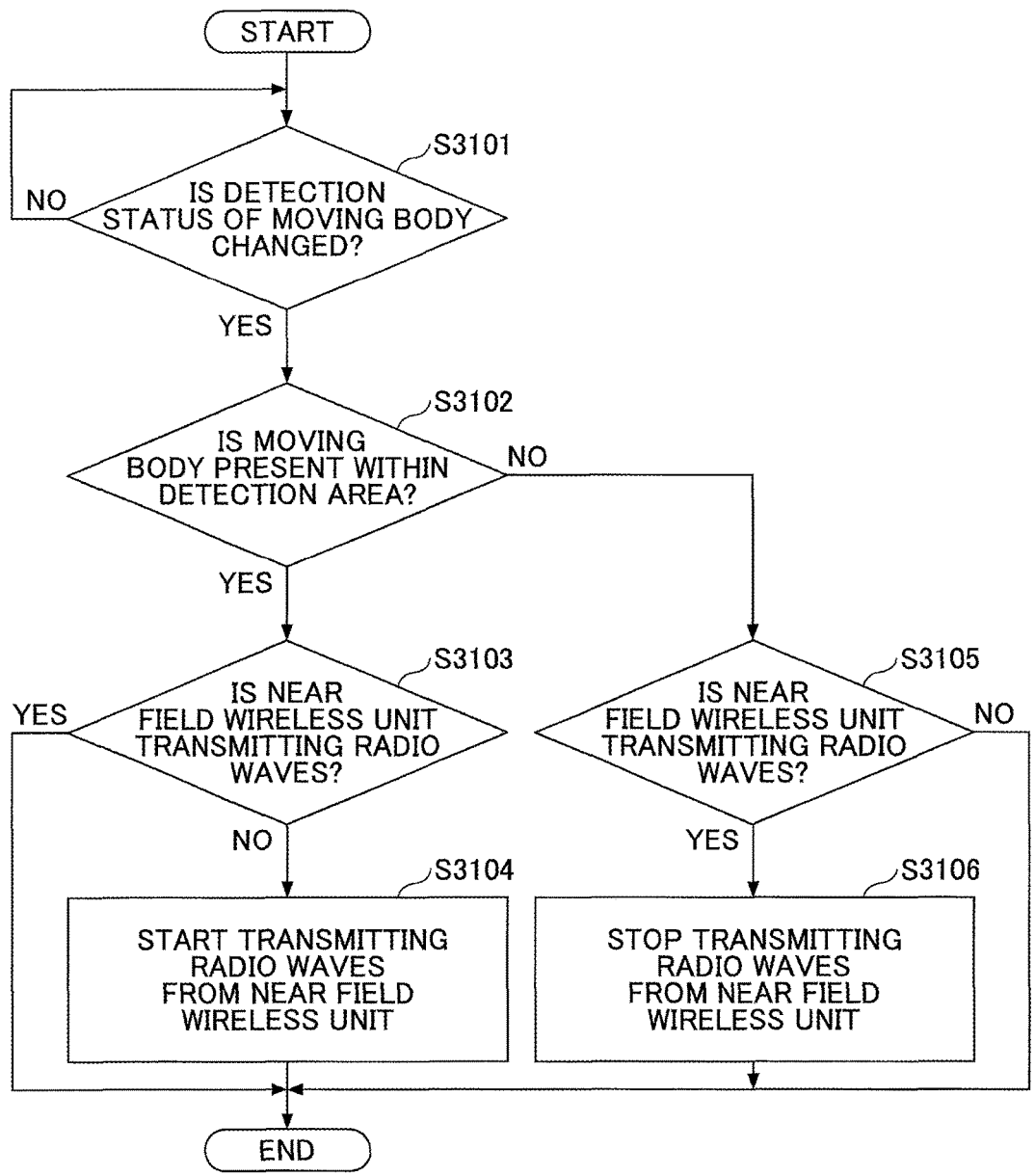
FIG. 31 is a flowchart illustrating an example of a transmission control process according a sixth variation of the first embodiment.

FIG. 31 is a flowchart illustrating an example of a transmission control process according to the sixth variation of the first embodiment.

When the user is not present around the image forming apparatus 101, the near field wireless unit 329 does not have to transmit the radio waves. Thus, in the sixth variation, for preventing unnecessary transmission of the radio waves, the image forming apparatus 101 controls transmission of the radio waves from the near field wireless unit 329 based on detection result of the moving body by the moving body detection unit 401.

In a case in which detection status of the moving body by the moving body detection unit 401 of the image forming apparatus 101 is changed in step S3101, the transmission control unit 413 executes the process subsequent to step S3102.

In step S3102, the transmission control unit 413 determines whether the moving body is present within the detection area of the moving body detection unit 401 based on the detection result of the moving body detection unit 401. In a case in which the moving body is present within the detection area of the moving body detection unit 401 (YES in step S3102), the process goes to step S3103. On the other hand, in a case in which the moving body is not present within the detection area of the moving body detection unit 401 (NO in step S3102), the process goes to step S3105.

In step S3103, the transmission control unit 413 determines whether the near field wireless unit 329 is transmitting the radio waves. In a case in which the near field wireless unit 329 is not transmitting the radio waves (NO in step S3103), the transmission control unit 413 causes the near field wireless unit 329 to start transmitting the radio waves in step S3104. On the other hand, in a case in which the near field wireless unit 329 is transmitting the radio waves (YES in step S3103), the transmission control unit 413 finishes the process.

In step S3105, the transmission control unit 413 determines whether the near field wireless unit 329 is transmitting the radio waves. In a case in which the near field wireless unit 329 is transmitting the radio waves (YES in step S3105), the transmission control unit 413 causes the near field wireless unit 329 to stop transmitting the radio waves. On the other hand, in a case in which the near field wireless unit 329 is not transmitting the radio waves (NO in step S3105), the transmission control unit 413 finishes the process.

According to the above described process, the image forming apparatus 101 causes the near field wireless unit 329 to transmit the radio waves when the moving body (person or the like) is present around the image forming apparatus 101. Further, the image forming apparatus 101 causes the near field wireless unit 329 to stop transmitting the radio waves when the moving body is not present around the image forming apparatus 101.

Second Embodiment

Next, the image forming apparatus 101 according to a second embodiment in which the image determination process is stratified will be described. Stratifying denotes determining eventually whether the extracted feature information of the living body such as the feature information of the face is the living body through a plurality of discriminators.

For example, in a case in which it is difficult to perform determination of the living body at one time due to usage scenes or installation environment of the image forming apparatus 101, the hierarchy determination unit 422 performs the determination of the living body instead of the image determination unit 418. It should be noted that it is preferable that the user or a manager of the image forming apparatus 101 can set (select), from a setting screen and the like, the image determination unit 418 or the hierarchy determination unit 422 which performs the determination.

<Functional Configuration>

A functional configuration of the second embodiment is similar to the functional configuration of the first embodiment shown in FIG. 19.

The (another example of the image determination unit) hierarchy determination unit 422 stratifies the image determination process executed by the image determination unit 418. Stratifying the determination process denotes determining eventually whether the extracted feature information of the living body such as the feature information of the face is the living body through the plurality of discriminators.

In the second embodiment, "discrimination analysis" is used as the discriminator, "k-means" is used as a grouping method, and hierarchies are stratified into 3 hierarchies ("large classification", "middle classification", and "small classification"). In other words, the hierarchy determination unit 422 executes the discrimination analysis based on a plurality of hierarchies to determine whether the object of determination is the living body that satisfies the predetermined condition.

The storage unit 426 stores the living body information 432, which has been created previously by using the image of the living body captured by the capturing unit 414, and the non-living body information 433 which has been created previously by using the image of the non-living body captured by the capturing unit 414.

<Example of Stratification>

FIGS. 32 to 36 are drawings that depict the stratification according to the second embodiment.

Figure 32:
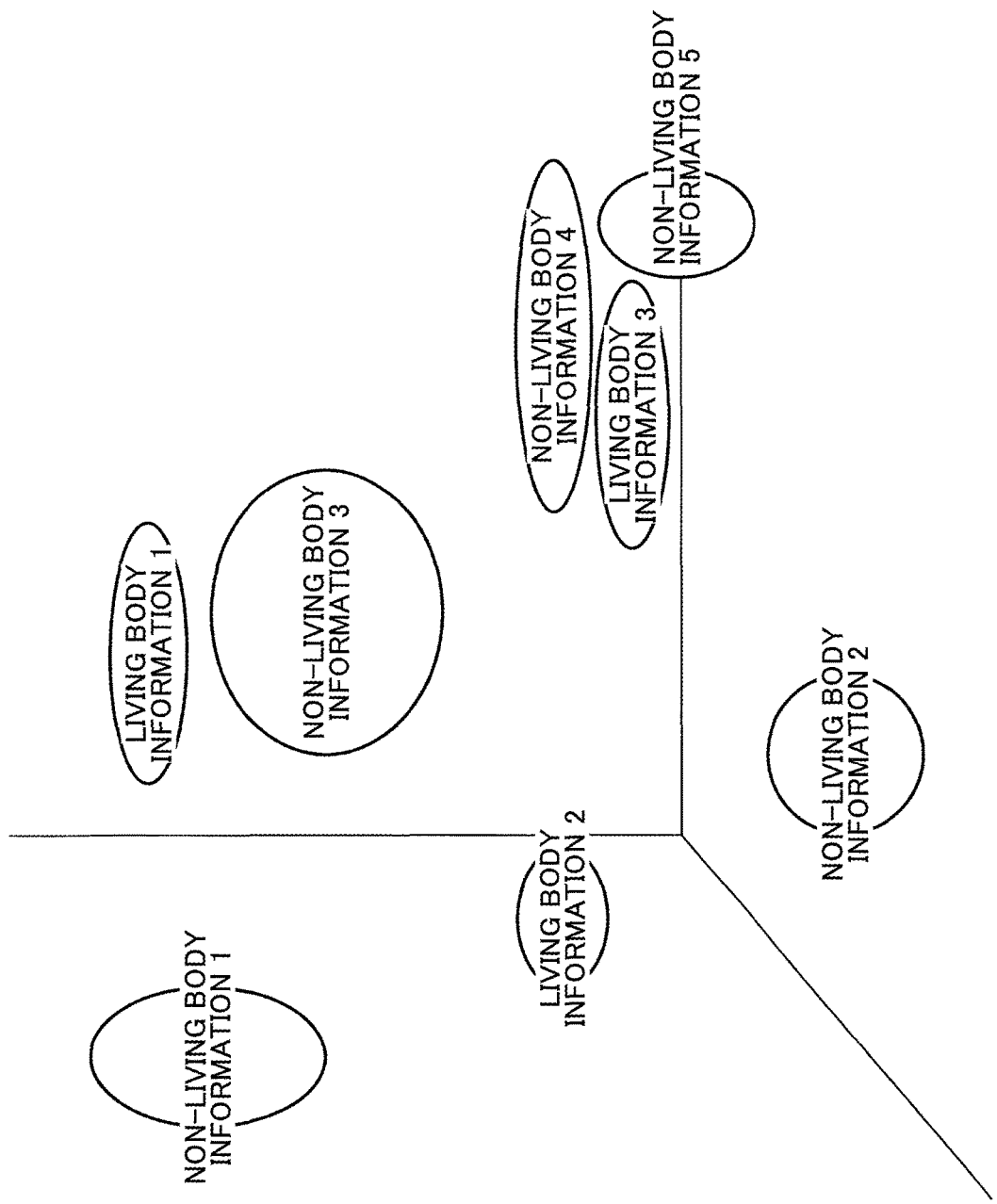
FIG. 32 is a drawing (1) that depicts stratification according to a second embodiment.

When applying the discrimination analysis to extracted feature information based on the living body information 432 and the non-living body information 433 previously stored in the storage unit 426 and grouping the extracted feature information, projected in a space configured with top three discrimination axis, by the k-means, the extracted feature information is classified into 5 pieces of non-living information and 3 pieces of living information as shown in FIG. 32. In this example, because distribution of the living body information 1 is very close to distribution of the non-living body information 3, and distribution of the living body information 3, distribution of the non-living body information 4, and distribution of the non-living body information 5 are very close to each other, it is difficult to discriminate them.

Figure 33:
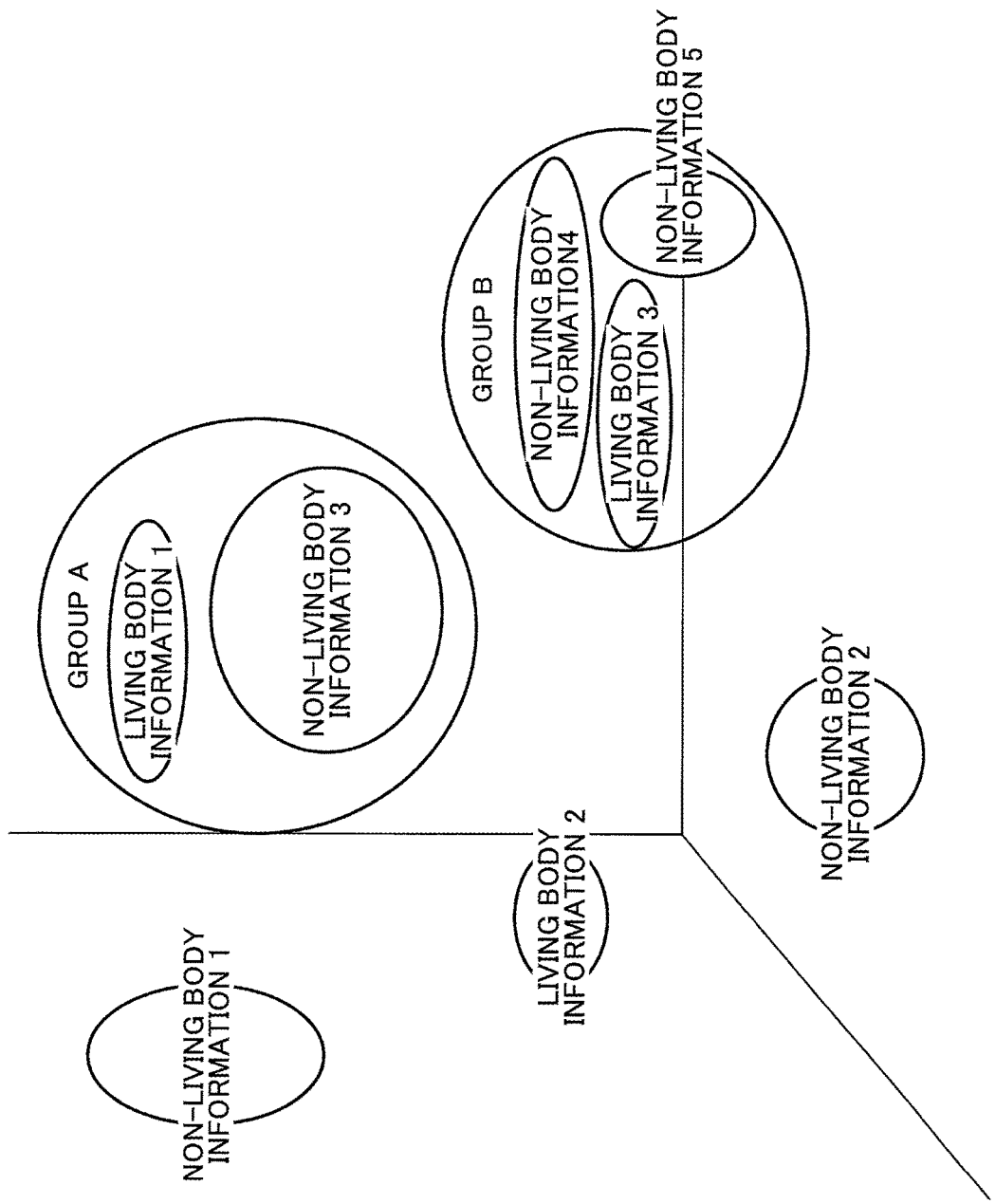
FIG. 33 is a drawing (2) that depicts the stratification according to the second embodiment.

Thus, the hierarchy determination unit 422 performs the discrimination analysis by putting a plurality of pieces of information, difficult to be classified because of closeness, into one piece of information to create the space for discriminating. Each of the 5 pieces of information in the space shown in FIG. 33 is denoted as a "large classification". For example, as shown in FIG. 33, the hierarchy determination unit 422 treats the living body information 1 and the non-living body information 3 as a "group A", and treats the living body information 3, the non-living body information 4, and the non-living body information 5 as a "group B".

The space shown in FIG. 33 is for classifying the extracted feature information into one of the living information 1, the non-living information 2, the non-living body information 2, the group A and the group B of the large classifications. The space of the discrimination analysis is a space in which dispersion in each class becomes minimized and dispersions between classes are maximized. In the example shown in FIG. 33, because the classes, between which the dispersions cannot be increased because of the closeness of the distribution, are integrated into one group (group A, group B), classification is more easily performed as a whole in the discrimination space of the "large classification". Further, because the number of classifications decreases from 8, at first, to 5, the number of dimensions in the discrimination space decreases from 7 to 4 and processing time for classifying can be reduced. It should be noted that in the discrimination analysis, the number of dimensions in the discrimination space is calculated by subtracting one from the number of discrimination classes.

Figure 34:
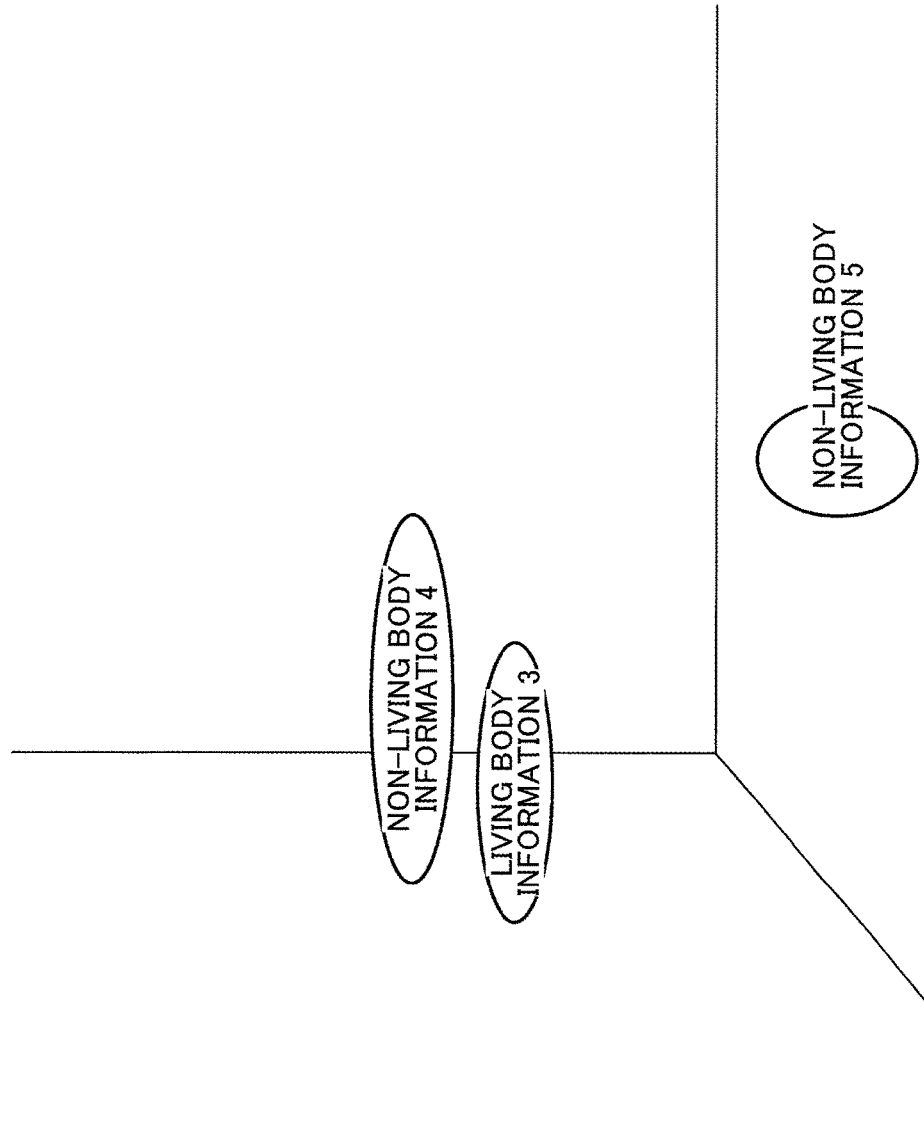
FIG. 34 is a drawing (3) that depicts the stratification according to the second embodiment.

When the extracted feature information is classified into the "group A" or the "group B", it is required to determine a classification into which the extracted feature information is classified among the group A or the group B. Thus, next discrimination is performed. The space shown in FIG. 34 is denoted as a "middle classification". FIG. 34 shows an example of the medium classification of the "group B".

Figure 35:
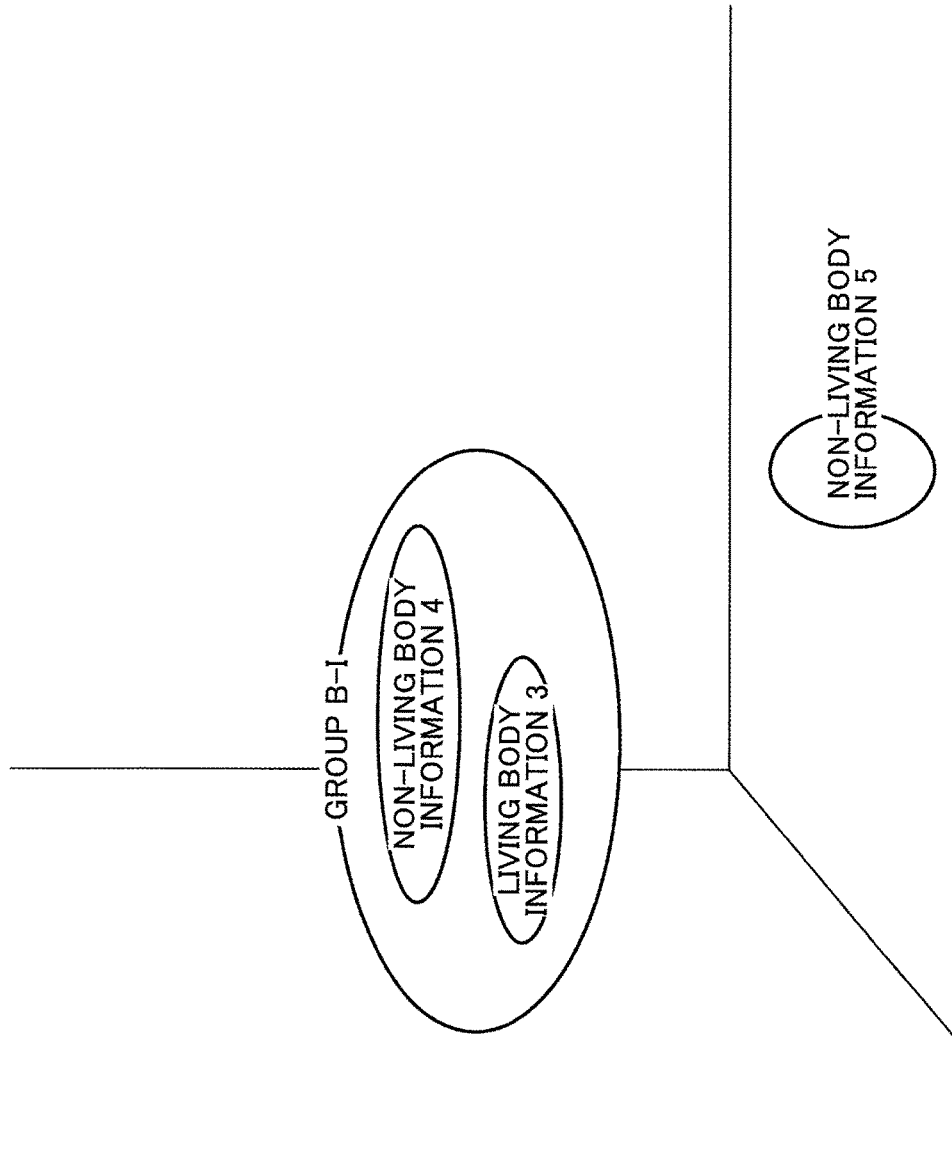
FIG. 35 is a drawing (4) that depicts the stratification according to the second embodiment.

When the discrimination analysis is performed based only on the living information 3, the non-living information 4, and the non-living information 5 of the "group B", distribution is obtained as shown in FIG. 34. In this case also, for example, it is difficult to separate the living information 3 and the non-living information 4. Thus, by grouping them into a "group B-1", the living information 3, the non-living information 4, and the non-living information 5 are classified into 2 classifications (the "group B-1" and the non-living body information 5). Each of the 2 pieces of information in the space shown in FIG. 35 is denoted as a "middle classification".

Figure 36:
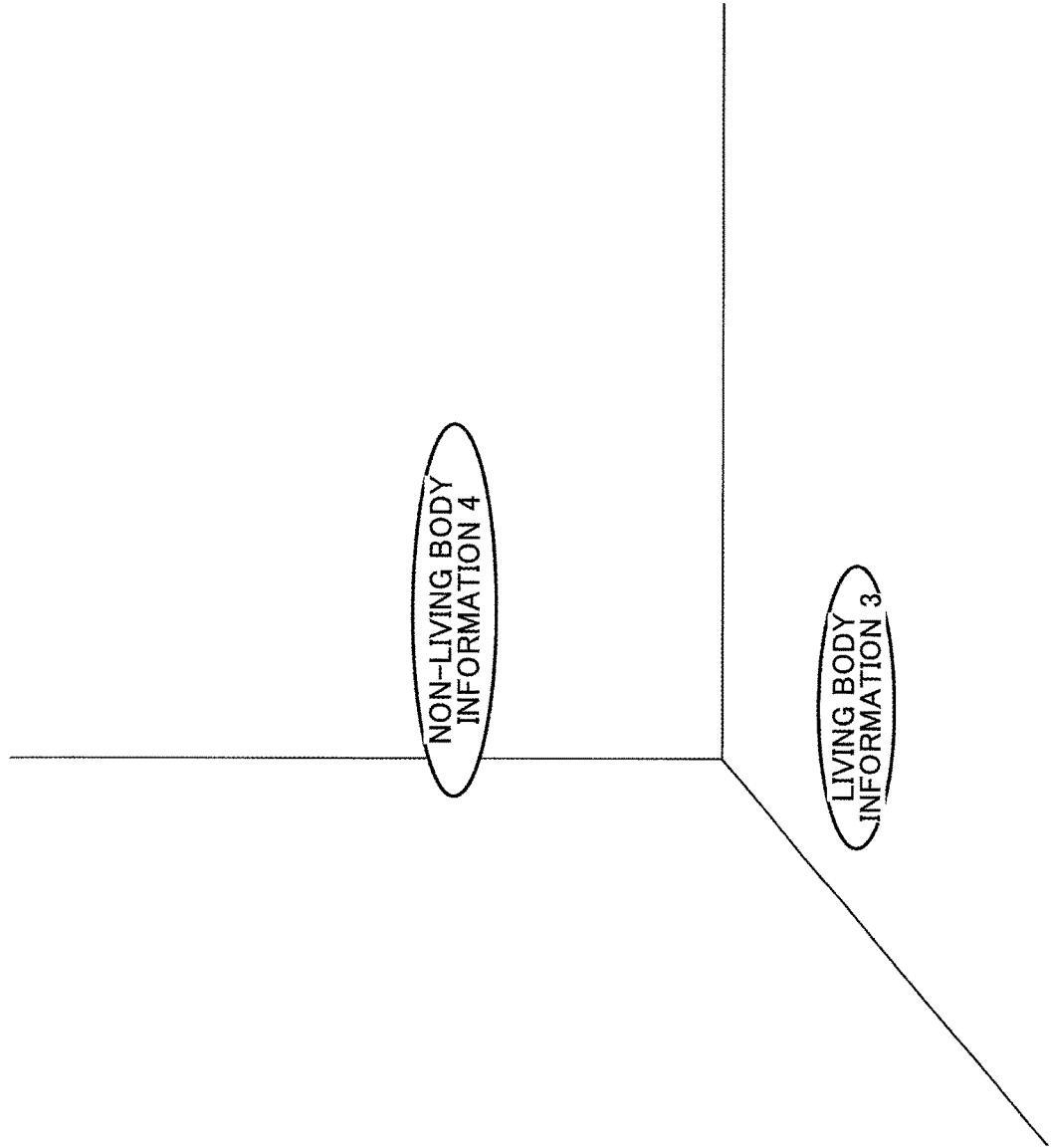
FIG. 36 is a drawing (5) that depicts the stratification according to the second embodiment.

In this case also, when the extracted feature information is classified into the "group B-1", it is required to determine a classification into which the extracted feature information is classified among the group B-1. That is, it is required to classify the extracted feature information into one of the non-living information 4 and the living information 3 of a "small classification". When the discrimination analysis is performed based on the living information 3 and the non-living information 4, distribution is obtained as shown in FIG. 36. In the example shown in FIG. 36, it is easy to discriminate the non-living information and the living information 3.

In the above described example, discrimination of the feature information classified into the non-living information 1, the living information 2 and the non-living information 2 is completed in the "large classification". Discrimination of the feature information classified into the living information 1, the non-living information 3, and the non-living information 5 is completed in the "middle classification". Further, discrimination of the feature information classified into the living information 3 and the non-living information 4 is completed in the "small classification".

Similarity is determined based on an angle and/or a distance in a space in many cases. In a case in which the plurality of feature information are grouped, because the number of space dimensions when calculating the angle and the distance and the number of calculation objects can be reduced, processing time can be reduced even if all of the "large classification", the "middle classification" and the "small classification" are performed. Further, because each discrimination space is created by a reasonable unit (plurality of pieces of information difficult to be classified are grouped into one), a discrimination rate is also improved. The classifications difficult to be classified are coped with by creating a dedicated discrimination space which does not include other classifications.

<Process Flow>

Figure 37:
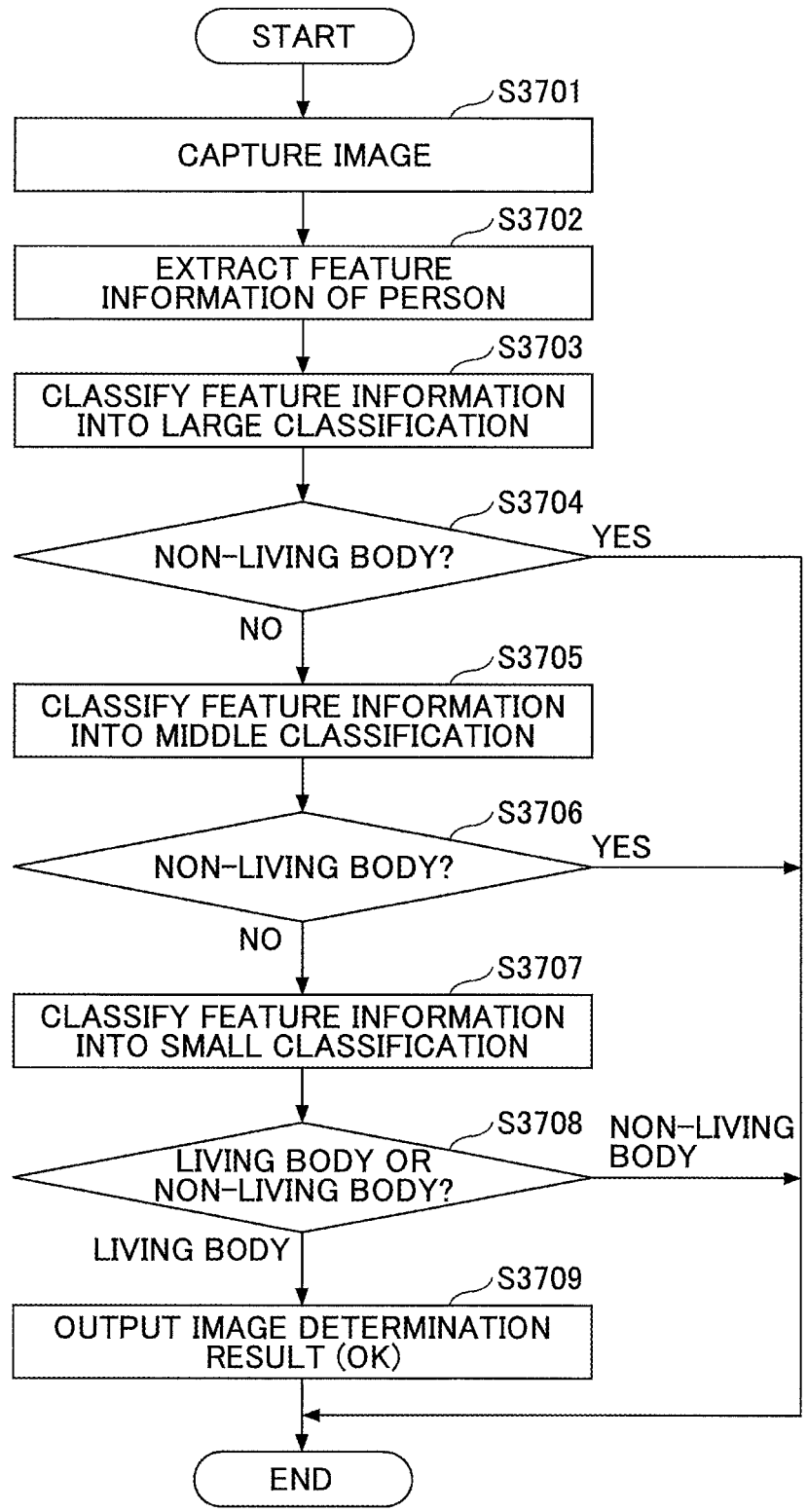
FIG. 37 is a flowchart illustrating an example of the process of the image determination according to the second embodiment.

FIG. 37 is a flowchart illustrating an example of the process of the image determination according to the second embodiment.

In step S3701, the capturing unit 414 uses the camera unit 332 to capture the image.

In step S3702, the feature information extraction unit 417 extracts feature information of the person from the captured image.

In step S3703, the hierarchy determination unit 422 determines a group to which the feature information obtained in step S3702 belongs among the plurality of large classifications. In the example shown in FIG. 33, the hierarchy determination unit 422 executes the discrimination analysis, which determines the group to which the feature information obtained in step S3702 belongs, among the non-living body information 1, the living body information 2, the non-living body information 2, the group A, and the group B.

In step S3704, the hierarchy determination unit 422 determines whether the feature information obtained in step S3702 is included in the groups of the non-living body (in the example shown in FIG. 33, the non-living body information 1 or the non-living body information 2). In a case in which the feature information obtained in step S3702 belongs to the groups of the non-living body (YES in step S3704), the hierarchy determination unit 422 ends the process. On the other hand, in a case in which the feature information obtained in step S3702 does not belong to the groups of the non-living body (NO in step S3704), the process goes to step S3705.

In step S3705, the hierarchy determination unit 422 determines a group to which the feature information obtained in step S3702 belongs among the plurality of middle classifications. In the example shown in FIG. 35, for example, the hierarchy determination unit 422 executes the discrimination analysis, which determines the group to which the feature information obtained in step S3702 belongs, among the non-living body information 5, the group B-1.

In step S3706, the hierarchy determination unit 422 determines whether the feature information obtained in step S3702 is included in the group of the non-living body (in the example shown in FIG. 35, the non-living body information 5). In a case in which the feature information obtained in step S3702 belongs to the group of the non-living body (YES in step S3706), the hierarchy determination unit 422 finishes the process. On the other hand, in a case in which the feature information obtained in step S3702 does not belong to the group of the non-living body (NO in step S3706), the process goes to step S3707.

In step S3707, the hierarchy determination unit 422 determines a group to which the feature information obtained in step S3702 belongs among the plurality of small classifications.

In the example shown in FIG. 36, the hierarchy determination unit 422 executes the discrimination analysis which determines the group to which the feature information obtained in step S3702 belongs among the non-living body information 4, and the living body information 3.

In a case in which the hierarchy determination unit 422 determines in step S3708 that the feature information obtained in step S3702 belongs to the group of the non-living body, the hierarchy determination unit 422 finishes the process. On the other hand, in a case in which the hierarchy determination unit 422 determines in step S3708 that the feature information obtained in step S3702 belongs to the group of the living body, the process goes to step S3709.

In step S3709, the hierarchy determination unit 422 outputs, to the storage unit 426, the apparatus authentication unit 419 and the like, the result of the image determination (OK) which indicates that the person included in the image obtained in step S3701 is the living body.

According to the above described process, the image forming apparatus 101 can reduce the processing time required for determining whether the person in the image is the living body and improve the discrimination rate.

Supplement to the Embodiment

The function of each of the units (elements) shown in FIG. 19 may be implemented by the CPU 311 or the CPU 321 executing programs stored in a storage device such as the storage unit 314, the flash memory unit 324, the ROM 312 and the ROM 322. However, the present invention is not limited to this. At least part of the function of each of the units of the image forming apparatus 101 may be realized by dedicated hardware circuits such as a semiconductor integrated circuit. Further, programs (control programs) executed in the image forming apparatus 101 may be stored in a recording medium such as various discs, media, and USB memories readable by a computer and provided as a file in an installable form or in an executable form. Alternatively, the programs executed in the image forming apparatus 101 may be provided or distributed via a network such as the Internet. Moreover, the various programs may be stored in a non-volatile recording medium such as a ROM and provided.

Further, the present invention is not limited to these embodiments, but various variations and modifications may be made without departing from the scope of the present invention.

The present application is based on and claims the benefit of priority of Japanese Priority Application No. 2015-052488 filed on Mar. 16, 2015 and Japanese Priority Application No. 2016-040271 filed on Mar. 2, 2016, with the Japanese Patent Office, the entire contents of which are hereby incorporated by reference.

What is claimed is:

1. An information processing apparatus for authenticating a user, the information processing apparatus comprising:
at least one processor configured to,
obtain information from a wireless tag,
determine a first identity associated with the user associated with the wireless tag based on the information obtained from the wireless tag,
determine a second identity associated with the user captured in an image,
detect an area which corresponds to a person included in each of a plurality of images captured by an imaging device,
calculate current movement information of the person based on one image of the plurality of images in which the area corresponding to the person is detected and one or more other images of the plurality of images in which the area corresponding to the person is detected,
determine whether a representation of the person satisfies a condition, if a degree of similarity between the current movement information and prior movement information is equal to or greater than a threshold, the prior movement information being information determined from an earlier one of the plurality of images,
determine whether the representation of the person included in the image was recorded live or via a pre-recorded image of the person based on whether the representation satisfies the condition, and
authorize the user to use the information processing apparatus in response to determining that the representation of the person was recorded live, and the first identity of the user associated with the wireless tag and the second identity of the user captured in the image are same.

2. An image forming method performed by an image forming apparatus, the image forming apparatus including at least one of a printer and a scanner, and an information processing apparatus configured to authenticate a user, the image forming method comprising:
obtaining, via a near-field wireless device, information from a wireless tag;
determining a first identity associated with the user associated with the wireless tag based on the information obtained from the wireless tag;
receive an image of the user captured by an imaging device;
determining a second identity of associated with the user captured in the image;
determining whether a representation of a person included in the image was recorded live or via a pre-recorded image of the person based on whether the representation satisfies a condition; and
authorize the user to use the information processing apparatus in response to determining that the representation of the person was recorded live, and the first identity of the user of the wireless tag and the second identity of the user captured in the image are same.

3. An image forming apparatus comprising:
at least one of a printer and a scanner; and
an information processing apparatus configured to authenticate a user, the information processing apparatus including at least one processor configured to,
obtain, via a near-field wireless device, information from a wireless tag,
determine a first identity associated with the user associated with the wireless tag based on the information obtained from the wireless tag,
receive an image of the user captured by an imaging device,
determine a second identity associated with the user captured in the image,
determine whether a representation of a person included in the image was recorded live or via a pre-recorded image of the person based on whether the representation satisfies a condition, and
authorize the user to use the information processing apparatus in response to determining that the representation of the person was recorded live, and the first identity of the user associated with the wireless tag and the second identity of the user captured in the image are same.

4. The image forming apparatus according to claim 3, wherein the at least one processor is configured to,
detect an area which corresponds to the person for each of a plurality of images captured by the imaging device;
calculate current movement information of the person based on one image of the plurality of images in which the area corresponding to the person is detected and one or more other images of the plurality of images in which the area corresponding to the person is detected; and
determine whether the representation of the person satisfies the condition based on the current movement information and prior movement information about movement of the person, the prior movement information being information determined from an earlier one of the plurality of images.

5. The image forming apparatus according to claim 4, wherein the processor is configured to determine that the representation of the person satisfies the condition, if a degree of similarity between the current movement information and the prior movement information is equal to or greater than a threshold.

6. The image forming apparatus according to claim 4, wherein the processor is configured to calculate the current movement information based on an entirety of the one image, if a percentage of the area corresponding to the person detected from the one image among an area not corresponding to the person is less than a threshold.

7. The image forming apparatus according to claim 4, wherein the processor is configured to detect a face area of the person as the area corresponding to the person.

8. The image forming apparatus according to claim 4, wherein the processor is configured to eliminate outliers among pixels included in the area corresponding to the person when calculating an optical flow as the current movement information.

9. The image forming apparatus according to claim 4, wherein the processor is configured to normalize a direction of the person.

10. The image forming apparatus according to claim 4, wherein the at least one processor is configured to,
update the prior movement information based on the current movement information the user inputs correct credentials after determining that the representation of the person was recorded live.

11. The image forming apparatus according to claim 4, wherein the at least one processor is configured to,
set a first threshold associated the condition,
set a second threshold associated with the current movement information,
determine that representation of the person included in the one image is satisfies the condition, if a degree of similarity between the current movement information and the prior movement information is equal to or greater than the first threshold, and
calculate the current movement information based on an entirety of the one image, if a percentage of the area corresponding to the person detected from the one image among an area not corresponding to the person is less than the second threshold.

12. The image forming apparatus according to claim 4, wherein the at least one processor is configured to,
determine an image which includes a noise based on a difference of a pixel value between Hall the plurality of images captured by the imaging device,
omit the image which includes the noise when determining whether the representation of the person satisfies the condition.

13. The image forming apparatus according to claim 3, wherein the processor is configured to execute discriminant analysis based on a plurality of hierarchies to determine whether representation of the person satisfies the condition.

14. The image forming apparatus according to claim 3, wherein the at least one processor is configured to de-authorize the user to use the information processing apparatus after a set time period passes after authorizing the user.

15. The image forming apparatus according to claim 3, wherein the at least one processor is configured to,
receive input of a password from the user, and
authorize the user to use the information processing apparatus, if the input of the password corresponds to a stored password associated with one or more of the first identity of the user associated with the wireless tag and the second identity of the user captured in the image.

16. The image forming apparatus according to claim 3, wherein the at least one processor is configured to,
detect a moving body around the information processing apparatus; and
transmission of radio waves for obtaining the information from the wireless tag based on detection of the moving body.

17. The image forming apparatus according to claim 3, wherein the processor is configured to authenticate the user based on features of the representation of the person that corresponds to the user of the wireless tag.

18. The image forming apparatus according to claim 3, wherein the processor is configured to determine that the representation of the person is a photograph, if the representation does not satisfies the condition.

* * * * *